United States Patent
Maegawa

(10) Patent No.: US 7,633,846 B2
(45) Date of Patent: Dec. 15, 2009

(54) MULTI-LEVEL INFORMATION REPRODUCING METHOD, MULTI-LEVEL INFORMATION RECORDING MEDIUM, MULTI-LEVEL INFORMATION WAVEFORM EQUALIZING DEVICE, MULTI-LEVEL INFORMATION REPRODUCING APPARATUS, MULTI-LEVEL INFORMATION RECORDING APPARATUS, SIGNAL PROCESSING METHOD, REPRODUCED SIGNAL PROCESSING CIRCUIT AND OPTICAL DISK APPARATUS

(75) Inventor: Hiroshi Maegawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 777 days.

(21) Appl. No.: 11/076,056

(22) Filed: Mar. 10, 2005

(65) Prior Publication Data
US 2005/0213462 A1    Sep. 29, 2005

(30) Foreign Application Priority Data
Mar. 15, 2004  (JP) ............................. 2004-073276
May 27, 2004  (JP) ............................. 2004-157070

(51) Int. Cl.
*G11B 7/00* (2006.01)
(52) U.S. Cl. ................. 369/59.11; 369/47.53; 369/47.5
(58) Field of Classification Search .............. 369/59.11, 369/47.5
See application file for complete search history.

(56) References Cited

U.S. PATENT DOCUMENTS

| | | |
|---|---|---|
| 5,438,601 A | 8/1995 | Maegawa et al. |
| 5,602,823 A | 2/1997 | Aoki et al. |
| 5,648,952 A | 7/1997 | Maegawa et al. |
| 5,745,463 A | 4/1998 | Maegawa et al. |
| 5,828,634 A | 10/1998 | Ohno et al. |
| 5,956,313 A | 9/1999 | Maegawa et al. |
| 6,160,773 A | 12/2000 | Maegawa et al. |
| 6,345,018 B1 | 2/2002 | Maegawa et al. |
| 6,611,484 B2* | 8/2003 | Tsukamoto ............... 369/59.11 |
| 6,741,540 B2 | 5/2004 | Maegawa |
| 6,771,570 B1* | 8/2004 | Wong et al. ................. 369/30.1 |
| 6,859,425 B2 | 2/2005 | Maegawa et al. |
| 6,888,783 B2 | 5/2005 | Maegawa |
| 7,027,375 B2* | 4/2006 | Shimizu ................... 369/59.12 |
| 7,082,091 B2* | 7/2006 | Shimizu et al. ........... 369/59.24 |
| 7,126,897 B2* | 10/2006 | Takeuchi et al. ......... 369/47.53 |
| 2004/0013063 A1 | 1/2004 | Maegawa |
| 2004/0052177 A1 | 3/2004 | Maegawa |
| 2004/0146000 A1 | 7/2004 | Maegawa |
| 2005/0213462 A1* | 9/2005 | Maegawa ................. 369/59.11 |

FOREIGN PATENT DOCUMENTS

| | | |
|---|---|---|
| JP | 3-178038 | 8/1991 |
| JP | 2002-319138 | 10/2002 |
| JP | 2003-85764 | 3/2003 |

* cited by examiner

Primary Examiner—Wayne R Young
Assistant Examiner—Van N Chow
(74) Attorney, Agent, or Firm—Dickstein Shapiro LLP

(57) ABSTRACT

A multi-level information reproducing method for reproducing from a recording medium on which marks having detection signal levels different according to multi-level information are recorded in areas virtually divided uniformly, comprising the steps of: a) obtaining a reproduced signal from a series of patterns of multi-level information indicating an average level of intersymbol interference components to adjacent areas generated from marks according to all the multi-level information; and b) optimizing frequency characteristics of a reproducing part with respect to the reproduced signal.

5 Claims, 41 Drawing Sheets

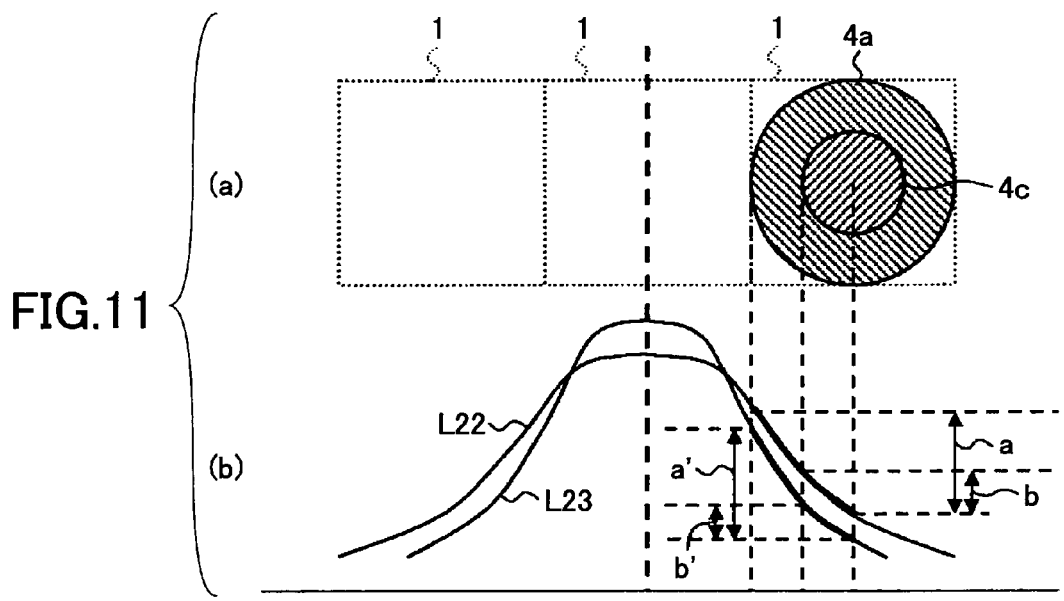
FIG. 11
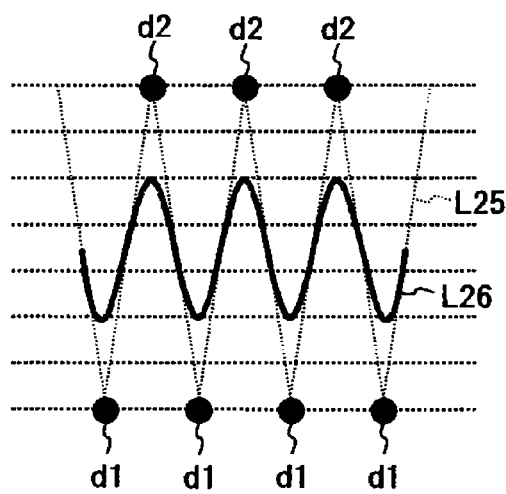
(a)
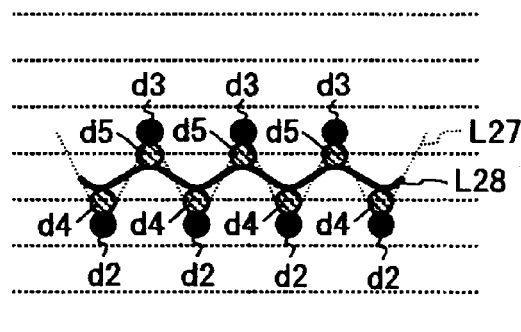
(b)
FIG. 12

MULTI-LEVEL INFORMATION REPRODUCING METHOD, MULTI-LEVEL INFORMATION RECORDING MEDIUM, MULTI-LEVEL INFORMATION WAVEFORM EQUALIZING DEVICE, MULTI-LEVEL INFORMATION REPRODUCING APPARATUS, MULTI-LEVEL INFORMATION RECORDING APPARATUS, SIGNAL PROCESSING METHOD, REPRODUCED SIGNAL PROCESSING CIRCUIT AND OPTICAL DISK APPARATUS

BACKGROUND OF THE INVENTION

1. Field of the Invention

The present invention relates to a multi-level information reproducing method, a multi-level information recording medium, a multi-level information waveform equalizing device, a multi-level information reproducing apparatus and a multi-level information recording apparatus.

Further, the present invention relates to a signal processing method, a reproduced signal processing circuit and an optical disk apparatus, and, in further detail, to a signal processing method and a reproduced signal processing circuit for processing a reproduced signal from an optical disk and an optical disk apparatus including the reproduced signal processing circuit.

2. Description of the Related Art

For example, Japanese Laid-open Patent Application No. 3-178038 discloses a reproducing method in which, when waveform shaping is carried out by means of a waveform equalizer circuit on a reproduced signal obtained from a recording medium, an equalizing coefficient of each tap is controlled according to an error with respect to a predetermined reference determination level, frequency characteristics are thus corrected, and thereby, not with the use of fixed waveform equalizing characteristics but the characteristics are corrected to optimum one based on the reproduced signal.

Further, Japanese Laid-open Patent Application No. 2002-319138 discloses a reproducing method in which, in order to correct characteristics of a waveform equalizer circuit in multi-level information recording, a pattern in which a record mark according to multi-level information is sandwiched by zeros, or identical record marks continue, is applied.

Recently, along with development of digital technology and improvement of data compression technology, optical disks such as a CD (compact disk), a DVD (digital versatile disk) in which data having a size approximately seven times that of a CD can be recorded in a disk having the same diameter as that of the CD, and so forth, take attention as information recording media to record information such as music, movie, photograph, computer software or such (referred to as contents, hereinafter). Accordingly, also along with reduction of the costs thereof, an optical disk apparatus handling such an optical disk as an information recording medium, has been widely spreading.

In this optical disk apparatus, a light source emits laser light, a microscopic spot is produced on a recording surface of an optical disk on which spiral or concentric tracks are produced, information is recorded thereon, and also, information thus recorded is reproduced therefrom based on reflected light obtained from the recording surface.

In the optical disk, in one way, information is recorded with the use of various lengths and combinations of marks and spaces which thus have difference reflectance. In this case, original information is first converted into combinations of two types of numerical values, i.e., 0 and 1, that is, the information is binarized. After that, the thus-binarized information is written in the optical disk. Such a recording method is referred to as a binarized recording method, hereinafter.

An information size of the contents to handle tends to increase year after year, and, then, a further increase in the information size which one optical disk can store therein is expected. In order to increase the information amount recordable by one optical disk, (1) a reduction in a size of a record mark (increase in a recording density) and (2) a conversion of information into combinations of more than the two types of numerical values are considered. However, any one of these items may increase intersymbol interference when the information is reproduced, and thus, a signal quality of the reproduced signal may degrade. To convert original information into combinations of more than the two types of numerical values is referred to as 'to convert into multi-level information/data', and also, data thus obtained is referred to as 'multi-level data'. Further, the number of the levels of the multi-level data is referred to as a multi-level number or the number of multi-levels. Further, a recording method of recording information after converting the information into multi-level information is referred to as a multi-level recording method.

Various apparatuses for carrying out waveform equalization on a reproduced signal have been proposed (for example, see Japanese Laid-open Patent Applications Nos. 2003-85764 and 2002-319138). According to Japanese Laid-open Patent Application No. 2003-85764, a waveform equalizer is proposed for a binarized recording method. There, waveform equalizing characteristics are switched for a case of applying it to a reproduced signal of a mark and for a case of applying it to a reproduced signal of a space. In this method, the waveform equalizing characteristics are fixed for a mark reproduced signal without regard to a length of each mark.

According to Japanese Laid-open Patent Application No. 2002-319138, an information recording and reproducing apparatus is proposed for the multi-level recording method. There, waveform equalizing characteristics in a demodulating circuit are corrected based on a reproduced signal of calibration information recorded in an information recording medium.

Also in the binarized recording method, the intersymbol interference comes to have a non-linearity as a size of the mark is further reduced in future. Therefore, in the waveform equalizer according to Japanese Laid-open Patent Application No. 2003-85764, since the waveform equalizing characteristics are fixed without regard to the length of each mark, an influence of intersymbol interference may still remain. As a result, it may become difficult to finally obtain a reproduced signal having a necessary signal quality.

Further, according to the multi-level recording method, when mark separation is further narrowed, intersymbol interference comes to have a non-linearity, and as a result, an influence of the intersymbol interference may still remain even in the information recording and reproducing apparatus according to Japanese Laid-open Patent Application No. 2002-319138. As a result, it may become difficult to finally obtain a reproduced signal having a necessary signal quality.

SUMMARY OF THE INVENTION

For an optical disk as a recording medium, compatibility is required among optical disks or apparatuses provided by different manufacturers or conforming to different standards. A problematic matter is that, characteristics of a reproduced signal may differ according to a shape of a mark, a size of a light spot or such.

A variation in a mark shape may occur due to a difference in a recording manner such as a laser light emission waveform, a composition of an optical disk recording film, or such. A difference occurs also for an optical disk for which only reproduction is permitted (ROM) and for a recordable optical disk.

Further, a difference in the size of a light spot occurs due to laser characteristics, a variation thereof, optical design, and also, due to an ambient temperature at a time of recording.

Also for a case of binarized recording for an optical disk such as a CD or a DVD, a problem may occur for ensuring the compatibility since characteristics in the reproduced signal change therebetween.

According to common thoughts, a quality of an optical disk is attempted to be kept by a method in which a lower limit of a signal quality is strictly prescribed in basic reproduction system requirements, and, a variation unique to each particular apparatus is covered by a range of a margin to provide.

According to these thoughts, superior comparability can be ensured for optical disks such as a CD, a DVD or such even in consideration of the number of apparatus supplying manufactures, the number of optical disk manufacturers, and the number of available recording speeds.

For a case of binarized information recording, the limit of a so-called optical resolution (MTF) is approached when a high recording density is sought. As a result, adjacent marks may be included in a same light spot, and thus, intersymbol interference in which a reproduced signal includes an adjacent mark component may occur.

That is, a signal of a mark to reproduce may depend on a size of an adjacent mark. A situation of such intersymbol interference changes according to a mark shape, a size of a light spot or such.

However, no intersymbol inteference occurs for a mark or a space which has a size fully satisfying the optical resolution (MTF) requirements.

On the other hand, a reproduced signal change does not occur for a case where the limit of the optical resolution is exceeded. This means that, when a mark is large, a minimum reproduced signal level is obtained, while, when a space is large, a maximum reproduced signal level is obtained.

Although it is assumed that the mark has a low reflectance, the reflectance may contrary increase depending on a recording film, or, the reflectance seems to increase due to interference. In such a case, magnitude relationship of the signals may be inverted.

A fluctuation of the entire amplitude such as that in proportion to a signal level throughout the available information range, such as a fluctuation of laser power, a reflectance difference between inner and outer sides of the optical disk or such, can be dealt with by a provision of an AGC (automatic gain control) circuit on a reproduction path.

This method applying AGC is a method in which an amplitude of a reproduced signal is sampled, and an amplifying coefficient of the reproduction path is controlled in such a manner that the magnitude may be kept constant. This method is applicable for both the binarized recording and multi-level recording.

However, this method applying the AGC circuit cannot deal with a state variation of the intersymbol interference. Since an increase in a recording density results in an approach the limit of the optical resolution, a technology to appropriately deal with the intersymbol interference is required.

According to Japanese Laid-open Patent Application No. 3-178038, characteristics of a waveform equalizing (equalizer or EQ) circuit are tuned for a area of the disk in which predetermined information is previously recorded. This EQ circuit is a circuit having characteristics to change an amplifying coefficient for each specific frequency component. The operation of 'tuning' means optimizing wave equalizing characteristics or setting of an optimum value thereof. An optimum state in the waveform equalizer circuit means a state in which intersymbol interference from an adjacent mark is removed, and an ideal signal level is obtained from an output of the waveform equalizer circuit according to a size of a target mark. Accordingly, 'optimizing' means changing a parameter of the waveform equalizing, and the parameter is made to converge into an optimum state. As the parameter, a delay time of each delay element, an amplifying coefficient for each tap output or such, may be cited for example.

Specifically, setting is made for characteristics such that an amplifying coefficient may be raised for a frequency area in which a reproduced signal amplitude decreases as a result of intersymbol interference occurring around the optical resolution limit, while an attenuation coefficient may be raised for a frequency area exceeding the optical resolution limit.

In the prior art, binarized recording is applied. Accordingly, a binarizing timing for an output signal of the EQ circuit and a binarizing timing of an ideal reproduced signal which is obtained previously, are compared. Then, the frequency characteristics of the EQ circuit are changed as a result of a tap coefficient being controlled in such a manner that the error therebetween may decrease. Thus, optimum EQ circuit characteristics are finally obtained.

In the binarized recording, information is stored along a time-axis direction. Accordingly, only the error in the binarizing timing should thus be reduced.

However, in a case of a multi-level recording, not only a deviation along the time-axis direction but also a deviation along an amplitude direction should be reduced. In fact, a level of a reproduced signal according to each level of multi-level information is determined by a corresponding size or depth of a mark, and this level of the reproduced signal should be normally one, obtained from a central part of the mark.

Accordingly, when a deviation occurs in the time-axis direction, it is not possible to obtain the proper level of the reproduced signal at the central position thereof, and thus, it may not be possible to reproduce multi-level information accurately.

Further, when a deviation occurs in the amplitude direction, it becomes difficult to identify the level of the reproduced signal according to each level of the multi-level information, and thus, it may not be possible to reproduce multi-level information accurately.

In the case of binarized recording, since information is stored only at a time at which a slice level is intersected, an adjustment only along the time-axis direction is necessary to correct intersymbol interference.

However, for the case of multi-level recording, it is necessary to tune the characteristics of the EQ circuit optimally to correct the intersymbol interference both for the time-axis direction and for the amplitude direction.

According to Japanese Laid-open Patent Application No. 2002-319138, as a method of tuning the EQ circuit characteristics for multi-level recording, in a first step, zeros are inserted between respective marks according to each available multi-level information so that recording is carried out in a form of separated waveforms, errors both in the time-axis direction and in the amplitude direction are obtained at once from a level of the reproduced signal together, and therewith, optimum EQ circuit characteristics are obtained. In a second step, the same process is carried out for a successive pattern of each information.

Also in this case, a pattern part previously determined is reproduced, a result is compared with previously obtained ideal data, and the tap coefficients of the EQ circuit are controlled in such a manner that the error therebetween may be minimized. Thereby, a variation among media or among apparatuses is corrected. For these two steps of operations, respective purposes exist. In the multi-level recording, a high recording density in the optical resolution limit is positively applied, and as a result, intersymbol interference from an adjacent mark greatly occurs in which a mark of an adjacent cell leaks to a reproduced signal.

In the first step, in the EQ circuit tuning with the use of the separate waveform, basic setting for the EQ circuit frequency characteristics is carried out in a condition in which the intersymbol interference is removed as a result of zeros being inserted. In the second step, in the tuning operation on the successive waveforms, influence of the intersymbol interference is studied only for a case where marks according to the same multi-level information continue, and the frequency characteristics of the EQ circuit are corrected based on the thus-obtained reproduced results.

However, also in this case, sufficient correction of the intersymbol interference may not be achieved. That is, the series of the mark according to the same multi-level information are applied for the correction of intersymbol interference in this case, and thus, the intersymbol interference occurring in this case is merely one example from among all possible manners of the intersymbol interference.

In fact, for example, one example of 8-level recording is assumed in which, no mark corresponds to the level 0 while a largest mark corresponds to the level 7. In this case, intersymbol interference obtained when the level 1 continues successively merely represents intersymbol interference caused by an adjacent mark of level 1. Similarly, intersymbol interference obtained when the level 7 continues successively merely represents intersymbol interference caused by an adjacent mark of level 7.

For a case where the intersymbol interference has a proportional relationship (or linear relationship) for the level 1 through the level 7, this method may be effective. However, the linearity may be destroyed depending on a mark shape or a light spot size as mentioned above.

The mark is recorded in such a manner that a reproduced signal level obtained from the central position has a linearity according to the multi-level information. However, it cannot be necessarily said that a reproduced signal level from a position of an adjacent mark, that is, the intersymbol interference also has a linearity.

The linearity of intersymbol interference means that 1/7 times a signal level leaking to a position of an adjacent mark from a mark of level 7 is equal to a signal level leaking in the same manner from a mark of level 1. Contrary, the non-linearity means that, for example, in the above-mentioned example, the signal level leaking form a mark of not the level 1 but a level 2 is equal to one another. The EQ circuit may not achieve correction for multi-level information series including all possible ones of such non-linear components.

This is because, for the EQ circuit, tuning of the frequency characteristics is made. Accordingly, the amplifying coefficient for a specific frequency can be set appropriately. However, it is not possible to set amplifying coefficients separately for patterns having a common frequency but having different influences of the intersymbol interference and having different amplitudes.

For example, assuming that a pattern in which a level 0 and a level 1 repeat, and another pattern in which a level 0 and a level 7 repeat, both patterns have different states of intersymbol interference. Theretofore, different optimum frequency characteristics of the EQ circuit should be able to be obtained therefor respectively.

However, since both patterns have the same frequency component, only a common certain specific amplifying coefficient can be set in the EQ circuit.

A method for obtaining an optimum value as this specific amplifying coefficient is a method of tuning the frequency characteristics with the use of a specific pattern including all the available types of multi-level information series.

When this method is applied, even when a non-linear component is included, the frequency characteristics of the EQ circuit should be obtained according to an average of intersymbol interference of all the available types of information series.

However this specific pattern should include all the available combinations covering not only information of a position of each mark to actually reproduce, but also, information of preceding and subsequent adjacent mark positions, and further, information of further preceding and subsequent adjacent mark positions if intersymbol interference affects for a further large range. As a result, this specific pattern corresponds to a very long information series.

For example, simply for including preceding and subsequent mark positions for the 8-level recording, total 512 patterns resulting from third power of 8 are required, then, they should be further multiplied by 3 since three marks are applied for each pattern and thus, finally total 1536 cells are required for this calibration pattern. Furthermore, in consideration of avoiding intersymbol interference among patterns and consideration of an alternate area to be prepared for a possible damage in the patterns, a further large size of information is required for the calibration pattern. If such a large amount of information is added to each minimum recording unit of an optical disk, a considerable recording capacity is consumed which cannot be ignored for seeking a further improvement of a recording density. Accordingly, this problem should be solved.

Further, when the pattern is thus long, an amount of calculation required for minimizing the error for tuning the tap coefficients of the EQ circuit increases, and thus, a time required therefor increases accordingly.

Further, in a system in which intersymbol interference affects over several preceding and subsequent cells due to an increase in the recording density, the number of required taps of the EQ circuit increases, and thus, 10 taps may be exceeded. In such a case, a further longer time is required for tuning of the tap coefficients. Accordingly, a new method by which the frequency characteristics of the EQ circuit can be achieved more accurately with a shorter pattern is demanded.

In multi-level recording, since recording is carried out around the limit of optical resolution (MTF), an amplitude of a high frequency component decreases due to intersymbol interference. Although the EQ (waveform equalizing) circuit is applied to deal with this problem, a self-leaning-type EQ circuit is required which carries out correction of a reproduced signal not for a time-axis direction but for an amplitude direction, for the purpose of accurately detecting multi-level information. When a state of intersymbol interference is linear with respect to multi-level information, frequency characteristics of the EQ circuit can be tuned with the use of a relatively simple pattern. However, when a state of intersymbol interference is non-linear with respect to multi-level information, proper tuning can be carried out when a learning pattern including all the available information series is applied. However, if such a learning pattern is applied, a recordable capacity is much consumed accordingly as mentioned above, and thus, this method may not be actually applied.

The present invention has been devised in consideration of the above-mentioned situation, and an object of the present invention is to provide a system by which proper reproduction can be effectively achieved even with a short pattern (calibration pattern) for a reproduced signal having non-linearity of intersymbol interference, and frequency characteristics of waveform equalizing can be appropriately and efficiently tuned for the reproduction.

According to a first aspect of the present invention, a multi-level information reproducing method for reproducing from a recording medium on which marks having detection signal levels different according to multi-level information are recorded in areas virtually divided uniformly, includes the steps of: a) obtaining a reproduced signal from a series of patterns of multi-level information indicating an average level of intersymbol interference components to adjacent areas generated from marks according to all the available multi-level information; and b) optimizing frequency characteristics of a reproducing part with respect to the reproduced signal.

According to a second aspect of the present invention, in the above-mentioned first aspect of the present invention, the step b) may include the step of optimizing frequency characteristics of a waveform equalizing part.

According to a third aspect of the present invention, in a multi-level information recording medium in which marks having detection signal levels different according to multi-level information are recorded in areas virtually divided uniformly: a calibration area which includes a first part in which one mark according to specific multi-level information is disposed, and also, in preceding and subsequent cells, marks corresponding to signal levels intermediate between a maximum signal level and a minimum signal level are disposed, is disposed in a position different from a user information area.

According to a fourth aspect of the present invention, in a multi-level information recording medium in which marks having detection signal levels different according to multi-level information are recorded in areas virtually divided uniformly: a calibration area which includes a second part in which multi-level information corresponding to highest two levels of the signal level is disposed alternately, or multi-level information corresponding to lowest two levels of the signal level is disposed alternately, and a third part in which marks corresponding to a maximum signal level and a minimum signal level are disposed alternately, is disposed in a position different from a user information area.

According to a fifth aspect of the present invention, in a multi-level information recording medium in which marks having detection signal levels different according to multi-level information are recorded in areas virtually divided uniformly: a calibration area which includes a fourth part in which marks corresponding to two signal levels respectively lower and higher than a predetermined signal level in a combination symmetrical and closest to the reference level are disposed alternately, is disposed in a position different from a user information area.

According to a sixth aspect of the present invention, in the multi-level information recording medium according to any one of the above-mentioned third through fifth aspects of the present invention, a fifth part in which a pattern may be disposed in which at least two marks corresponding to the maximum signal level and to the minimum signal level are respectively disposed successively is disposed together.

According to a seventh aspect of the present invention, a multi-level information waveform equalizing device includes: a part carrying out waveform equalization of a reproduced signal obtained from the calibration area of the multi-level information recording medium according to any one of the above-mentioned third through sixth aspects of the present invention by means of a waveform equalizing part; comparing the reproduced signal thus undergone waveform equalization with a predetermined target value; and setting waveform equalizing characteristics of the waveform equalizing part in such a manner as to minimize an error between the reproduced signal having undergone waveform equalization and the target value.

According to an eighth aspect of the present invention, in the multi-level information waveform equalizing device according to the above-mentioned seventh aspect of the present invention, the waveform equalizing part may include a part which stores the reproduced signal of the calibration area in a storage; repetitively outputs the reproduced signal as a pseudo reproduced signal from the storage; and carries out equalization of the waveform equalizing characteristics of the waveform equalizing part based on the pseudo reproduced signal.

According to a ninth aspect of the present invention, a multi-level information reproducing apparatus includes:

an optical system part obtaining a reproduced signal from the recording medium according to any one of the above-mentioned third through sixth aspects of the present invention;

a servo mechanism part moving the optical system part to a target position, and keeping the state;

a synchronization detecting part identifying the calibration area from the reproduced signal, and outputting a calibration signal indicating the calibration area;

a waveform equalizing part optimizing and then keeping equalizing characteristics based on the calibration signal output by the synchronization detecting part, and, with the use thereof, carrying out waveform equalization of the reproduced signal; and a multi-level determining part determining multi-level information from the reproduced signal having undergone waveform equalization by the waveform equalizing part, and outputting the same.

According to a tenth aspect of the present invention, a multi-level information recording apparatus includes: an optical system part configured to produce a record mark according to input multi-level information; a servo mechanism part moving the optical system part to a target position and keeping the state; and a part recording including user information and a calibration pattern for a waveform equalizing part in multi-level information, and recording it in a recording medium.

In the multi-level information reproducing method, the multi-level information recording medium, the multi-level information waveform equalizing device, the multi-level information reproducing apparatus or the multi-level information recording apparatus according to any one of the above-mentioned first through tenth aspects of the present invention, it is possible to effectively carry out proper reproduction from a reproduced signal even having non-linearity of intersymbol interference with a short pattern (calibration pattern), and it is possible to tune frequency characteristics of waveform equalization in reproduction.

Another object of the present invention is to provide a signal processing method and a reproduced signal processing circuit by which intersymbol interference in a reproduced signal from an optical disk can be corrected with a high accuracy.

Further another object of the present invention is to provide an optical disk apparatus by which information recorded in an optical disk can be reproduced with a high accuracy.

According to an eleventh aspect of the present invention, a signal processing method for processing a reproduced signal from an optical disk, includes the step of: a) determining, based on a delayed signal corresponding to a predetermined specific delay time from among a plurality of delayed signals obtained as a result of the reproduced signal being delayed according to a plurality of delay times different by a fixed time each, a plurality of multiplying coefficients applied to multiply the reproduced signal and the plurality of delayed signals.

In this method, when a reproduced signal from an optical disk is processed, based on a delayed signal corresponding to a predetermined specific delay time from among a plurality of delayed signals obtained as a result of the reproduced signal being delayed according to a plurality of delay times different by a fixed time each, a plurality of multiplying coefficients applied to multiply the reproduced signal and the plurality of delayed signals are determined. In this case, the plurality of multiplying coefficients which are suitable for marks produced on the optical disk are thus determined, and thus, it is possible to carry out signal processing according to the marks. Accordingly, it is possible to accurately correct intersymbol interference in the reproduced signal obtained from the optical disk as a result.

In this case, according to a twelfth aspect of the present invention, in the determining step a), the plurality of multiplying coefficients may be determined based on a magnitude relationship between a signal level of the delayed signal corresponding to the specific delay time and at least one predetermined determination level.

In this case, according to a thirteenth aspect of the present invention, the determination level may include a plurality of levels.

According to a fourteenth aspect of the present invention, any one of the above-mentioned signal processing methods according to the twelfth and thirteenth aspects of the present invention, may further include the step of: b) setting the at least one determination level based on at least one of the delayed signal corresponding to the delay time which is shorter from the above-mentioned specific delay time by one step and the delayed signal corresponding to the delay time which is longer from the specific delay time by one step and According to a fifteenth aspect of the present invention, in any one of the above-mentioned signal processing methods according to the eleventh through fourteenth aspects of the present invention, the reproduced signal may be a reproduced signal of information which may have a level from among at least three levels.

In this case, according to a sixteenth aspect of the present invention, the plurality of delay times may be respective integer multiples of a period of a reproducing clock signal.

According to a seventeenth aspect of the present invention, a reproduced signal processing circuit for processing a reproduced signal from an optical disk, includes: a delay circuit delaying the reproduced signal according to a plurality of delay times different by a fixed time each, and generating a plurality of delayed signals corresponding to the plurality of delay times, respectively; a determining circuit determining a plurality of multiplying coefficients based on a signal level of a delayed signal from among the plurality of delayed signals corresponding to a predetermined specific delay time; a multiplying circuit multiplying the reproduced signal and the plurality of delayed signal by the plurality of multiplying coefficients, respectively, and generating a plurality of multiplied signals; and an adding circuit adding the plurality of multiplied signals together and generating an added signal.

Thereby, the delay circuits delay the reproduced signal by the plurality of delay times different by the fixed time each, and the plurality of delayed signals corresponding to the plurality of delay times respectively are generated. Then, the determining circuit determines the plurality of multiplying coefficients based on the signal level of the delayed signal from among the plurality of delayed signals corresponding to the predetermined specific delay time. Then, the multiplying circuit multiplies the reproduced signal and the plurality of delayed signal by the plurality of multiplying coefficients, respectively, and generates the plurality of multiplied signals. Further, the adding circuit adds the plurality of multiplied signals together and generates the added signal. In this case, the suitable multiplying coefficients are thus determined according to marks. As a result, the thus-obtained added signal is a signal processed according to the marks. Accordingly, it is possible to accurately correct intersymbol interference in the reproduced signal from the optical disk as a result.

In this case, according to an eighteenth aspect of the present invention, the determining circuit may determine the plurality of multiplying coefficients based on a magnitude relationship between a signal level of the delayed signal corresponding to the specific delay time and at least one predetermined determination level.

In this case, according to a nineteenth aspect of the present invention, the determination level may include a plurality of levels.

Any one of the above-mentioned reproduced signal processing circuits according to the eighteenth and the nineteenth aspects of the present invention, according to a twelfth aspect of the present invention, may further include a setting circuit setting the at least one determination level based on at least one of the delayed signal corresponding to the delay time which is shorter than the specific delay time by one step and the delayed signal corresponding to the delay time which is longer than the specific delay time by one step.

According to a twenty-first aspect of the present invention, any one of the above-mentioned reproduced signal processing circuits according to the seventeenth through twelfth aspects of the present invention may further include a correcting part correcting at least any one of the plurality of multiplying coefficients in such a manner as to minimize a difference between the above-mentioned added signal and a predetermined target value.

According to a twenty-second aspect of the present invention, in any one of the above-mentioned reproduced signal processing circuits according to the seventeenth through twenty-first aspects of the present invention, the reproduced signal may be a reproduced signal of information which may have a level from among at least three levels.

In this case, according to a twenty-third aspect of the present invention, the plurality of delay times may be respective integer multiples of a period of a reproducing clock signal.

According to a twenty-fourth aspect of the present invention, an optical disk apparatus for applying light to a recording surface of an optical disk, and carrying out at least reproducing information from among recording information in, reproducing information from and deleting information from the optical disk, includes: the reproduced signal processing circuit according to any one of the above-mentioned reproduced signal processing circuits according to the seventeenth through twenty-third aspects of the present invention; and a processing device carrying out reproducing information based on an output signal of the reproduced signal processing circuit.

Thereby, since the reproduced signal processing circuit according to any one of the above-mentioned reproduced signal processing circuits according to the seventeenth through twenty-third aspects of the present invention is applied, it is possible to accurately reproduce information recorded in the optical disk.

BRIEF DESCRIPTION OF THE DRAWINGS

Other objects and further features of the present invention will become more apparent from the following detailed description when read in conjunction with the accompanying drawings:

FIG. 11 illustrates a state which complicated non-linearity appears when a spot shape or an intensity distribution varies;

FIG. 12 illustrates a problem occurring when the intersymbol interference has the above-mentioned type 2 of non-linearity;

DETAILED DESCRIPTION OF THE PREFERRED EMBODIMENTS

A best mode to carry out the present invention is described with reference to figures.

Figure 1:
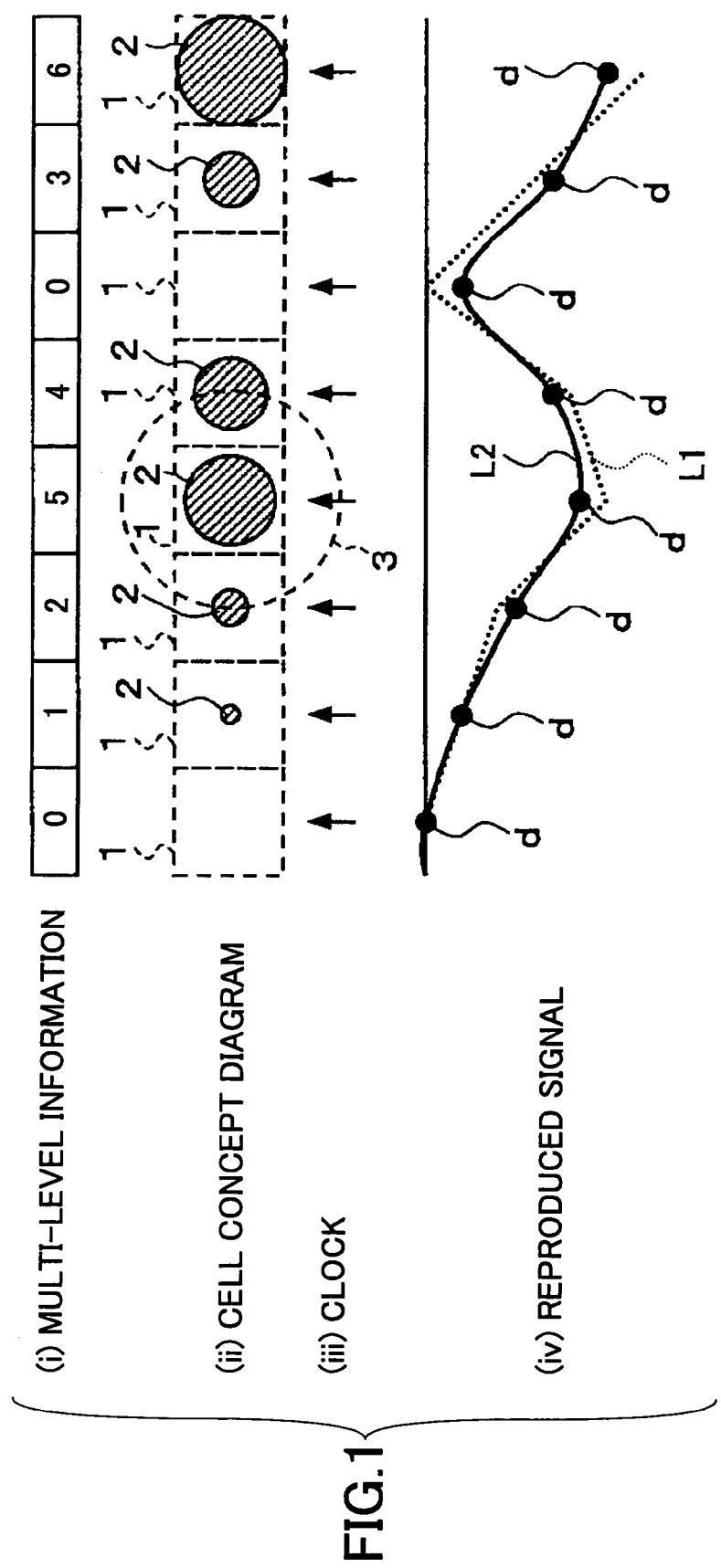
FIG. 1 illustrates an outline of recording multi-level information on a multi-level information recording medium according to a first embodiment of the present invention.

FIG. 1 illustrates an outline of multi-level information recording on a multi-level information recording medium according to a first embodiment of the present invention.

FIG. 1 shows, as shown in (i), an example of multi-level information which is 7-level information from "0" through "6" including a state in which no mark is produced.

As shown in FIG. 1, (ii), along a track of an optical disk (medium) acting as a recording medium, box-shaped areas 1 (refereed to as cells), which are obtained as a result of the track being virtually divided with uniform separations, are disposed. Then, at a center of each cell 1, a record mark 2 (simply referred to as a mark, hereinafter) is produced. A light spot 3 is a spot of laser light applied in such a manner as to detect the mark 2.

The mark 2 may be a phase change mark in which mainly reflectance thereof changes, or a dye mark in which mainly phase difference thereof changes. Further, it may be a pit of a ROM disk for which only reproduction of information therefrom is permitted.

User information to record in the optical disk is first converted into multi-level information by means of multi-level modulation. Then, marks having a plurality of sizes and depths respectively, by which reproduced signal levels according to respective levels of the multi-level information can be detected, are produced in such manner that they may be disposed at centers of the respective cells 1.

FIG. 1 shows the example in which the 7-level information from "0" through "6" is recorded. However, the number of the available levels of multi-level information is not limited thereto. In description below, a case of 8 levels is also described other than the case of 7 levels. As shown in FIG. 1, (iii), by means of a clock signal (indicated by arrows in the figure) indicating the centers of the respective cells 1, the reproduced signal is sampled. FIG. 1, (iv) shows one example of a curve L2 of reproduced signal levels detected from the reproduced signal of the multi-level information of "0" through "6", together with a curve L1 of ideal reproduced signal levels. As a result of detecting from the thus-detected respective reproduced signal levels d, the multi-level information recorded on the optical disk is reproduced.

As will be described in detail later, the light spot 3 is larger than each cell 1, and as a result, reproduction is carried out in a condition in which information at an adjacent mark position is leaked thereto. Accordingly, the curve L2 of the reproduced signal levels, actually detected, deviates from the curve L1 of the ideal reproduced signal levels.

Next, as a feature of the multi-level information recording, a clock detecting method is described.

In multi-level information recording for an optical disk such as a CD or a DVD, as a difference from binarized information recording, the clock detecting method is cited. In a case of binarized information recording, a clock component is included in its data edge, and as a result, clock timing can be obtained merely as a result of a normal information area being reproduced.

However, in the multi-level information recording, clock timing is not obtained in the same way. This is because no clock component is included in its data edge. Further, it may not be possible to always detect a peak position indicating a mark center. Therefore, a special pattern (clock mark or CM) is inserted at fixed intervals for making it possible to positively obtain the clock timing.

Figure 2:
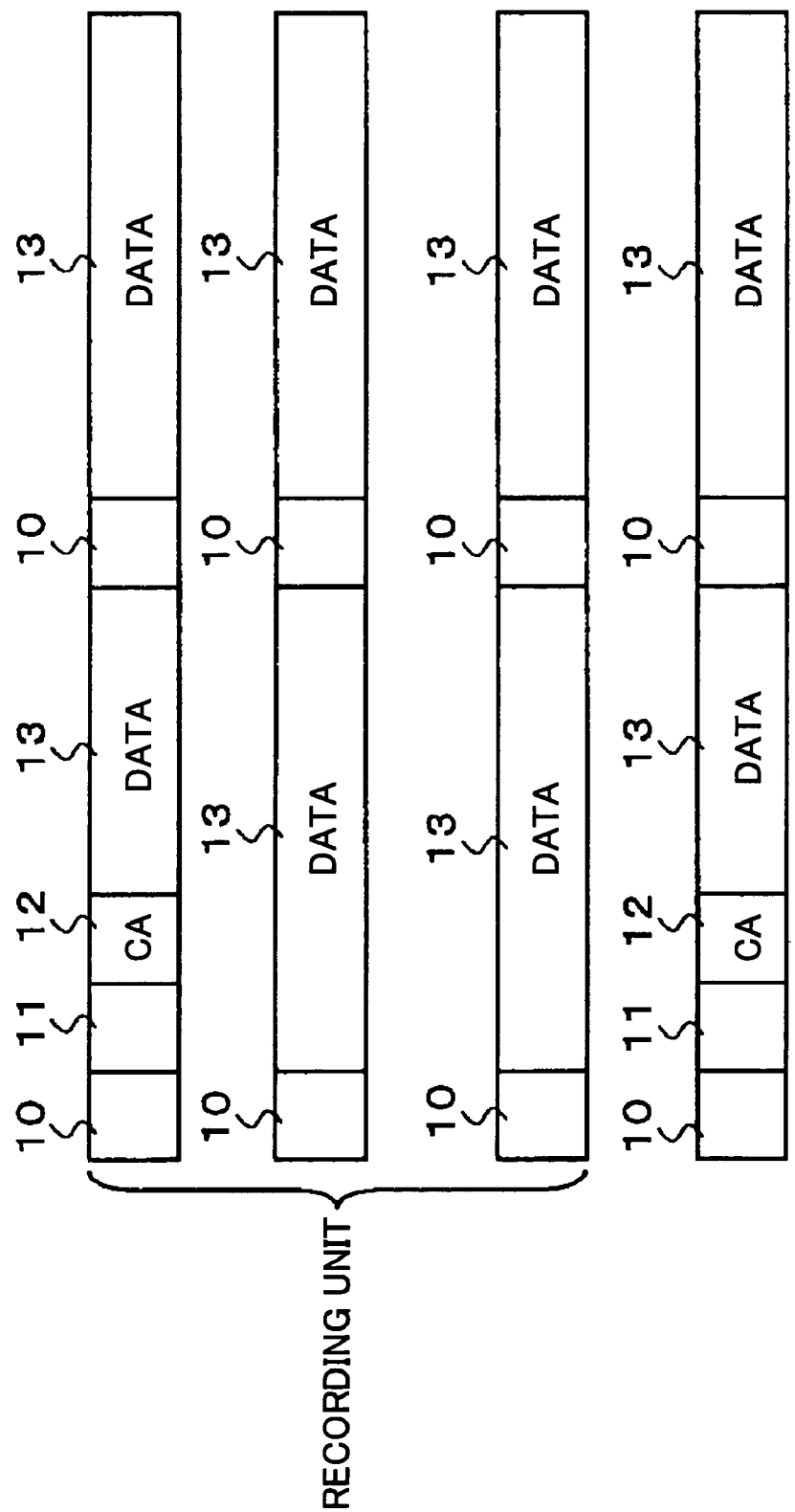
FIG. 2 shows one example of a data format in which clock marks are inserted which are special patterns for extracting clock signals.

FIG. 2 shows one example of a data format in which the clock mark which is the special pattern for making it possible to positively obtain the clock timing is inserted.

Figure 3:
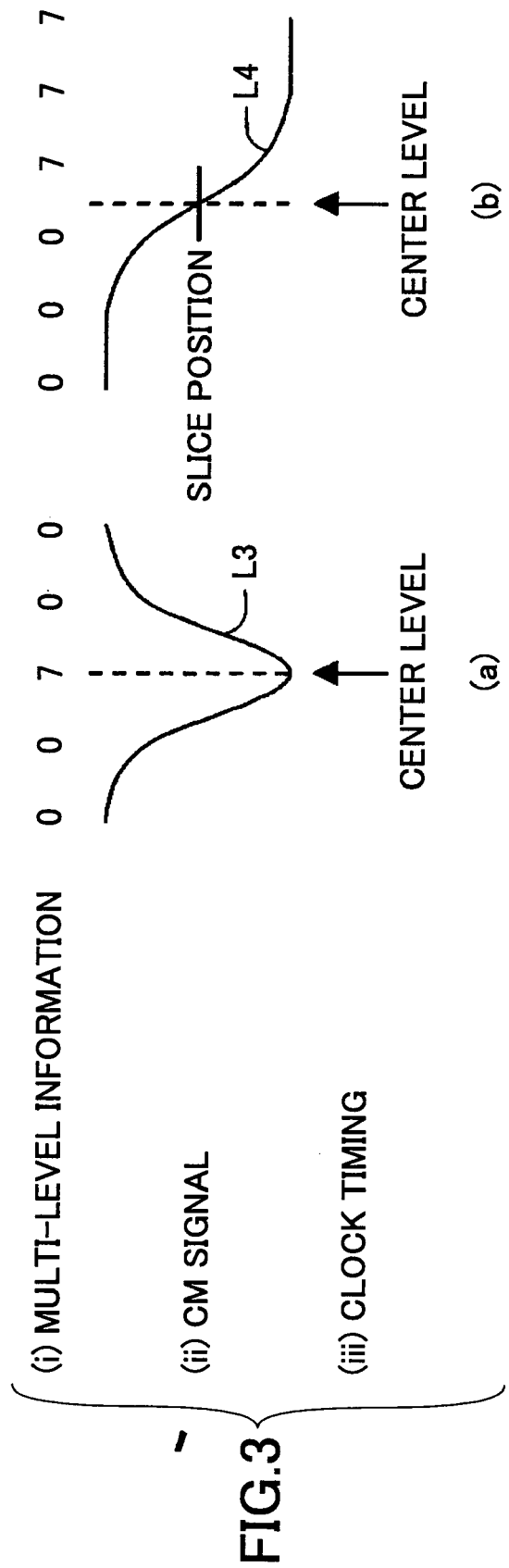
FIG. 3 illustrates clock signal extraction with the use of the clock marks.

FIG. 3 illustrates clock extraction with the use of the clock mark.

As shown in FIG. 2, the clock mark 10 is inserted periodically between user information areas 13 (referred to as DATA in the figure). From a waveform obtained from the clock mark 10, the clock timing indicating the cell center should be detected. As shown in FIG. 2, a synchronization mark 11 and a calibration area (CA) are also inserted.

A first type of the clock mark is shown in FIG. 3, (*a*). In this type, as shown in the same figure, (i), it corresponds to multi-level information of '00700', and, as shown in the same figure, (ii), a curve L3 of a reproduced signal level is obtained when the clock mark is reproduced. Then, as shown in the same figure, (iii), the clock timing can be detected as from central level of the detected curve L3, or, from a bottom level at the center between portions of a level 0. Thus, the cell center is detected.

On the other hand, in a case of a second type of the clock mark as shown in FIG. 3, (*b*), it corresponds to multi-level information of '000777' which is a combination of three successive levels 0 and then, three successive levels 7, as shown in the same figure, (i). A curve L4 of a reproduced signal level is obtained when this clock mark is reproduced as shown in the same figure, (ii). Then, as shown in the same figure, (iii), the clock timing can be detected as a result of the curve L4 being sliced by the central level (SLICE POSITION in (ii)). Thus a cell boundary is detected. Based on the thus-detected cell boundary, frequency multiplication is carried out by means of a phase locked loop (PLL) circuit, thereby a signal having the cell periods is generated, and therefrom, a clock signal is obtained in which opposite edges of the thus-generated signal of cell periods indicates the cell centers. In this type, although a circuit configuration may become complicated, it has characteristics such that the clock signal is robust against a noise influence It is noted that a CM signal is a portion corresponding to the CM extracted from the reproduced signal.

In the present embodiment, any clock detecting method may be applied. However, the pattern of the clock mark may be included in user information, and as a result, a measure to identify a position of the clock mark is required.

Figure 4:
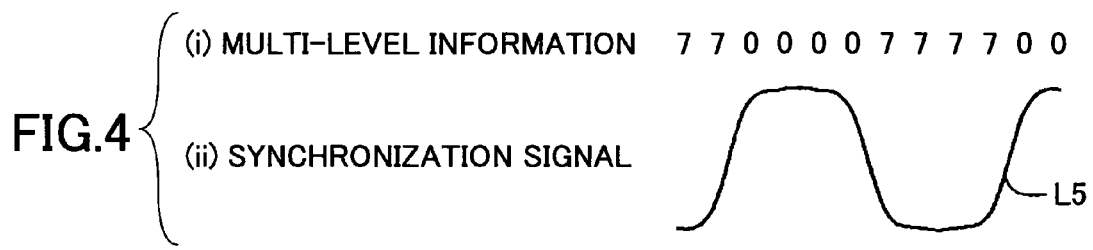
FIG. 4 illustrates synchronization marks shown in FIG. 2.

FIG. 4 illustrates the above-mentioned synchronization mark shown in FIG. 2.

As shown in FIG. 4, (i), the synchronization mark corresponds to, for example, multi-level information of '77000077', and, as shown in the same figure, (ii), a curve L5 of a reproduced signal level is obtained when the synchronization mark is reproduced.

The synchronization mark has a simple pattern such that it may be detected even when the clock frequency somewhat fluctuate. As shown in FIG. 2, the synchronization mark is preferably disposed at least one every minimum recording unit.

As a result of the pattern (synchronization pattern) of the synchronization mark being detected, a position of the clock mark is roughly identified, and then, a clock signal is generated indicating the accurate cell center, from the clock mark.

It is noted that a synchronization signal is a portion corresponding to the synchronization mark extracted from the reproduced signal. The calibration area (CA) is described later.

Figure 5:
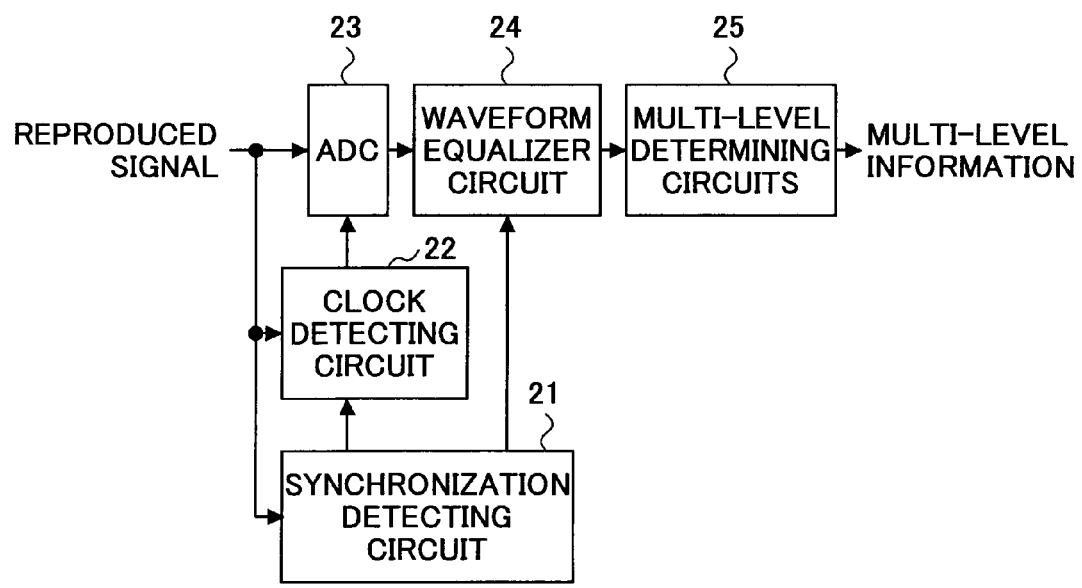
FIG. 5 is a block diagram showing a specific configuration example of a multi-level information detecting circuit.

FIG. 5 shows a block diagram of a specific configuration of a multi-level information detecting circuit according to the first embodiment of the present invention.

First, a synchronization detecting circuit 21 detects the synchronization signal from the reproduced signal detected from the optical disk, and generates a clock mark window signal indicating a rough position of the clock mark. A clock detecting circuit 22 generates the clock signal indicating the cell center from the reproduced signal based on the clock mark window signal generated by the synchronization detecting circuit 21. A frequency of this clock signal should be equal to or more than the cell frequency, and, may be set higher than the cell frequency as a result of the timing of the cell center being included therein.

An analog-to-digital converter (ADC) 23 outputs the reproduced signal based on the timing of the clock signal generated by the clock detecting circuit 22.

As an alternative method, without applying the synchronization detecting circuit and the clock detecting circuit, a fixed clock signal having a sufficiently higher frequency than (for example, more than 8 times) the cell frequency may be applied. In this case, high speed processing is required for signal processing carried out after the ADC. However, in this case, digital processing may be applied to detect the above-mentioned synchronization mark or to identify the cell center. That is, a digital data series taken by the ADC is monitored, and setting of the slice level or detection of a peak or a bottom is achieved as a result of filter processing or detection of data continuity being carried out depending on the actual characteristics of the synchronization marks or the actual characteristics of the clock marks.

A digitized data series output from the ADC 23 is corrected by a waveform equalizer (EQ) circuit 24 for a high band signal which has been once attenuated due to intersymbol interference, and a multi-level detecting circuit 25 determines levels closest to ideal multi-levels, and outputs thus-obtained multi-level information as the determination results. The multi-level information is then converted into user information by means of a decoding circuit in a subsequent stage.

On the reproduced signal, a DC component less than a servo band, a noise higher than the cell frequency are superposed, which should be removed by means of a filter.

Especially, in order to effectively utilize an input range to the ADC, it is preferable to process the input to the ADC 23 such that the DC component is removed by means of an analog filter, a gain is adjusted in such a manner that the maximum amplitude does not exceeds the input range of the ADC, or such. The characteristics of these filters may be adjusted based on the reproduced signal obtained from the calibration area.

The above-mentioned waveform equalizer circuit (EQ circuit) 24 is preferably made of a digital filter in which frequency characteristics can be easily made variable.

Figure 6:
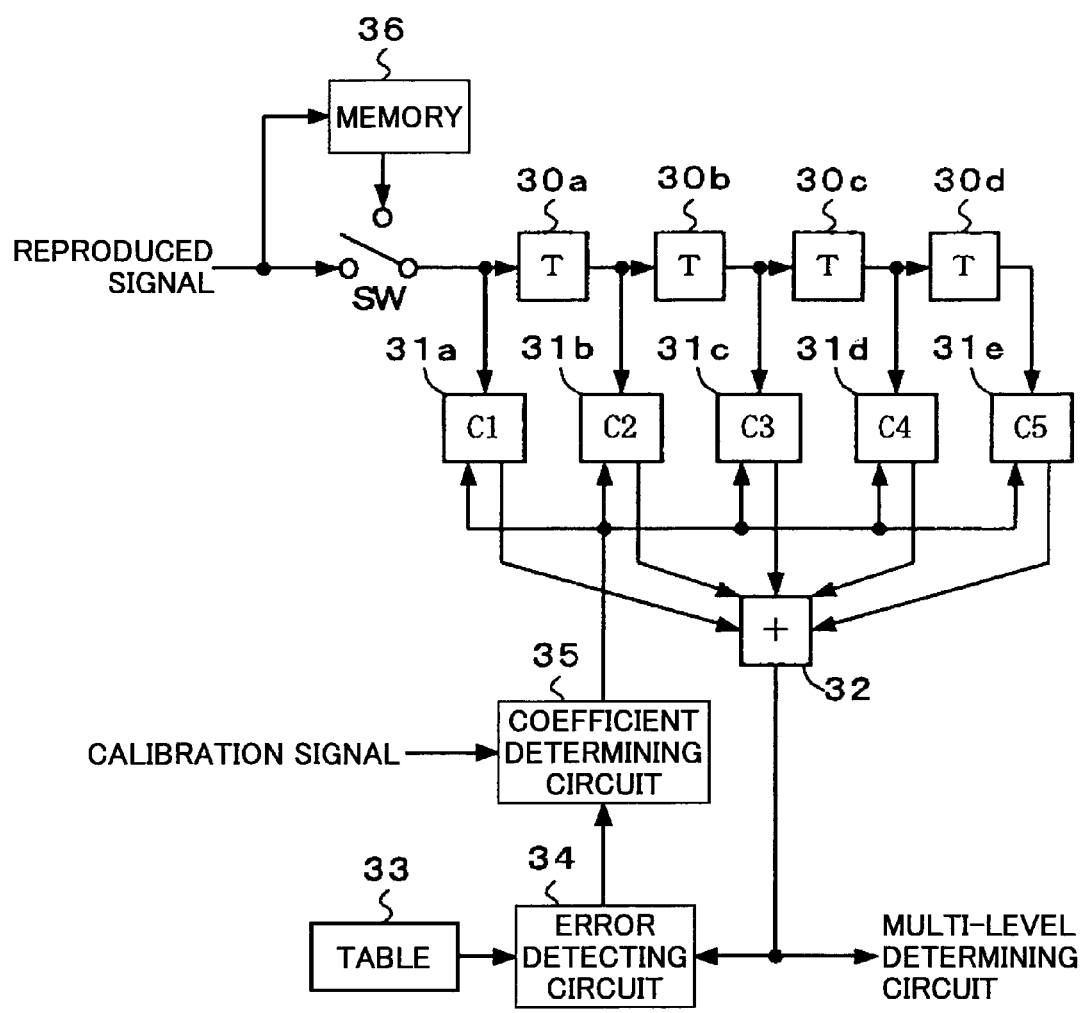
FIG. 6 is a block diagram showing a specific configuration example of a digital filter.

FIG. 6 is a block diagram showing a specific configuration example of the digital filter.

The digital filter shown in FIG. 6 is a transversal filter, and includes delay circuits 30a through 30d called taps; amplifiers 31a through 31e (C1 through C5 being referred to as tap coefficients); an adding/subtracting circuit 32; a table 33; an error detecting circuit 34; a coefficient setting circuit 35; a memory 36; and a switch SW.

Normally, a delay time 'T' of each of the delay circuits 30a through 30d is set as being equal to the cell period, or, may be an integral multiple of the clock interval.

In the example of FIG. 6, the number of the taps is 5. However, the number of the taps is not limited thereto, and, as the number of the taps increases, a larger advantage can be expected. In this circuit, attenuation may be carried out instead of amplifying. The amplifying coefficient or the attenuating coefficient is variable.

The delay circuits 30a through 30d delay the reduced signal by T each, and, the respective amplifying circuits 31a through 31e amplify or attenuate the reproduced signal and the outputs of the respective delay circuits 30a through 30d, respectively, by the respective tap coefficients.

The adding/subtracting circuit 32 processes the outputs of the respective amplifying circuits 31a through 31e. According to a necessity, it may actually carry out addition or subtraction. The output thereof is sent to a multi-level determination circuit in a subsequent stage.

The respective amplifying circuits 31a through 31e apply fixed amplifying coefficients when ordinary data is reproduced. However, when a calibration signal identifying the calibration area is generated by the synchronization detecting circuit or such, this means that predetermined multi-level information is recorded in the optical disk, and thus the error detecting circuit 34 compares a calibration signal (EQ output data) of the reproduced signal with a table data previously stored in the table 33 and outputs the comparison result. Then the coefficient setting circuit 35 changes the tap coefficients of the respective amplifying circuits 31a through 31e in sequence in such a manner as to minimize the error between the calibration signal and the table data based on the comparison result of the error detecting circuit 34.

This processing can be continued until the tap coefficients converge, when the calibration area is sufficiently long. As the tap coefficients, typical values are previously set as initial values. Thereby, it is possible to shorten a time required for the convergence. When the convergence cannot be achieved, the same calibration area may be accessed repetitively until the convergence of the tap coefficients is completed.

As an alternative way, the reproduced signal of the calibration area is previously taken in the memory 36 as a storage, and, until the convergence of the tap coefficients is completed, not the current reproduced signal, but a pseudo reproduced signal stored in the memory 36 may be repetitively output. In this manner, it is not necessary to repetitively access to the calibration area, and it is possible to carry out the repetition at a high speed for the convergence.

As the above-mentioned table data, ideal signal levels of multi-level patterns of the calibration area, i.e., for example, levels obtained as a result of a maximum amplitude level being uniformly divided, may be stored.

Figure 7:
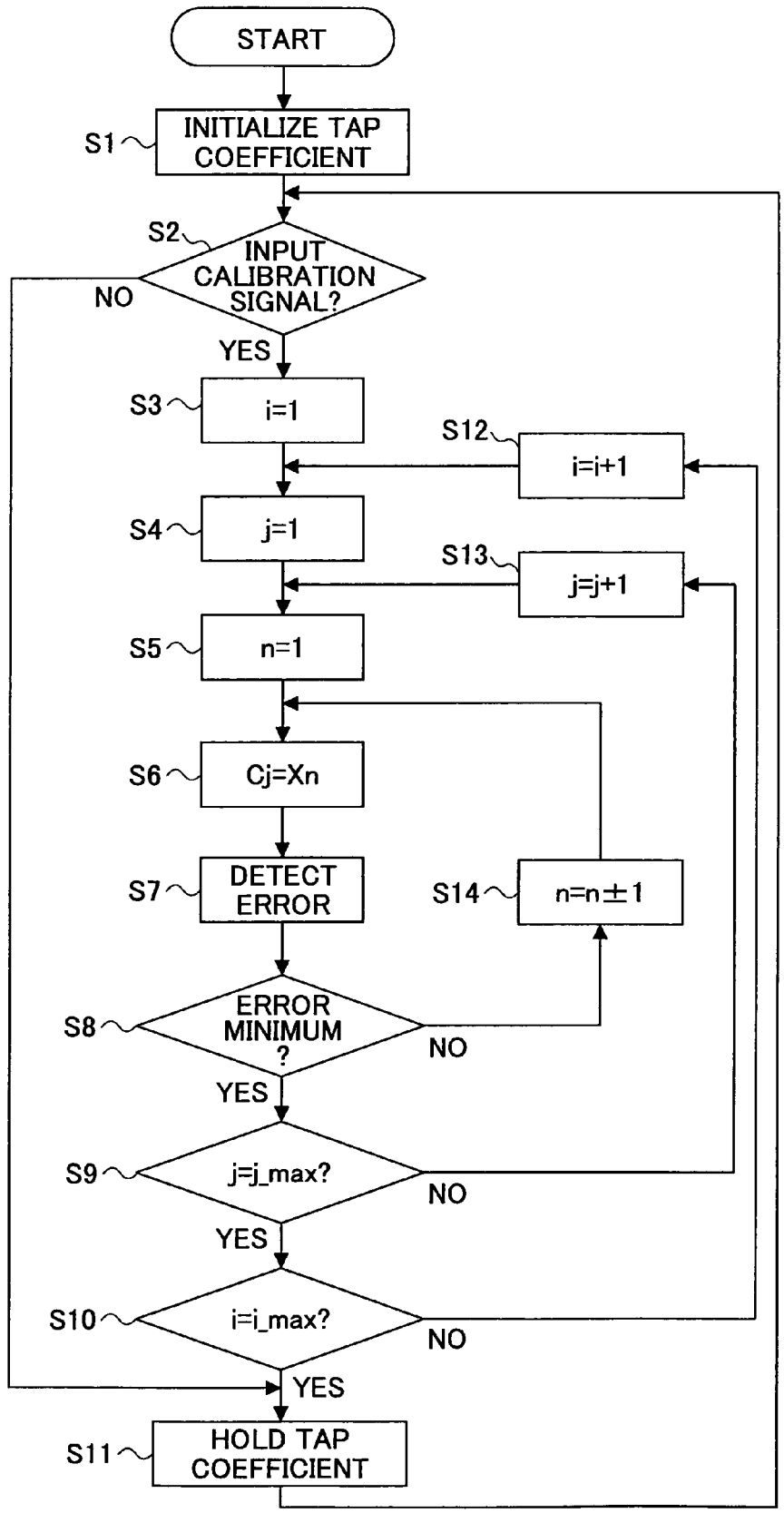
FIG. 7 is a flow chart showing processing of an algorithm of causing tap coefficients to converge.

FIG. 7 shows a flow chart of processing of an algorithm for causing the tap coefficients to converge.

First, in Step S1, the tap coefficients are initialized and held. In order to accelerate the convergence, average values obtained from an experiment, a simulation or such are preferably applied as the initial values.

In Step S2, it is determined whether or not the calibration signal is input. When the calibration signal is input, setting is made such that, i=1 in Step S3, j=1 in Step S4, and n=1 in Step S5. Also, in Step S6, a value X1 is set in the tap C1. In Step S7, waveform equalizing processing is carried out, the thus-obtained output signal is compared with the table data, the error is detected accordingly, and, in Step S8, it is determined whether or not the error becomes minimum. When the error is not minimum, processing of n=n+1 or n−1 is carried out in Step S14, Step S6 is returned to, and the above-described processing is repeated. That is, in the coefficient setting circuit, Xn is set in the specific tap C1, waveform equalizing processing is carried out, the output signal is compared with the table data, the error is detected, and, the value of the tap C1 is changed until the error is minimized.

When the error is minimized in Step S8, it is determined in Step S9, whether or not j=j_max. When j=j_max is not true, processing of j=j+1 is carried out in Step S13. Then, for the subsequent tap, the processing of minimizing the error the same as that described above is carried out. Thus, the above-described processing is carried out until the last tap Cj_max is reached. After the optimization is thus carried out throughout all the taps once, it is determined in Step S10 whether or not i=i_max, and, the above-described processing is repeated i_max times until it is determined that i=i_max. This is because, since correlation exists among the respective taps, optimization should be carried out also in a new condition once another tap is changed.

Intersymbol interference has a larger contribution coefficient between closer taps, and an influence degree of the tap coefficient differs. Accordingly, the convergence necessarily occurs. The order of the taps may be such that processing is started from the end of the amplifying circuit 31a or the amplifying circuit 31e in FIG. 6. However, generally speaking, the central amplifying circuit 31c is fixed in its coefficient, and, the amplifying circuits 31b and 31d having higher contribution coefficients are preferably optimized first. Further, the number of repetitions i_max or j_max may not be determined, and thus, repetition is continued until the minimum error is obtained. However, the maximum number of times of the repetition may be predetermined.

When it is determined in Step S10 that i=i_max is true, and thus, all the adjustment processing is finished, the thus-obtained tap coefficients are held in Step S11. A method of causing the tap coefficients to converge is not limited to this method, and any other well-known method may be applied instead. Further, for a case where, in front of the ADC, the EQ circuit may be disposed, and the same function is achieved in an analog manner, variable gain amplifiers or such should be applied as the amplifying circuits.

Figure 8:
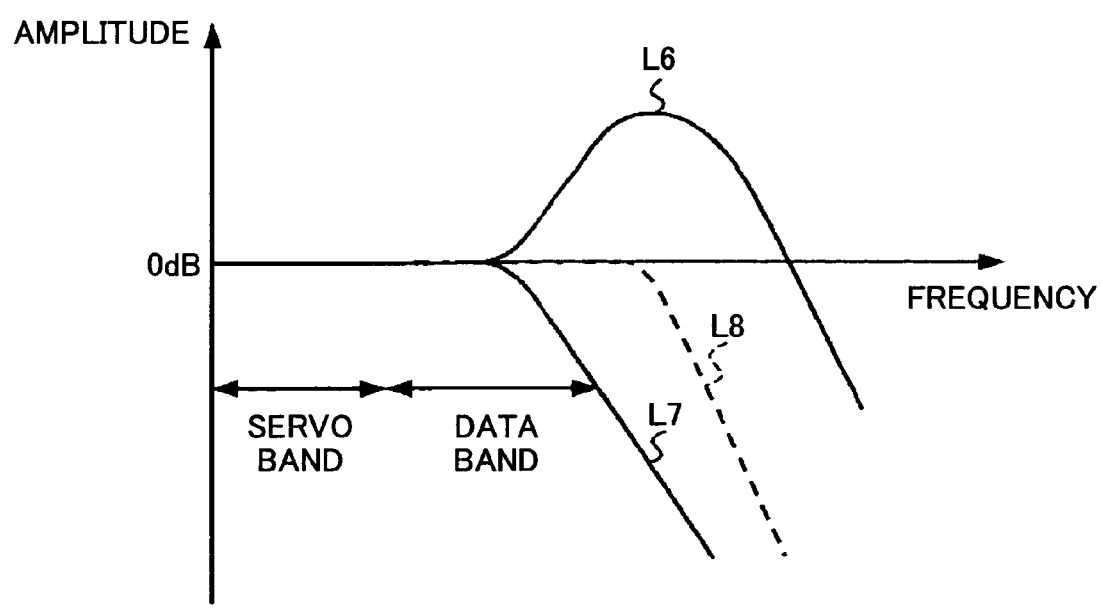
FIG. 8 is waveform diagrams showing an optical resolution and frequency characteristics of a waveform equalizer circuit.

FIG. 8 shows waveforms showing the optical resolution and the frequency characteristics of the waveform equalizer circuit.

A light spot diameter of light at a condensed point is determined by a wavelength and an NA (numeral aperture) of a condensing lens. From a series of marks and spaces having diameters larger than the light spot diameter, a difference in a magnitude of reflected light is saturated, and, thus, without regard to the size of the mark or space, a fixed signal level is obtained.

However, from a series of marks and spaces having sizes sufficiently smaller than the light spot diameter, a difference in a magnitude of reflected light is hardly obtained, and thus, an average signal level is obtained. From a series of marks and spaces in this range of size, the signal level changes according to the size. This is called optical resolution (MTF), and, when reproduction is carried out at a fixed speed from the series of marks and spaces, the magnitude of the reproduced signal can be regarded as representing the period of the signal detected. Accordingly, FIG. 8 is obtained in which the abscissa represents a frequency.

In a low band of MTF, a signal amplitude is fixed, and thus, 0 dB is obtained. From a point of a mark/space length equivalent to the light spot diameter, attenuation of the signal amplitude starts, as shown in FIG. 8.

In multi-level information recording, this band in which attenuation occurs is applied. From a signal of the band having the attenuation, attenuation characteristics should be corrected for the purpose of making it possible to determine a signal level from among the available multi-levels in the same way as that for a signal of another band having no attenuation. This processing is the waveform equalization (EQ) processing.

As shown in FIG. 8, as indicated by a waveform equalization characteristic curve (EQ characteristic curve) L6, the waveform equalizer circuit has a function of amplifying a specific band component so as to correct the attenuation characteristics of MTF indicated by an MTF curve L7. A signal having passed through the EQ circuit has, as indicated by a combined characteristic curve L8, flat amplitude characteristics are obtained throughout a data band applied for the multi-level recording, as a result of the MTF and the waveform equalizer characteristics being combined.

A very low band less than 5 kHz for example is ordinarily not applied since this band is applied as a servo band used for focusing or tracking control.

Figure 9:
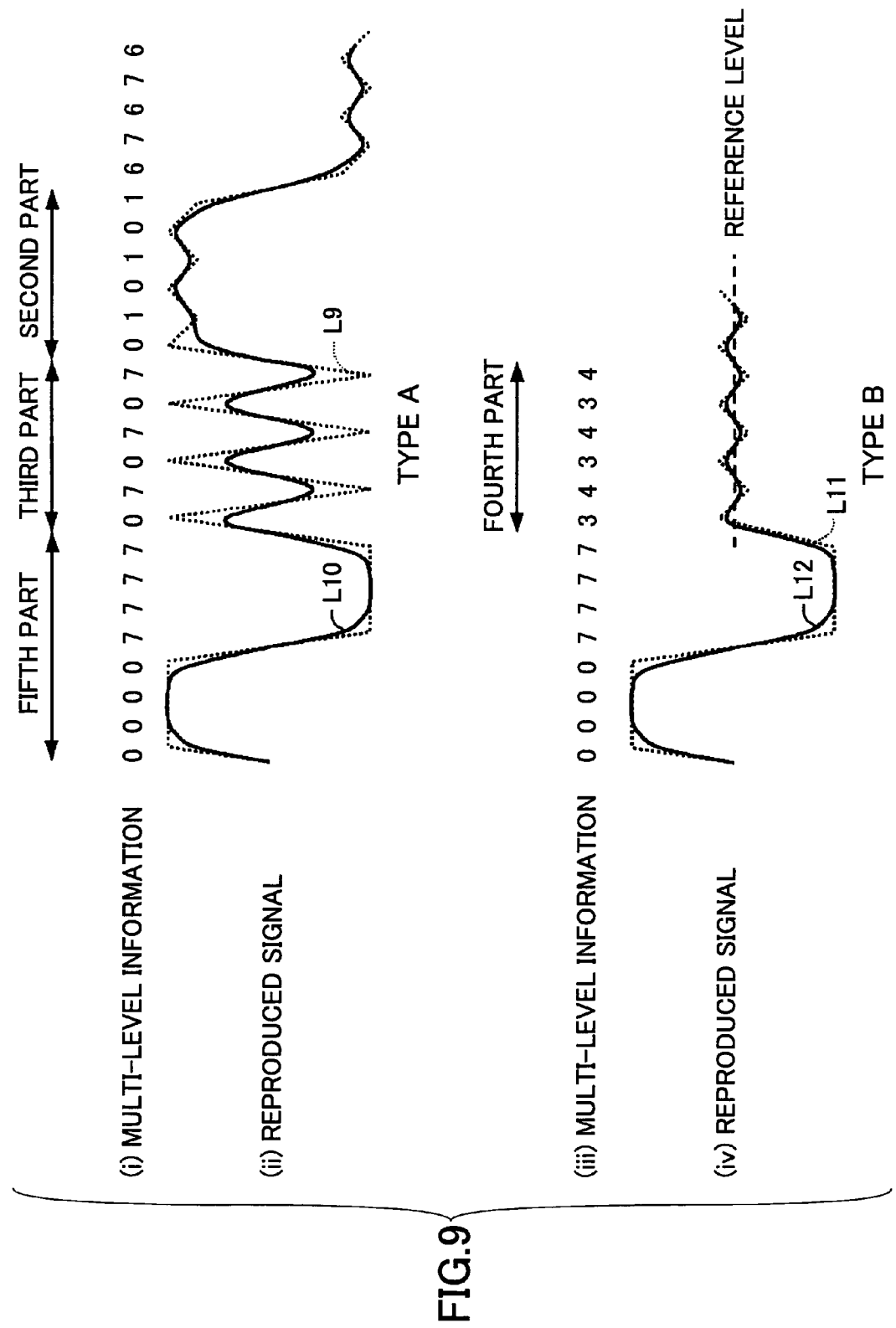
FIG. 9 illustrates an attenuated state of a reproduced signal due to MTF.

FIG. 9 illustrates an attenuated state of the reproduced signal due to the MTF.

As showing in FIG. 9, (a), in a fifth part in which multi-level information in a same value continues for each four cells ('0000' and '7777') as shown in FIG. 9, (i), a signal level of the reproduced signal has a sufficient amplitude as in a curve L10 shown in FIG. 9, (ii). However, in a third part in which the multi-level information changes every cell ('070707') as shown in FIG. 9, (i), the amplitude is attenuated as in the same curve L10 of the signal level of the reproduced signal, and thus, a deviation occurs from a curve L9 (broken curve) showing a signal level of an ideal reproduced signal.

Especially, in a combination of a large mark and no mark in which intersymbol interference remarkably appears, the deviation is large, and thus, it is determined as a completely different level when no waveform equalization is carried out.

By carrying out tuning of the frequency characteristics of the EQ circuit in such a manner as to correct the influence of intersymbol interference, it is possible to obtain a waveform similar to the ideal one from which the multi-level information determination can be accurately carried out.

Figure 10:
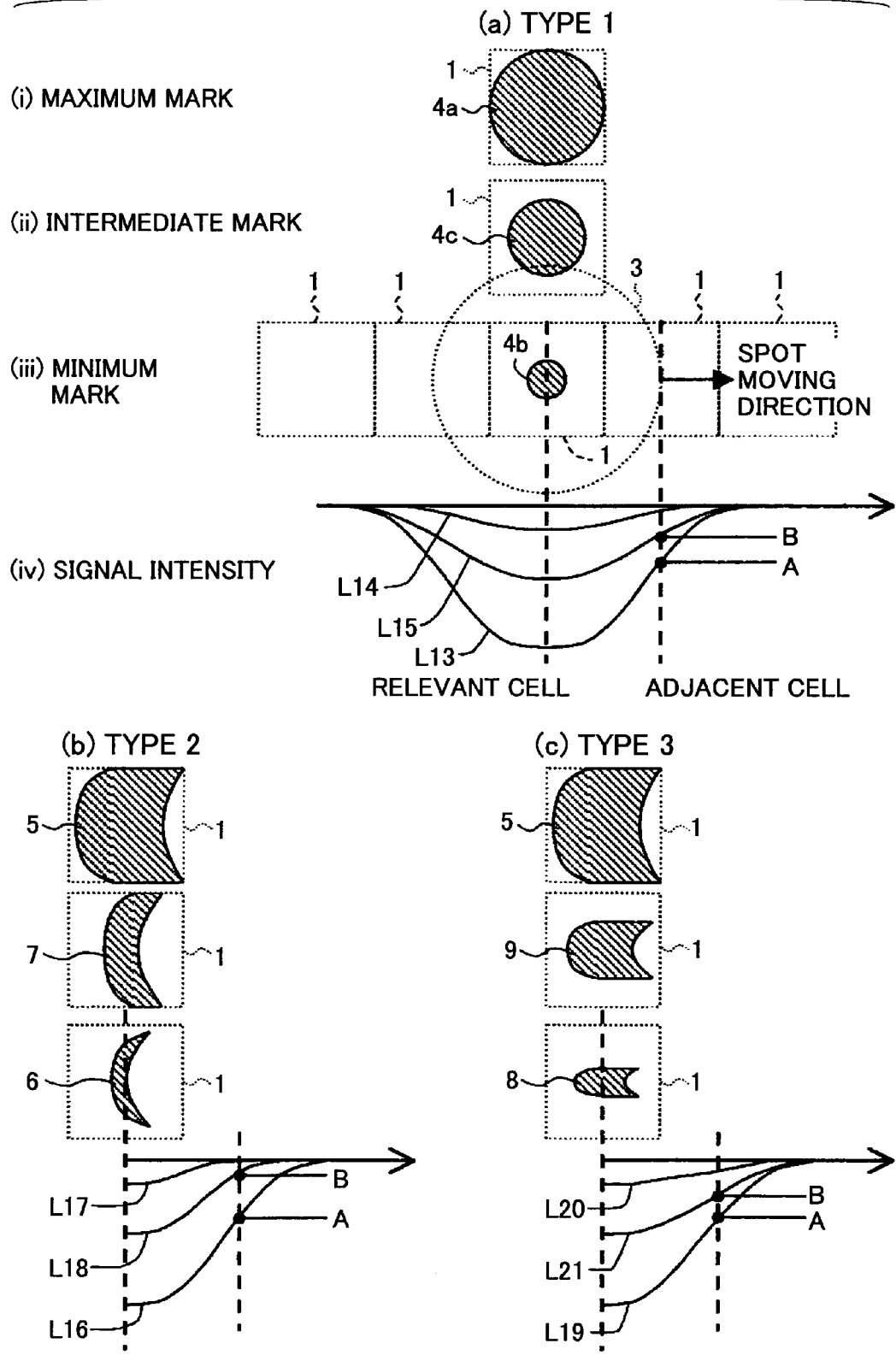
FIG. 10 illustrates non-linearity of intersymbol interference.

FIG. 10 illustrates non-linearity of intersymbol interference.

In FIG. 10, three types of patterns, i.e., types 1 through 3 ((a) through (c)), are shown. The type 1 shown in FIG. 10, (a) is an example in which intersymbol interference is linear. In this case, a mark is assumed to have a circular shape as shown.

Actually, the mark shape may not be limited thereto. The circular shape is applied here for the sake of simplification.

In the cells 1, marks having a plurality of different sizes are produced according to multi-level information. In this example, three sizes are shown, i.e., a maximum mark (maximum record mark) 4a, a minimum mark (minimum record mark) 4b and an intermediate mark (intermediate record mark) 4c from which a signal level half that of the maximum mark 4a is obtained. In preceding and subsequent cells, no marks are produced for the sake of simplification of influence of intersymbol interference. As can be seen from signal intensity curves L13, L14 and L15 shown in FIG. 10, (iv), which show reproduced signal levels from the above-mentioned three sizes of marks 4a, 4c and 4b, respectively, and the signal has a bottom level at the center of the relevant cell to reproduce. As shown, the signal level of the intermediate mark 4c is half the signal level of the maximum mark 4a.

In this type 1, the intersymbol interference has a linearity. As a result, also at the center of an adjacent cell (vertical broken line on the right side of FIG. 10, (iii) and (iv)), the intersymbol interference component B from the intermediate mark 4c is half the intersymbol interference component from the maximum mark 4a, as shown. For these characteristics, the frequency characteristics of the waveform equalizer circuit can be determined without regarded to the multi-level information.

However, an actual mark shape on an optical disk is not necessarily such an ideal one, but rather, in many cases, the type 2 shown in FIG. 10, (b) or the type 3 shown in FIG. 10, (c) may appear.

In the type 2 shown in FIG. 10, (b), a mark shape is different from that of the above-described type 1, and, a size of the mark mainly changes in a direction parallel to the track, i.e., the time-axis direction. In this type, a change in a length in a direction perpendicular to the track direction appears only for a smaller mark.

That is, also in FIG. 10, (b), three sizes, i.e., a maximum mark 5, a minimum mark 6 and an intermediate mark 7 from which a signal level half that of the maximum mark 5 are shown. From these three sizes of marks, respective signal levels indicated by curves L16 (maximum mark 5), L17 (minimum mark 6Y and L18 (intermediate mark 7), in the stated order, are obtained.

Also in this case, the reproduced signal intensities at the relevant cell centers are the same as those of the above-mentioned type 1. However, different results occur in the center of the adjacent cell (at a position of a vertical broken line on the right side).

That is, with respect to intersymbol inference component "A" from the maximum mark 5, the same "B" from the intermediate mark 7 is less than half.

That is, a change sensitivity of intersymbol interference with respect to a large mark is higher, and thus, the intersymbol interference component is nonlinear with respect to multi-level information.

The same as for the type 1, the mark shapes are determined merely for the sake of simplification, and are not limited to those shown.

In the type 3 shown in FIG. 10, (c), the shape of a maximum mark is the same as that of the above-mentioned type 2. However, other marks have different shapes. Also in this case, a maximum mark 5, a minimum mark 8 and an intermediate mark 9, from which a signal level half that of the maximum mark is obtained, are shown. From these three sizes of marks, respective signal levels indicated by curves L19 (maximum mark 5), L20 (minimum mark 8) and L21 (intermediate mark 9), in the stated order, are obtained.

In this type 3, characteristics opposite to those of the above-mentioned type 2 are shown. That is, a change sensitivity of intersymbol interference with respect to a larger mark is lower, and thus, also in this case, the intersymbol interference component is nonlinear with respect to multi-level information.

The curves of the signal intensity of the type 2 and the type 3 shown in FIG. 10, (b) and (c) are shown only for the half for the sake of simplification.

There, examples in which the spot shape is fixed, and the mark shapes differ have been described. However, when the spot shape or the intensity distribution thereof varies, further complicated nonlinearity appears, and this tendency becomes more remarkable in this case.

FIG. 11 illustrates an appearance of complicated nonlinearity when the spot shape or the intensity distribution thereof varies.

In FIG. 11, (b), a spot intensity corresponding to a signal level curve L22 at an end of a maximum mark 4a at an adjacent cell in a case where the spot diameter is large is a, while a spot intensity at an end of an intermediate mark 4c is b.

Similarly, a spot intensity corresponding to a signal level curve L22 at an end of a maximum mark 4a at an adjacent cell in a case where the spot diameter is small is a', while a spot intensity at an end of an intermediate mark 4c is b'. Since conditions are applied such that the power is equal between both cases, the peak intensity is reduced in the case of the large spot diameter.

When the spot is large, a>a', and b>b', and thus, intersymbol interference becomes larger. Furthermore, a/b is different from a'/b', and thus the intersymbol interference has nonlinearity.

Thus, nonlinearity occurs from a variation in the mark shape or the spot diameter.

If all the data (available sizes of the marks) appear in the uniform probabilities, intersymbol interference components of all the marks can be uniquely determined from an intersymbol interference component occurring from one mark when the intersymbol interference is linear. In such a case, the waveform equalizing characteristics can be determined from any pattern.

However, when the intersymbol interference is nonlinear, it is not possible to estimate an intersymbol interference component of each mark from an intersymbol interference component of a maximum mark for example, and thus, the waveform equalizing characteristics cannot be optimized therefrom.

Therefore, it is important to optimize the waveform equalizing characteristics with the use of a calibration pattern from which an average level of intersymbol interference is obtained. As this pattern from which an average level of intersymbol interference is obtained, first through fifth parts, described later, are applied according to the first embodiment of the present invention FIG. 12 illustrates a problem occurring from the above-mentioned nonlinearity of type 2.

In FIG. 12, horizontal broken lines indicate ideal multi-level information signal levels, and in this case, the respective signal levels correspond to those of total 8 levels.

When a specific pattern for determining the tap coefficients of the waveform equalizer circuit is obtained from multi-level information, i.e., a 'repetition of 0707' shown in FIG. 12, (a), the tap coefficients are obtained such as to remove the intersymbol interference component which is suitable to '0707'. In this case, actually, optimizing is carried out in such a manner as to correct the intersymbol interference of the maximum mark. Accordingly, excessive correction results for a case where, as in the type 2, the intersymbol interference change sensitivity is high for the maximum mark, as mentioned above.

In fact, after this correction has been made, when a curve L26 of a waveform from 0707, indicated by a solid curve in FIG. 12, (a), is input to the EQ circuit, amplification is carried out there so as to obtain a curve L25 shown in a broken curve in the same figure. As a result, ideal signal levels are obtained with the use of the thus-obtained curve L25. That is, in fact, from the multi-level information of "0" at the cell center, a reproduced signal d1 is detected, while, from the multi-level information of "7" at the cell center, a reproduced signal d2 is detected.

However, when a reproduced signal from multi-level information of a 'repetition of 3434' shown in FIG. 12, (b) is applied to the EQ circuit of the same tap coefficients, a problem occurs. That is, as shown in FIG. 12, (b), when a curve L28 of a waveform from 3434 indicated by solid curve is input, since the intersymbol interference is not so large in this case as that of the case of the above-mentioned maximum mark, excessive correction is carried out. In fact, after the correction, from the multi-level information of "3", a reproduced signal d2 is detected, while, from the multi-level information of "4", a reproduced signal d3 is detected. As a result, deviations occur from the signal levels of ideal reproduced signals d4 and d5, respectively. As a result, multi-level determination may be erroneously carried out.

The same result is obtained not only from the calibration pattern 0707, but also, from single value of multi-level information sandwiched by 0's (for example, 00700) in the above-mentioned prior art, or, a series of the same values of multi-level information (for example, 77777, or such).

Thus, optimization cannot be achieved when, as proposed in the prior art, when a pattern causing biased intersymbol interference is applied for correcting the characteristics of the waveform equalizer circuit, for a case where the intersymbol interference is nonlinear.

According to the first embodiment of the present invention, multi-level information pattern causing average intersymbol interference is applied to optimize the reproducing part and the waveform equalizer circuit. Thereby, it is possible to achieve a configuration by which intersymbol interference can be properly corrected for a system even having nonlinearity in the intersymbol interference.

Next, the multi-level information pattern causing average intersymbol interference, that is, the multi-level information pattern which can cause an average level of intersymbol interference components to adjacent cells occurring from marks according to all the available values of the multi-level information, according to the first embodiment of the present invention, is described.

Figure 13:
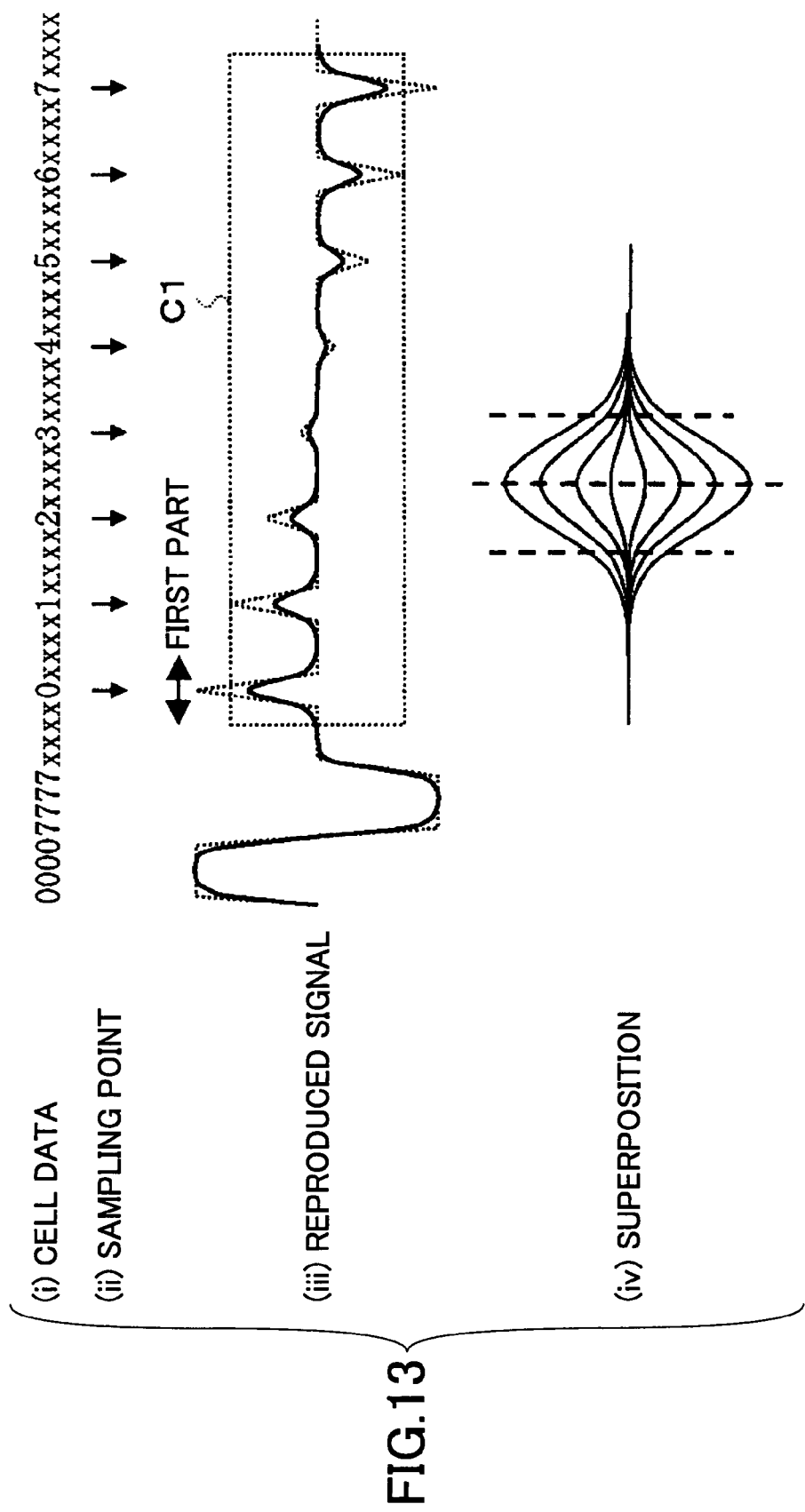
FIG. 13 illustrates a first calibration pattern.

FIG. 13 illustrates a first calibration pattern according to the embodiment of the present invention.

As cell data shown in FIG. 13, (i), a multi-level information series "00007777 . . . 7xxxx" are shown. The top "00007777" corresponds to the synchronization mark shown in FIG. 2.

A part enclosed by a broken line rectangle C1 in FIG. 13, (iii) shows a reproduced signal obtained from the calibration area including the first part in which one mark according to specific multi-level information is disposed, and, in preceding and subsequent cells thereof, marks corresponding to an intermediate signal level between a maximum signal level and a minimum signal level of the available levels of the multi-level information are disposed.

A value of multi-level information indicated by "x" in the cell data shown in FIG. 13, (i) corresponds to a value of multi-level information by which an intersymbol interference level at an adjacent cell has an average level in a reproduced signal. For example, in a case of 7-level multi-level recording (0 through 6), this value is "3" (the center of the numerals 0 through 6), or, in a case of 8-level recording (0 through 7), the value is "3.5" is applied (the center of the numerals 0 through 7). This value, including a decimal fraction, does not occur in an ordinary user area. However since this value is a preferable value for determining frequency characteristics of the waveform equalizer circuit, it is preferable to apply the level 3.5.

When a level 3 or a level 4 is applied instead of the level 3.5, a fixed effect should be obtained for improving the waveform equalizing characteristics, and thus, such an alternative may be applied.

It is noted that, for a case where appearance probabilities of marks corresponding to the respective values of multi-level information are not uniform, or such, the mark corresponding to the central value of the multi-level information may not necessarily correspond as it is to the average value of the intersymbol interference.

In this example, one mark according to a specific value of multi-level information is disposed, and, at least in preceding and subsequent cells, marks corresponding to an intermediate signal level between the maximum signal level and the minimum signal level are disposed, as mentioned above. Actually, as shown in FIG. 13, (i), a level 0 through a level 7 are arranged in sequence, each of which corresponds to the above-mentioned specific value of the multi-level information. The intermediate signal level corresponds to the level 3.5 ("x"). Further, in this example shown, the above-mentioned at least preceding and subsequent cells correspond to preceding and subsequent four cells of each of the above-mentioned marks according to the specific values of the multi-level information, as shown in FIG. 13, (i).

Thus, when the mark according to the specific value of the multi-level information is disposed together with marks of the intermediate level disposed to sandwich the first mark, the correction can be carried out more accurately when the above-mentioned series of marks are regarded as one set, a plurality of the sets with the specific values of the multi-level information are arranged as shown in FIG. 13, (i), and the reproduction characteristics are corrected therewith as a calibration pattern.

Further, the number of marks of the intermediate level attached to each mark of the specific value is preferably determined as being more than the number of cells, for which influence of intersymbol interference reaches.

In FIG. 13, (iv), with a central focus on respective sampled points indicating the cell center at which the respective marks according to the specific values of multi-level information are disposed, reproduced signals are superposed. As can be seen, at the sampled point, all the eight levels 0 through 7 could be separated, and, on vertical broken lines at adjacent cell positions, it can be also seen that intersymbol interference of the levels 0 and 7 occur in such a manner that the interference levels are different from the level 3.5 by an equal amount each or equal separations. From this point, it can be said that average intersymbol interference has occurred from the calibration pattern shown in FIG. 13, (i).

Thereby, without applying a redundant calibration pattern covering all the possible types of intersymbol interference, it is possible to efficiently carry out optimizing of the waveform equalizer circuit with the use of average intersymbol interference obtained from the calibration pattern such as that shown in FIG. 13, (i).

Figure 14:
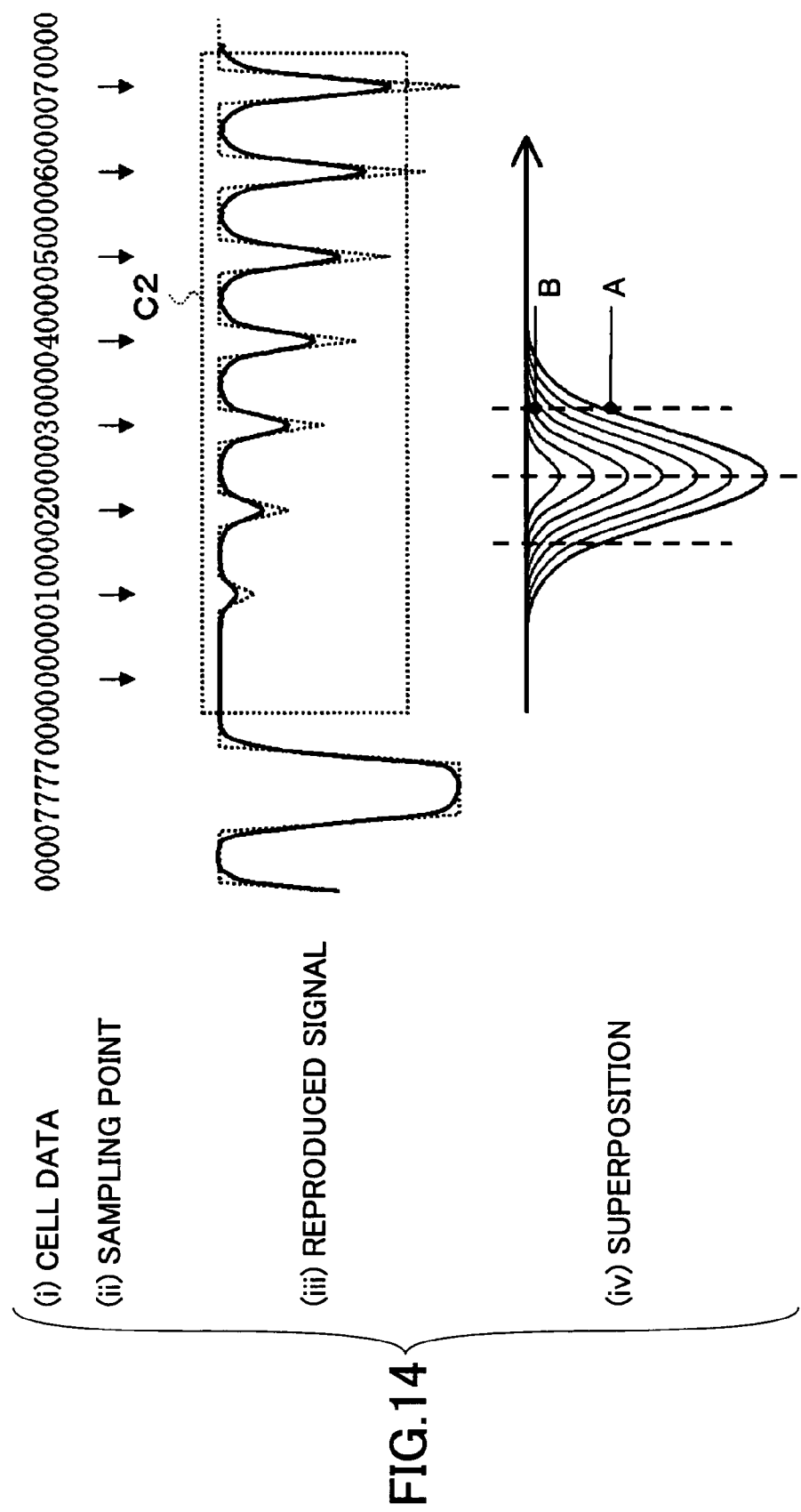
FIG. 14 illustrates another example of the first calibration pattern.

FIG. 14 illustrates another example of the first calibration pattern.

A part C2 enclosed by a broken line rectangular in FIG. 14, (iii) shows a reproduced signal obtained from a calibration area including the first part in which a mark according to a specific value of multi-level information is disposed, and also, in preceding and subsequent cells thereof, marks corresponding to a certain level are disposed.

However, in FIG. 14, (i), as the cell data, the level 0 is applied as the above-mentioned certain level "x".

This is a pattern disclosed by the above-mentioned prior art. However, as shown in FIG. 14, (iv), in which reproduced signals are superposed with a central focus on the respective sampled points in the same manner as that of FIG. 13, (iv), on the vertical broken lines at the adjacent cells, it is seen that a level B is not half a level A and, and is rather greatly biased toward the side of the level 0, where the level A corresponds to the multi-level information of the level 7 at the sampled point while the level B corresponds to the multi-level information between the levels 3 and 4.

Contrary, assuming that the level 7 is applied as "x" instead of 0 as in FIG. 14, (i), the above-mentioned level B is biased to the side of the level 7, contrary thereto in this case. Therefrom, it is seen that the characteristics of the EQ circuit will be optimized to a biased one, according to the nonlinearity of the intersymbol interference when the level 0 or the level 7 is applied as "x".

Further, since the calibration pattern should be configured by a predetermined multi-level information pattern, it should be stored separately from user information.

Especially, the calibration pattern is preferably written at a position which is reproduced in prior to the user information, That is, for example, a top of a data area, an innermost area in which media parameters are stored, an optimum recording power test area or such may be applied.

Next, the calibration area including the second part in which multi-level information corresponding to the highest two levels or the lowest two levels of the signal levels is disposed alternately and the third part in which marks corresponding to the maximum signal level and the minimum signal level are disposed alternately, according to the first embodiment of the present invention, is described.

Description is made with reference to the type A shown in FIG. 9, (a).

In the type A, "00007777" corresponds to an example of the synchronization mark.

In this case, two types of patterns are required. An example of the above-mentioned arrangement of the third part in which the marks correspond to the maximum signal level (7) and the minimum signal level (0) are disposed alternately corresponds to "070707" shown in FIG. 9, (i). This typically represents a case where the intersymbol interference becomes maximum.

An example of the arrangement of the above-mentioned second part in which the multi-level information corresponding to the highest two levels (0 and 1) are disposed alternately corresponds to "010101" shown in FIG. 9, (i). This typically represents a pattern in which intersymbol interference becomes small.

Further, an example of the arrangement of the above-mentioned second part in which the multi-level information corresponding to the lowest two levels (7 and 6) is disposed alternately corresponds to "676767". This also typically represents a pattern in which intersymbol interference becomes small.

On the other hand, by applying the type 2 and the type 3 shown in FIG. 10, (*b*) and (*c*), it is possible to obtain the calibration characteristics the same as the case where intersymbol interference occurs in an average manner, as a result of optimizing the characteristics of the waveform equalizer circuit with the use of the pattern including a combination of the case where intersymbol interference is larger and the case where the same is smaller (corresponding to the combination of the first part and the second part mentioned above), whether or not either one thereof corresponds to the smaller/larger value.

This way is said to be equivalent to a case where both the case where "0" is applied as "x" and the case where "7" is applied as "x" in the above description are carried out as a combination. However, the above-mentioned method is achieved with a shorter calibration area.

Next, the calibration area including the fourth part in which marks corresponding to a combination of two signal levels sandwiching a reference level, symmetrical and closest to the reference level are disposed alternately, where the reference level is the intermediate level between the maximum signal level and the minimum signal level, according to the first embodiment of the present invention, is described.

Description is made with reference to a calibration pattern shown as the type B in FIG. 9, (*b*).

The same as the above-mentioned type A, the synchronization pattern is disposed at the top. As the above-mentioned arrangement in which a combination of two signal levels (3 and 4 for example) sandwiching a reference level, which are symmetrical and closest to the reference level (3.5 in the example), are disposed alternately, where the reference level is the intermediate level between the maximum signal level and the minimum signal level, corresponds to "343434" in the case of 8-level recording, as shown in FIG. 9, (iii).

Since the reference level is 3.5 as mentioned above, a combination of levels symmetrical and closest thereto correspond to levels 3 and 4 as mentioned above. On the other hand, in the case of 7-level recording, since the reference level is 3, a combination of levels symmetrical and closest thereto correspond to levels 2 and 4.

As also described with reference to the types 2 and 3 shown in FIG. 10, (*b*) and (*c*), when intersymbol interference is nonlinear, an average thereof may not correspond to the half the level A but to the intersymbol interference B of the intermediate level.

Thus, it can be said that, to optimize the characteristics of the EQ circuit means to carry out optimization in a condition where approximately average intersymbol interference occurs.

Next, the fifth part in which at least two marks corresponding to the above-mentioned maximum signal level and the above-mentioned minimum signal level are disposed successively according to the first embodiment of the present invention is described.

This arrangement that at least two marks corresponding to the above-mentioned maximum signal level (0) and the above-mentioned minimum signal level (7) are disposed successively corresponds to the part of "00007777" (synchronization pattern) in the type A or the type B shown in FIG. 9.

When this pattern is the same as the synchronization pattern as mentioned above, the same pattern may be applied in common for both purposes. Further, this pattern may be applied not for the waveform equalizer circuit for the cell frequency band, but for optimizing waveform equalizer circuit characteristics for a lower frequency band.

As described above, a combination between the waveform equalizer circuit characteristics and the MTF should result in flat characteristics. Accordingly, not only characteristics for the cell frequency band but also characteristics for a lower frequency band is important, and thus, correction should be made for both.

Further, a meaning of a series of marks of same multi-level information in the case of multi-level recording is that, since marks of a series of same multi-level information are equivalent to one large mark, to marks of "00007777" is equivalent to a long mark and a long space satisfactorily satisfying the optical resolution, when the marks are reproduced. As a result, no intersymbol interference occurs in this case.

In this case, correction is carried out on the waveform equalizer circuit for a flat band in terms of MTF, and thus, flat characteristics are required in the waveform equalizer circuit in this case.

Accordingly, by disposing the pattern in which the marks corresponding to each of the maximum signal level and the minimum signal level are disposed successively, optimization of the waveform equalizer circuit for the low frequency band can be carried out.

The specific number of the above-mentioned at least two marks to be disposed successively should be determined in such a manner that a long mark may be produced therefrom having a size larger than the optical resolution, and the continuous length should preferably exceed the light spot diameter.

Next, examples of a multi-level information reproducing apparatus and a multi-level information recording apparatus according to the above-described first embodiment of the present invention are described.

Figure 15:
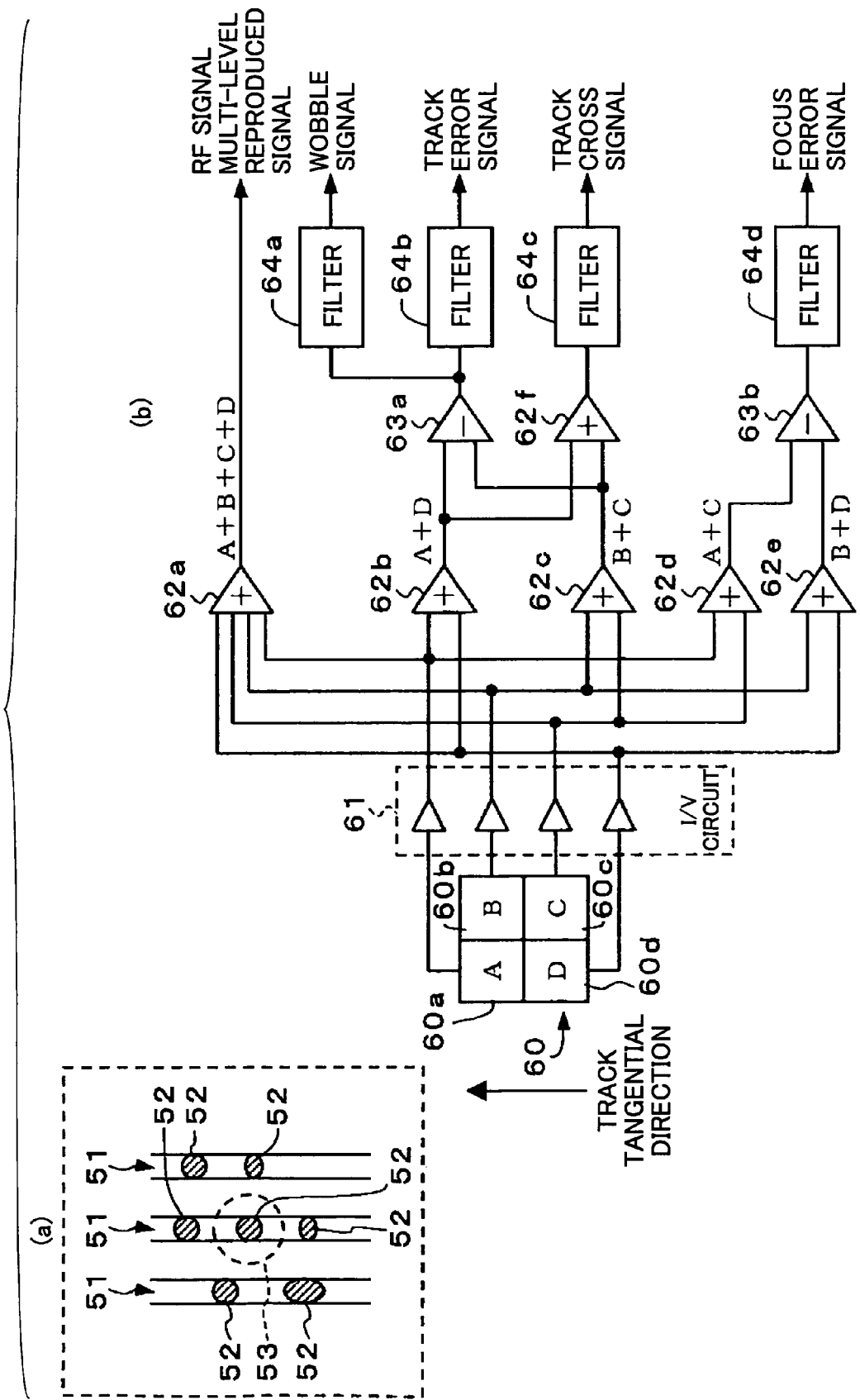
FIG. 15 shows one example of a signal processing block around a light receiving device receiving reflected light of a light beam once applied to an optical disk, and extracting various signals.

FIG. 15 shows a circuit diagram of a signal processing block around a light receiving device for receiving reflected light of a light beam once applied to an optical disk (multi-level information recording medium) and extracting various signals therefrom.

As shown in FIG. 15, (*a*), tracks 51 are engraved on the recording-type optical disk as guide grooves, and in the tracks 51, record marks 52 are disposed. The tracks 51 wobbles. The light beam is applied to the optical disk, and a light spot 53 is produced thereon.

As shown in FIG. 15, (*b*), and the reflected light from the optical disk is received by a four-divided light receiving device (PD) 60. The four-divided light receiving device 60 is divided into four light receiving elements 60a through 60d by dividing lines corresponding to the track tangential direction of the disk surface and a direction perpendicular thereto. Output signals of the respective light receiving elements 60a through 60d are simply refereed to as A through D, respectively.

Since the outputs of the respective light receiving elements 60a through 60d are electric current signals, they are converted into voltage signals by an I/V circuit 61. The system up to this part is commonly referred to as an optical system. From the signals thus converted into the voltages, various signals are extracted by operating circuits in a subsequent stage. First, in an adding circuit (adding amplifier) 62a, the output signals of the respective light receiving elements 60a through 60d are added together, and therefrom, an RF signal or a multi-level reproduced signal (A+B+C+D) is output.

Further, in an adding circuit 62b, the output signals of the respective light receiving elements 60a and 60d are added and the thus-obtained added signal (A+D) is output. Similarly, in an adding circuit 62c, the output signals of the respective light receiving elements 60b and 60c are added and the thus-obtained added signal (B+C) is output. Then, in an adding circuit 62f, the added signal (A+D) and the added signal (B+C) are added together, then, the thus-obtained signal is made to pass through a filter 64c, and therefrom, a track cross signal (A+B+C+D), which is a low frequency signal, is output.

Further, in a subtracting circuit 63a, the added signal (B+C) is subtracted from the added signal (A+D), then the thus-obtained signal is made to pass through a filter 64b, and therefrom, a track error signal (A+D)−(B+C), which is a low frequency signal, is output. This track error signal is also referred to as a push-pull signal.

Further, in an adding circuit 62d, the output signals of the respective light receiving elements 60a and 60c are added and the thus-obtained added signal (A+C) is output. Similarly, in an adding circuit 62e, the output signals of the respective light receiving elements 60b and 60d are added and the thus-obtained added signal (B+D) is output. Then, in a subtracting circuit 62b, the added signal (A+C) and the added signal (B+D) are subtracted therebetween, then, the thus-obtained signal is made to pass through a filter 64d, and therefrom, a focus error signal (A+C)−(B+D), which is a low frequency signal, is output.

These track cross signal, the track error signal and the focus error signal are referred to as servo signals, which are applied to move a light beam, and keep the same at a target position on the optical disk (focusing and tracking).

The signal (A+D)−(B+C) output from the subtracting circuit 63a and output from the filter 64a, which is the high frequency signal, is a wobble signal.

This signal is obtained with the use of the same circuit as that of the track error signal. However, the signal may be obtained with the use of another circuit, or various correcting circuits may be inserted before the subtracting circuit (subtracting amplifier).

Commonly, the system up to this part is referred to as a servo signal detecting system, and is applied to control a mechanism system. Further, since the reproduced signal (RF signal) is preferably processed by a separate high-frequency-band circuit, the four signals are directly added together and processed after being output from the I/V circuit 61. The CM signal is obtained from the RF signal.

The above-described method is a most simple operating method for obtaining the various signals. However, the dividing configuration of the light receiving device (PD) is not limited to that described above, and, another dividing configuration in which the PD is further finely divided, or is coarsely divided into two or three divisions, may be applied instead depending on the number of light beams applied, a configuration of a light path or such. Depending on each particular light receiving manner, the signal operating method should be optimized. A case where the various signals are detected from a plurality of light beams including a main beam and a sub-beam, may also be applied.

For example, as a method of obtaining the track error signal, a three beam method in which operation is carried out on three light beams received, and a differential push pull (DPP) method or such may be applied. The track cross signal is also obtained according to the three beam method. The track error signal may be obtained according to a differential phase detection (DPD) method instead. Further, the focus error signal may be obtained from another light receiving device according to a knife edge method or such.

That is, the operating method to obtain the various signals should be optimized according to the detecting method actually applied, and the specific method of extracting the signals from the disk may be freely selected.

Figure 16:
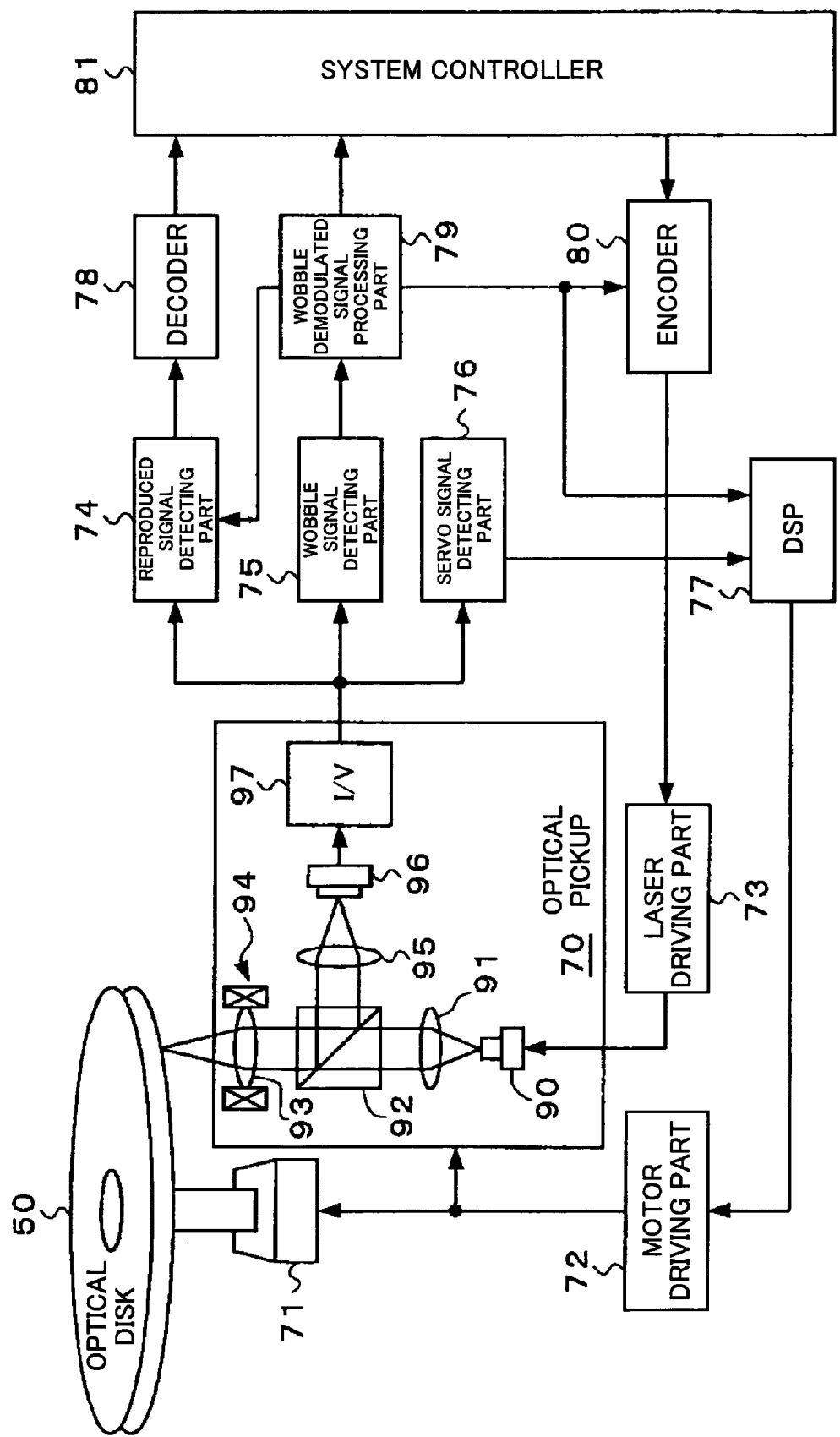
FIG. 16 is a block diagram showing an information recording and reproducing apparatus according to a multi-level information reproducing apparatus and a multi-level information recording apparatus according to the first embodiment of the present invention.

FIG. 16 shows an information recording and reproducing apparatus which is an embodiment of a multi-level information reproducing apparatus and a multi-level information recording method according to the above-described first embodiment of the present invention.

This information recording and reproducing apparatus includes an optical pickup 70 in which an optical system is mounted, a plurality of motors including a seek motor moving the pickup 70, a spindle motor rotating an optical disk 50, and so forth (those other than the spindle motor 71 is not shown), a mechanism system including a loading system for setting the optical disk 50 (not shown), and various electric system. The electric system may be included in the mechanism system or in the optical system.

The optical system 70 includes a semiconductor laser light source 90 such as a laser diode (LD), a lens 91 transforming laser light emitted by the semiconductor laser light source 90 into parallel light, a prism 92, a lens 95 leading the laser light to respective light receiving elements of a four divided light receiving device 96, an objective lens 93 condensing the laser light for a light spot on the optical disk, an actuator 94 controlling a position of the objective lens 93 so as to cause the light spot to follow a desire position on the optical disk 50, the four divided light receiving device 93 and an I/V circuit 97.

The four divided light receiving device 93 corresponds to the four divided light receiving device 60 shown in FIG. 15, and the I/V circuit 97 corresponds to the I/V circuit 61 shown in FIG. 15.

A system controller 81 of the electric system receives data (information) from an external apparatus (for example, a host computer, such as a personal computer) to be written to the optical disk 50, an encoder 80 encodes the thus-obtained data into an information series to record in the optical disk 50, and after that, conversion such as modulation is carried out. A laser driving part 73 determines appropriate laser light emitting timing or intensity thereof from the information series for recording it in the optical disk 50, and therewith, causes the semiconductor laser light source 90 to emit the laser light accordingly. When reproduction is carried out, the laser driving part 73 causes the semiconductor laser light source 90 to emit stable laser light with a reproducing intensity to the optical disk.

Reflected light from the optical disk 50 is then converted into an electric signal by the four divided light receiving device (PD) 96, and is then converted into voltage signals which are easily processed, by the I/V circuit 97. The PD 96 and the I/V circuit 97 may be integrated into a unit.

After that, signal processing is carried out by a reproduced signal detecting part 96, a wobble signal detecting part 75, a servo signal detecting circuit 76 and so forth to obtain a reproduced signal, a wobble signal, a servo signal, and so forth, respectively. Another way may also be applied in which, processing is carried out to obtain the various signals in a condition of the outputs (electric currents) of the PD 96 as they are, and, after that, these signals are converted into voltage signals.

The reproduced signal detecting circuit 76 corresponds to the adding circuit 62a of FIG. 15, the wobble signal detecting circuit 75 corresponds to the adding circuits 62b and 62c, the subtracting circuit 63a and the filter 64a of FIG. 15, and the servo signal detecting circuit 76 corresponds to the adding circuits 62c through 62f, the subtracting circuits 63a, 63b and the filters 64b through 64d. Further, the reproduced signal detecting circuit also corresponds to the multi-level information detecting circuit shown in FIG. 5.

Although the detection of the wobble signal is obtained separately in the above-described example, the same may be generated from an internal signal of the servo signal detecting circuit 76. The thus-detected wobble signal is input to a wobble demodulated signal processing part 79.

The wobble demodulated signal processing part 76 includes a recording clock generating part and a demodulating part, and detects a wobble synchronization signal, address information, a recording clock signal and layer information. The wobble synchronization signal, address information, the recording clock signal and the layer information are provided to the system controller 81 and the encoder 80 for obtaining a current position on the optical disk 50 or such. The recording clock signal becomes a reference signal applied in the encoder 80 or a DSP 77 when data is recorded in the optical disk 50.

Various operations are carried out on the servo signal in the servo signal detecting circuit 76, a moving amount of the optical pickup 70 or the actuator 94 is calculated by the DSP 77 from an error between the detected spot position and a target position on the optical disk 50, and therewith, the seek motor or the actuator 94 is operated in order that the laser light spot should follow the desired position. Based on a clock signal detected from the wobble signal or the reproduced signal, a rotational speed of the optical disk 50 is detected, is compared with a target one, and therewith, a rotational speed of the spindle motor 71 is controlled through the motor driving part 72.

When reproduction is carried out, the reproduced signal detecting part 74 extracts the reproduced signal which is a high frequency band component with the use of a filter. Further, also with the use of a CM detecting part, the obtained clock signal is applied to quantize the reproduced signal by means of an ADC. A reproduced clock signal thus obtained from the reproduced signal processing part 74 is applied as a reference clock signal for the reproduction system. However, instead, a wobble clock signal may be applied when coarse synchronization pulling is carried out. Based on the thus-obtained quantized data, waveform equalization is carried out by a waveform equalizer circuit, and thus, determination for multi-levels is carried out. Then, a decoder 78 carries out various modulation operations and decoding operation, and thus, obtains reproduced information. The reproduced information is transferred to the outside via the system controller 81, for example, to the host computer such as a personal computer.

In this embodiment, a reproduced signal is obtained from a multi-level pattern series indicating an average level of intersymbol interference component to adjacent cells occurring from marks according to all the available multi-level information. Then, frequency characteristics of a reproducing part is optimized for the reproduced signal. Accordingly, even for a system having nonlinearity in intersymbol interference for multi-level information, it is possible to optimize the frequency characteristics of the reproduction system with the use of a short calibration pattern, and to establish a reproduction system with a high reliability and high compatibility.

Further, it is preferable to include optimizing of frequency characteristics of a waveform equalizer part in the above-mentioned optimizing of the frequency characteristics of the reproducing part. In the waveform equalizer part which is a main part for correcting the intersymbol interference, a time is required to optimize tap coefficients in general. Therefore, according to the first embodiment of the present invention, since the short and efficiently calibration pattern is applied, it is possible to expect remarkable reduction of the time required for the optimizing. As a result, it is possible to expect high speed access and reproduction of data as well as establishment of a reproduction system with a high reliability and high compatibility.

Further, a calibration area including a first part in which one mark according to a specific value of multi-level information as well as, in preceding and subsequent cells, marks corresponding to an intermediate level between a maximum signal level and a minimum signal level are disposed, is preferably disposed in a separate position as that of a user information area. Thereby, even for a system having nonlinearity of intersymbol interference, it is possible to accurately optimize a reproducing part even with a short pattern efficiently. As a result, it is possible to provide an optical disk (medium) having high reliability and high compatibility.

Further, a calibration area including a second part in which multi-level information corresponding to highest two levels of a signal level is alternately disposed, or multi-level information corresponding to lowest two levels of a signal level is alternately disposed, and a third part in which marks corresponding to a maximum signal level and a minimum signal level are alternately disposed, is preferably disposed in a separate position as that of a user information area. Thereby, even for a system having nonlinearity of intersymbol interference, it is possible to accurately optimize a reproducing part even with a short pattern efficiently. As a result, it is possible to provide an optical disk (medium) having high reliability and high compatibility.

Further, a calibration area including a fourth part in which marks corresponding to two signal level in a combination in which the signal levels are symmetrical with respective to a reference level and are closest thereto are alternately disposed, where the reference level is an intermediate level between a maximum signal level and a minimum signal level, is preferably disposed in a separate position as that of a user information area. Thereby, even for a system having nonlinearity of intersymbol interference, it is possible to accurately optimize a reproducing part even with a short pattern efficiently. As a result, it is possible to provide an optical disk (medium) having a high reliability and high compatibility.

Further, by further providing a fifth part in which a pattern in which two or more marks corresponding to each of a maximum signal level and a minimum signal level is disposed, in addition to the above-mentioned effect, it becomes possible to carry out optimizing of the waveform equalizing characteristics also for a low band, and thus, it is possible to further improve the reliability and compatibility.

Further, it is preferable to input a reproduced signal obtained from the above-mentioned calibration area of the multi-level information recording medium to the waveform equalizer part, compares an output thereof with a previously stored target value, and set characteristics of the waveform equalizer part in such a manner as to minimize the error. Thereby, it is possible to optimize the characteristics of the waveform equalizer part efficiently and accurately with a short (calibration) pattern, and thus, it is possible to generate multi-level information from which multi-level determination can be accurately carried out even when various fluctuations or variations occur.

Further, it is preferable in the above-mentioned waveform equalizer part to store the reproduced signal obtained from the calibration area in a storage, and to optimize the characteristics of the waveform equalizer part with the use of pseudo reproduced signal repetitively output from the storage. Thereby, it is possible to reduce a size of the calibration area required for the waveform equalizer characteristic optimization, or, it is possible to avoid repetitive access to the calibration area. Accordingly, it is possible to ensure the storage capacity of the optical disk, and also, it is possible to apply the present invention to a system seeks a high speed reproduction performance.

Further, it is preferable to provide an optical system for obtaining a reproduced signal from a multi-level information recording medium, a servo mechanism system for moving the optical system to a target position and keeping the state, a synchronization detecting part identifying the above-mentioned calibration area from the reproduced signal and outputting a calibration signal indicating the calibration area, a waveform equalizer part optimizing characteristics based on the calibration signal and keeping it, and a multi-level determining part demodulating multi-level information from an output of the waveform equalizer part, and thus reproduce user information. Thereby, it is possible to provide a multi-level information reproducing apparatus with a high reliability and with a high compatibility.

Further, it is preferable to provide an optical system for producing record marks according to input multi-level information and a servo mechanism system moving the optical system to target position and keeping the state, and record not only user information but also the calibration pattern for the waveform equalizer part in a form of being included in multi-level information. Thereby, it is possible to provide a multi-level information recording apparatus with a high reliability and with a high compatibility, and also, to provide an information recording medium therefor.

A multi-level information reproducing method, a multi-level information recording medium, a multi-level information equalizing device, a multi-level information reproducing apparatus and a multi-level information recording apparatus according to the present invention do not depend on a laser wavelength or parameters of an optical system, and, thus, are applicable not only to a DVD as in the above-described embodiment, but also to a system in which super-resolution technology is applied with the use of a blue laser.

Figure 17:
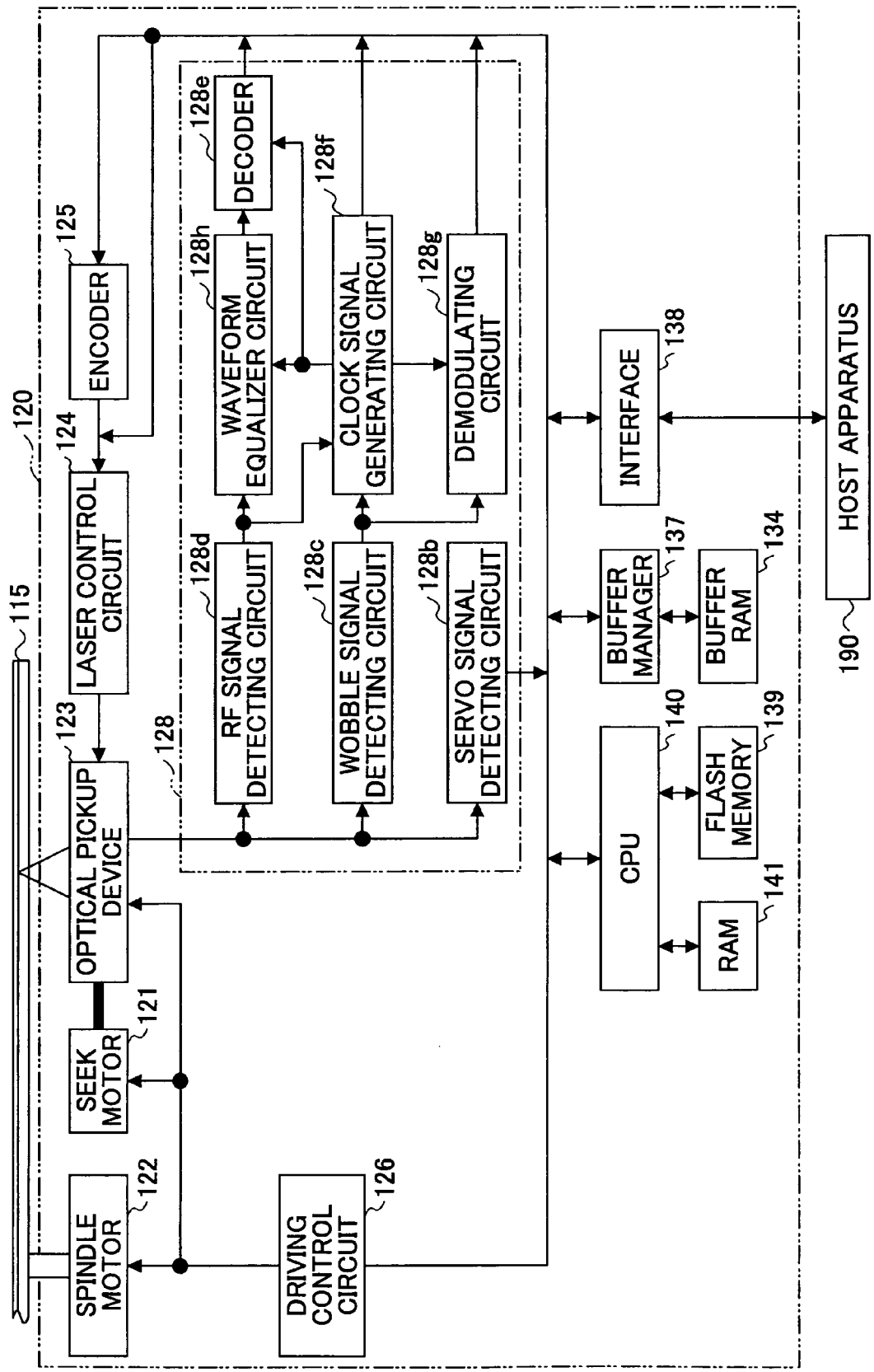
FIG. 17 is a block diagram showing a configuration of an optical disk apparatus according to a second embodiment of the present invention.

A second embodiment of the present invention is described next, with reference to FIGS. 17 through 30. FIG. 17 shows a general configuration of an optical disk apparatus 210 according to the second embodiment of the present invention.

The optical disk apparatus shown in FIG. 17 includes a spindle motor 122 driving and rotating an optical disk 115; an optical pickup device 123; a seek motor 121 driving the optical pickup device 123 in a sledge direction; a laser control circuit 124; an encoder 125; a driving control circuit 126; a reproduced signal processing circuit 128; a buffer RAM 134; a buffer manager 137; an interface 138; a flash memory 139; a CPU 140; and a RAM 141. Connecting lines thereamong shown in FIG. 17 merely represent flows of typical information and signals, and do not necessarily show all the connection relationships among the respective blocks. The optical disk apparatus 120 is configured to adapt to a multi-level recording method, and, recording data is, for example, converted into six multi-levels of 0 through 5. That is, the number of multi-levels is 6. Further, as one example, it is assumed that the optical disk 115 is a phase-change-type information recording medium.

Figure 18:
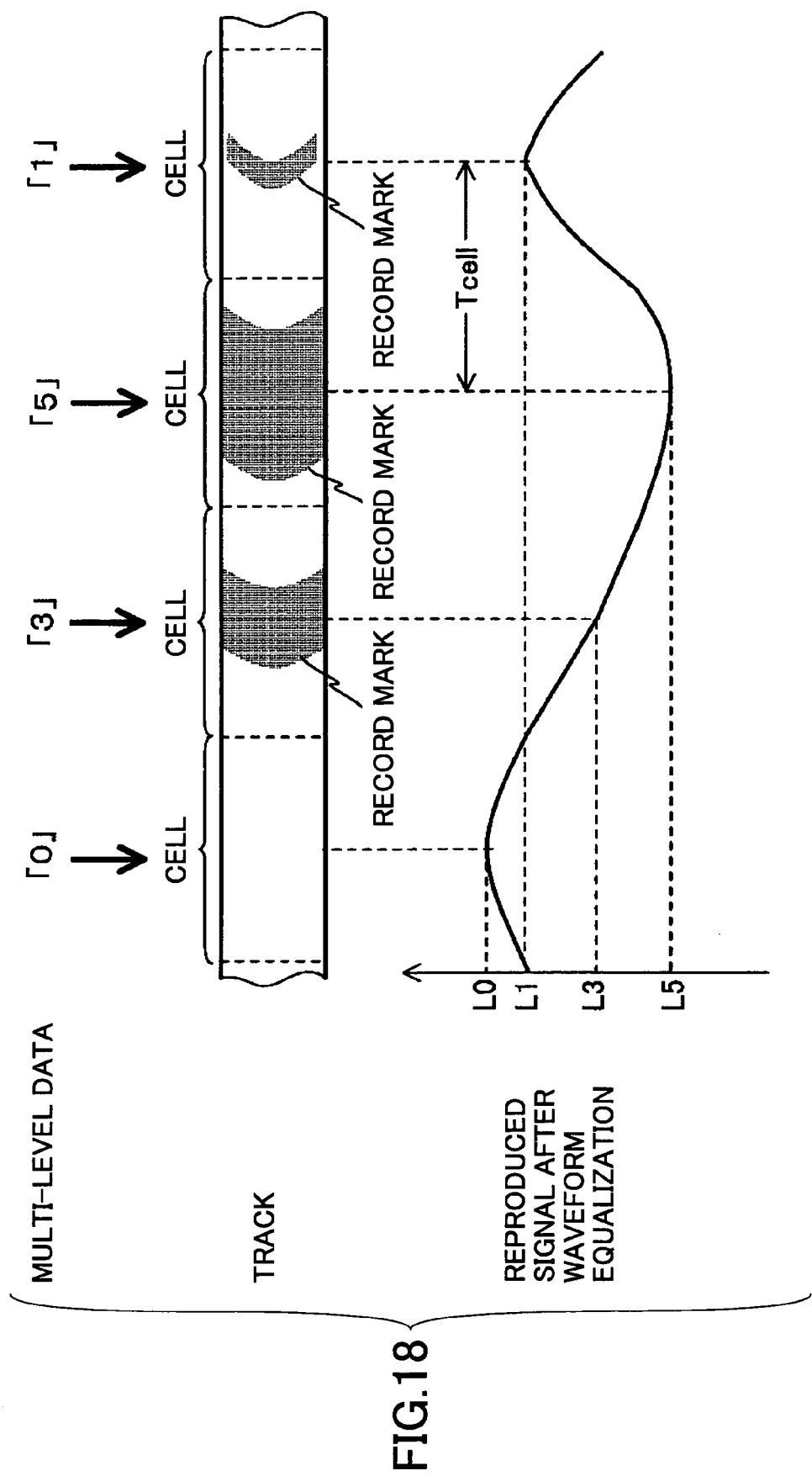
FIG. 18 illustrates generation of multi-level information.

According to the multi-level recording method, as shown in FIG. 18 for example, a track is virtually divided into a plurality of areas (referred to as cells,) every predetermined length (referred to as S) with respect to a track tangential direction. In each cell, one value of multi-level data is recorded in a form of a record mark. When a value of the multi-level data falls within a range between 1 through 5, the record mark (pit) having an area corresponding to the value is produced at a center of the cell. When a value of the multi-level information is 0, no record mark is produced. A cell period when the optical disk 115 rotates at a reproduction speed is referred to as a Tcell (see FIG. 18).

At a portion at which the record mark is thus produced, reflectance for laser light decreases as the area of the mark produced becomes larger. Accordingly, a reproduced signal generated from laser light reflected by a recording surface of the optical disk and having undergone waveform equalization processing is, as shown in FIG. 18, such that, when the value of the multi-level data is 0, a maximum level (L0) is obtained, while, when the value of the multi-level data is 5, a minimum level (L5) is obtained. Signal levels obtained when the value of the multi-level data changes 1 through 4 are referred to as L1 through L4, respectively.

Figure 19:
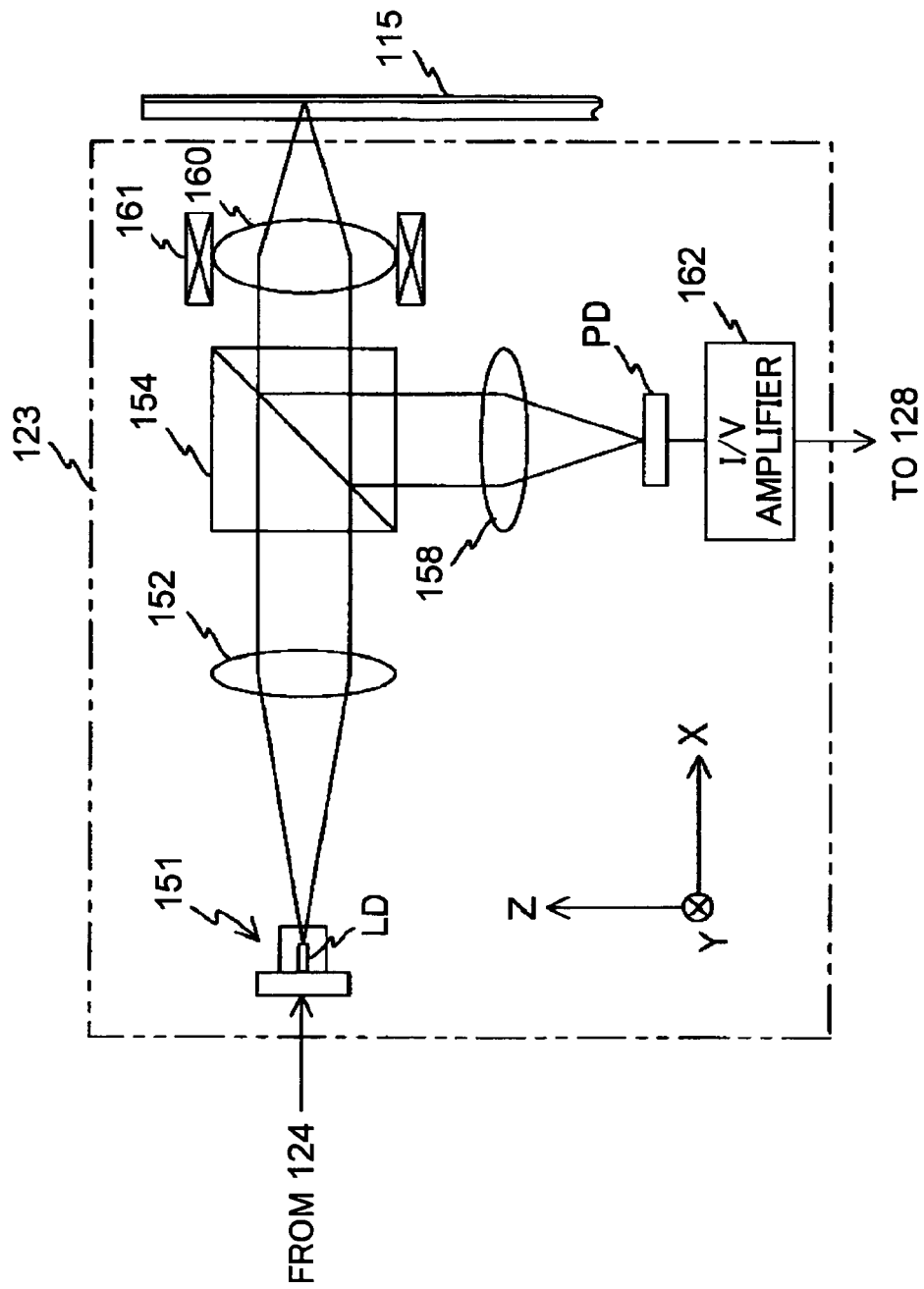
FIG. 19 illustrates an optical pickup device shown in FIG. 17.

The above-mentioned optical pickup device 123 is a device for applying laser light onto the recording surface on which spiral or centric tracks are produced on the optical disk 115 rotated by the spindle motor 122, and receiving reflected light from the recording surface. For example, the optical pickup device 123 includes, as shown in FIG. 19, a light source unit 151, a coupling lens 152, a beam splitter 154, an objective lens 160, a detection lens 158, a light receiving device PD, an I/V amplifier 162, and a driving system 61 driving the objective lens 160.

The light source unit 151 includes a semiconductor laser LD as a light source emitting the laser light. In the second embodiment, a direction in which the laser light emitted by the light source unit 151 has a maximum light emission intensity is referred to as a +X direction. On the +X direction of the light source unit 151, the coupling lens 152 is disposed, and transforms a light beam emitted by the light source unit 151 into approximately parallel light.

The beam splitter 154 is disposed on the +X side of the coupling lens 152, and allows the light beam applied by the coupling lens 152 to pass therethrough as it is, and also, causes a light beam (returned light beam) reflected by the optical disk 115 to branch off in a −Z direction. On the +X side of the beam splitter 154, the objective lens 160 is disposed, and condenses the light beam having passed through the beam splitter 154 onto the recording surface of the optical disk 115.

The detection lens 158 is disposed on the −Z side of the beam splitter 154, and condenses the returned light beam having branched off from the beam splitter 154 onto a light receiving surface of the light receiving device PD. On the light receiving surface of the light receiving device PD, a plurality of light receiving areas are provided. The respective light receiving areas generate signals according to light received amounts by means of photoelectric conversion function.

The I/V amplifier 162 converts the signals from the respective light receiving areas of the light receiving device PD into voltage signals, respectively, also amplifies by a predetermined gain, and outputs the thus-processed signals, to the reproduced signal processing circuit 128.

The driving system 161 includes a focusing actuator for slightly driving the objective lens 160 in a focus direction which is an optical axis direction of the objective lens 60; and a tracking actuator for slightly driving the objective lens 160 in a tracking direction which is a direction perpendicular to the track tangential direction.

Returning to FIG. 17, the above-mentioned reproduced signal processing circuit 128 includes a servo signal detecting circuit 128*b*, a wobble signal detecting circuit 128*c*, an RF signal detecting circuit 128*d*, a decoder 128*e*, a clock signal generating circuit 128*f*, a demodulating circuit 128*g*, a waveform equalizer circuit 128*h* and so forth.

The servo signal detecting circuit 128*b* detects servo signals such as a focus error signal and a tracking error signal based on the output signals of the I/V amplifier 162. The thus-detected servo signals are output to the driving control circuit 126.

The wobble signal detecting circuit 128*c* detects a wobble signal based on the output signals of the I/V amplifier 162. The thus-detected wobble signal is output to the clock signal generating circuit 128*f* and the decoding circuit 128*g*.

The RF signal detecting circuit 128*d* detects an RF signal based on the output signals of the I/V amplifier 162. The thus-detected RF signal is output to the clock signal generating circuit 128*f* and the waveform equalizer circuit 128*h*.

The clock signal generating circuit 128*f* generates a reproducing clock signal based on the RF signal, and generates demodulating and recording clock signals based on the wobble signal. The reproducing clock signal is provided to the waveform equalizer circuit 128*h* and the decoder 128*e*, the demodulating clock signal is provided to the demodulating circuit 128*g*, and the recording clock signal is provided tog the encoder 125. A period of the reproducing clock signal is equal to the above-mentioned cell period Tcell.

The waveform equalizer circuit 128*h* caries out waveform equalization processing on the RF signal. Details of the waveform equalizer circuit 128*h* are described later.

The decoder 128*e* caries out decoding processing and error detecting processing on an output signal (waveform equalized signal) of the waveform equalizer circuit 128*h*. When an error is detected, error correction processing is carried out and then, the thus-processed data is stored in the buffer RAM 134 as a reproduced signal via the buffer manager 137. There, since the RF signal has undergone the waveform equalizing processing in the waveform equalizer circuit 128*h*, an intersymbol interference component included in the RF signal is corrected with a high accuracy, and thus, it is possible to obtain the stable and accurate reproduced signal. Address data is included in the RF signal, and the decoder 128*e* outputs the address data to the CPU 140.

The demodulating circuit 128*g* demodulates a demodulated part of the wobble signal, and obtains the address data or media parameters. The thus-obtained respective data is provided to the CPU 140.

The driving control circuit 126 generates the tracking actuator driving signal for correcting a positional error of the objective lens 160 concerning the tracking direction, based on the tracking error signal, and also, generates the focus actuator driving signal for correcting a positional error of the objective lens 160 concerning the focus direction, based on the focus error signal. The respective driving signals thus generated are output to the optical pickup device 123. Thereby, tracking control and focusing control are carried out. The driving control circuit 126 also generates a driving signal for driving the seek motor 121, and also, generates a driving signal for driving the spindle motor 122, based on instructions of the CPU 140. The respective driving signals are output to the seek motor 121 and to the spindle motor 122, respectively.

In the buffer RAM 134, data to record in the optical disk 115 (recording data) and data reproduced from the optical disk 115 (reproduced data) are temporarily stored. Input/output of data in/from the buffer RAM 134 is controlled by the buffer manager 137.

The encoder 125 takes out the recording data stored in the buffer RAM 134 through the buffer manager 137 based on instructions of the CPU 140, carries out data modulation and adding error correction code, and generates a writing signal for the optical disk 115. The thus-produced writing signal is output to the laser control circuit 124.

The laser control circuit 124 controls semiconductor laser LD light emission power. For example, when recording is carried out, a semiconductor laser LD driving signal is generated based on the above-mentioned writing signal, recording requirements, and semiconductor laser light emission characteristics and so forth.

The interface 138 is a bidirectional communication interface for a host apparatus 190 (for example, a personal computer), and conforms to an ATAPI (at attachment packet interface), SCSI (small computer system interface), USB (universal serial bus) and so forth.

The flash memory 139 includes a program area and a data area. In this program area, a program described according to code interpretable by the CPU 140 is stored. In the data area, the recording requirements such as recording power, recording strategy and so forth, the semiconductor laser LD light emission characteristics, coefficient information applied by the waveform equalizer circuit 128*h*, described later, and so forth are stored.

The CPU 140 controls operations of the above-mentioned respective parts according to the program stored in the program area of the flash memory 139, and also, stores data required for the control in the RAM 141 or the buffer RAM 134.

Figure 20:
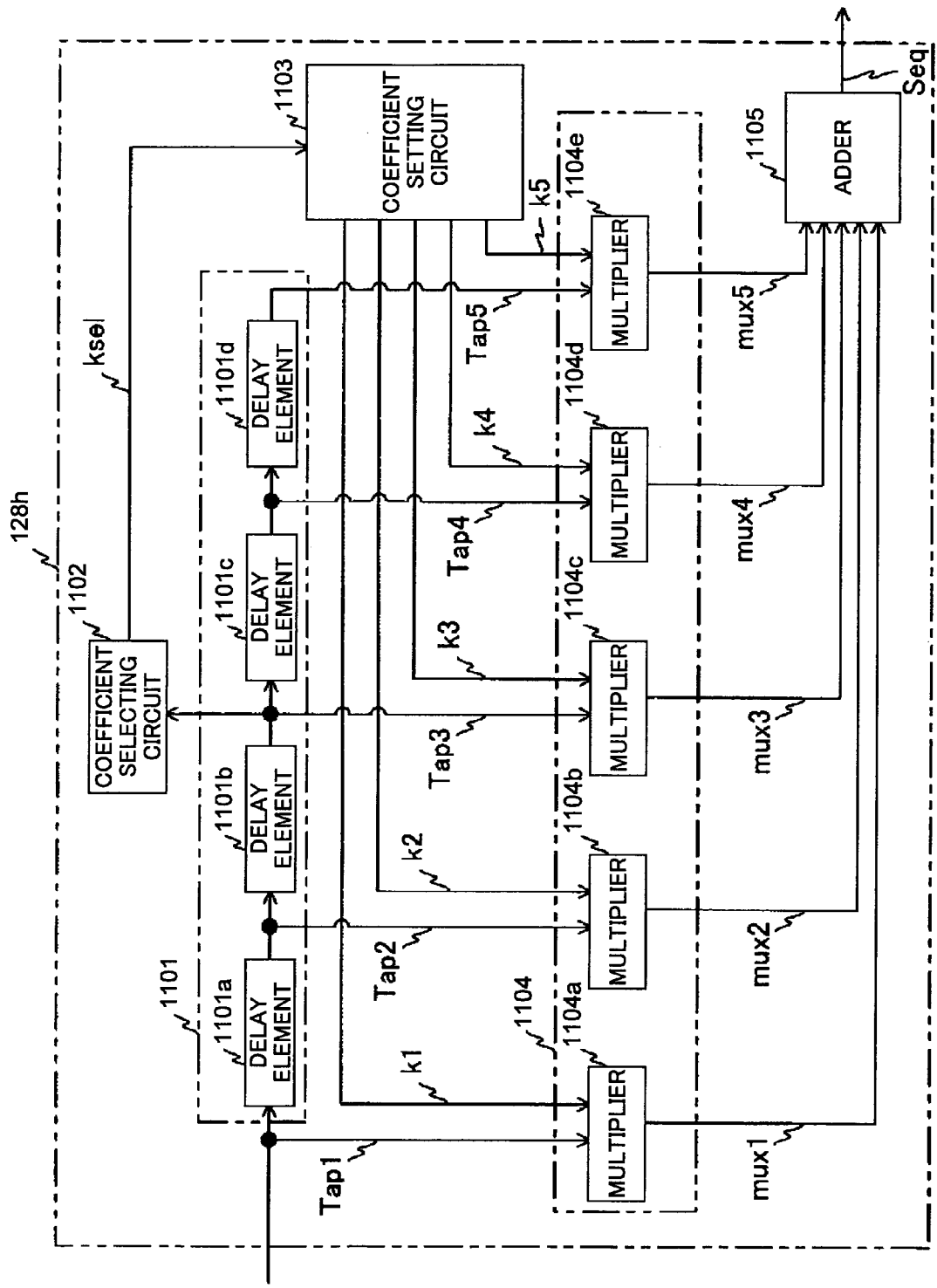
FIG. 20 illustrates a waveform equalizer circuit shown in FIG. 17.

The waveform equalizer circuit 128*h* is described next. As shown in FIG. 20 as one example, the waveform equalizer circuit 128*h* includes a delay part 1101 including a plurality of delay elements, a coefficient selecting circuit 1102, a coefficient setting circuit 1103, a multiplying part 1104 including a plurality of multipliers, and an adder 1105.

In the second embodiment, the delay part 1101 includes the four delay elements (1101*a*, 1101*b*, 1101*c* and 1101*d*). The respective delay elements have approximately equal signal delay characteristics, and are connected in series. The delay element 1101*a* delays the output signal (reproduced signal) of the RF signal detecting circuit 128*d* by a time Tcell; the delay element 1101*b* delays the output signal of the delay circuit 1101*a* by the time Tcell; the delay element 1101*c* delays the output signal of the delay circuit 1101*b* by the time Tcell; and the delay element 1101*d* delays the output signal of the delay circuit 1101*c* by the time Tcell. That is, the delay part 1101 is so-called analog delay line. It is noted that, for the sake of simplification, the output signal of the RF signal detecting circuit 128*d* is referred to as Tap1; the output signal (delayed signal) of the delay element 1101*a* is referred to as Tap2; the output signal (delayed signal) of the delay element 1101*b* is referred to as Tap3; the output signal (delayed signal) of the delay element 1101*c* is referred to as Tap4; and the output signal (delayed signal) of the delay element 1101*d* is referred to as Tap5, as shown in FIG. 20. Further, these signals Tap1 through Tap5 are generally referred to as Tap signals, hereinafter. Tap1 may be referred to as a first Tap signal; Tap2 may be referred to as a second Tap signal; Tap3 may be referred to as a third Tap signal; Tap4 may be referred to as a fourth Tap signal; and Tap5 may be referred to as a fifth Tap signal.

Figure 21:
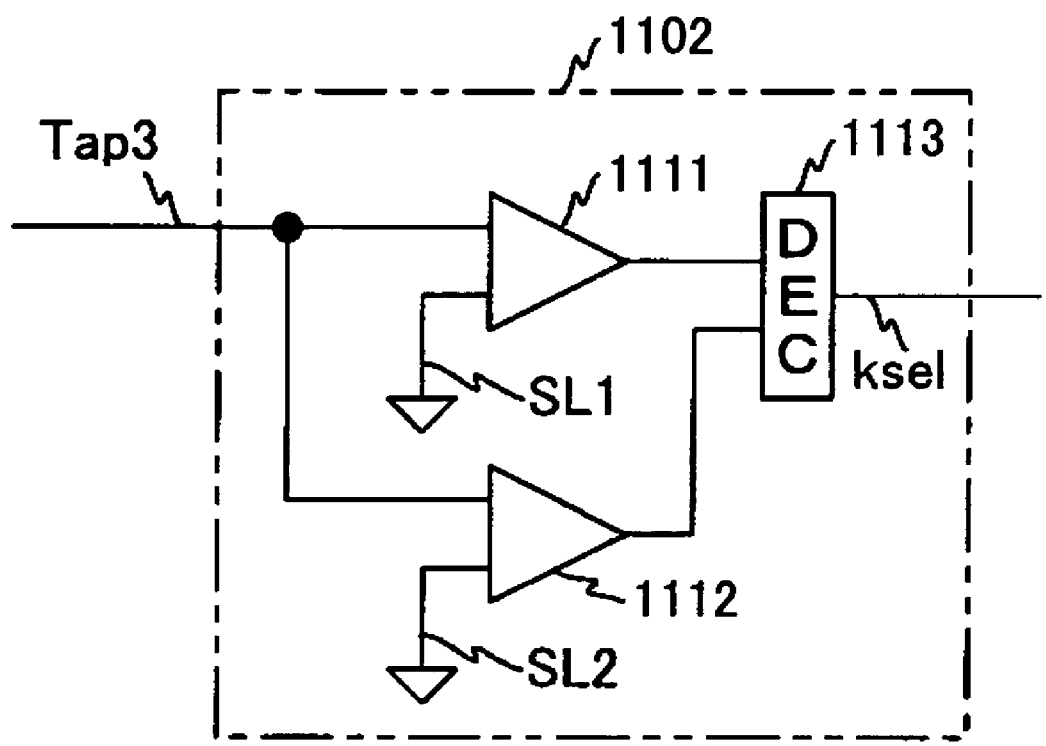
FIG. 21 illustrates a coefficient selecting circuit shown in FIG. 20.

The coefficient selecting circuit 1102 includes, as shown in FIG. 21, two comparators 1111 and 1112, and a decoder 1113. The comparator 1111 compares Tap3 with a slice level signal SL1 (determination level), and outputs the comparison result. The comparator 1112 compares Tap3 with a slice level signal SL2 (>SL1) (determination level), and outputs the comparison result. There, the comparator 1111 is set to output 0 (low level) when Tap3<SL1, and output 1 (high level) when Tap3≧SL1. The comparator 1112 is set to output 0 (low level) when Tap3<SL2, and output 1 (high level) when Tap3≧SL2. That is, in the second embodiment, for Tap3, magnitude comparison relationships with the two slice level signals SL1 and SL2 (determination levels) are obtained. The slice level signals SL1 and SL2 are previously set from an experiment or a simulation, in consideration of nonlinearity of intersymbol interference.

Intersymbol interference in multi-level recording method is described next.

Figure 22:
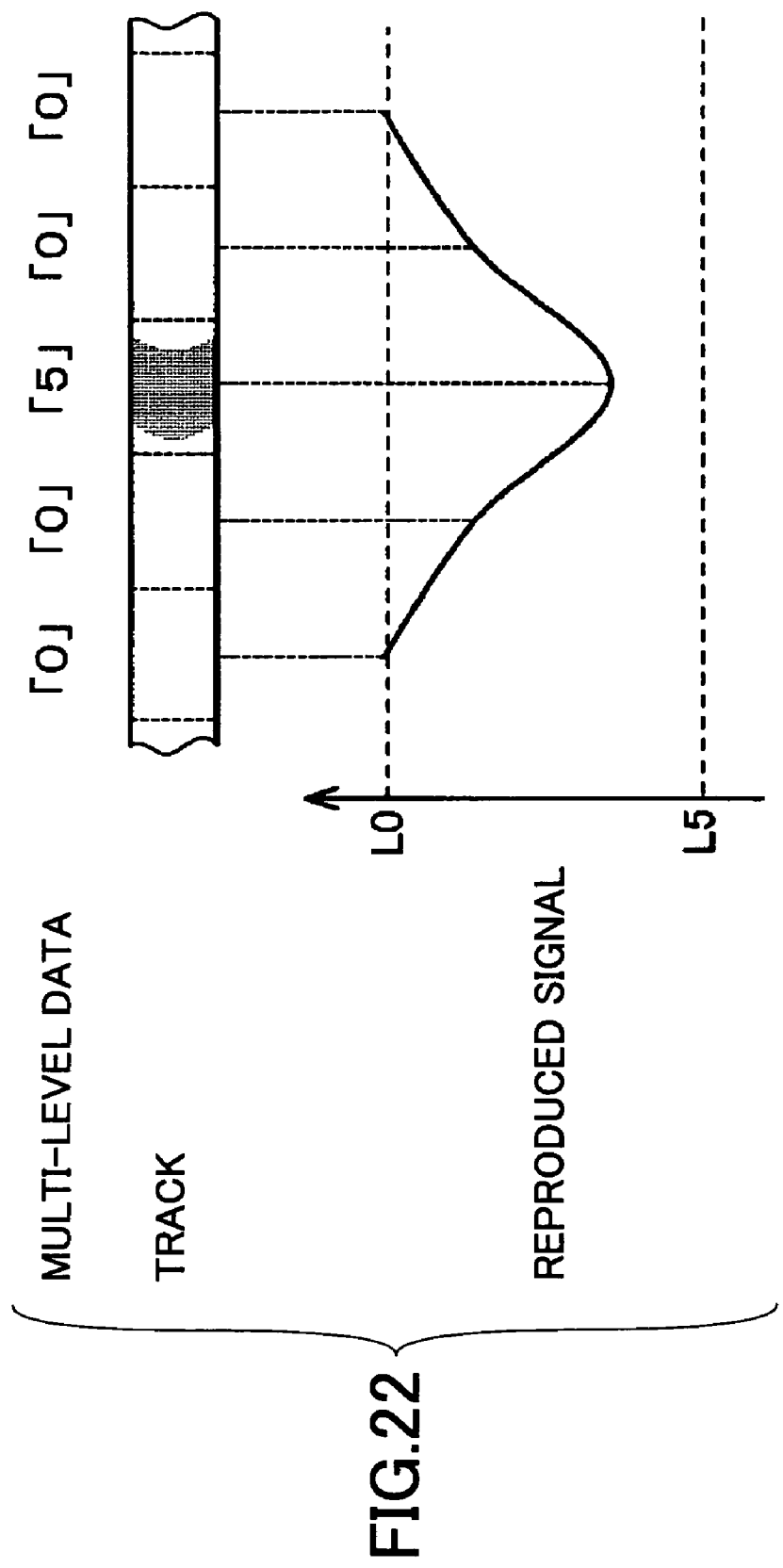
FIG. 22 illustrates intersymbol interference.

For example, as shown in FIG. 22, when multi-level data '0', '0', '5' and '0' are reproduced from the optical disk, the second and forth reproduced signals each corresponding to the multi-level data '0' are detected as being smaller than L0, and the reproduced signal corresponding to the multi-level data '5' is detected as being larger than L5, as shown. This is because, since a spot diameter of a light spot on the optical disk when reproduction is carried out is larger than the length of each cell, the second and fourth reproduced signal levels of the multi-level data '0' are affected by the reproduced signal level of the multi-level data '5' as a result, and also, the reproduced signal level of the multi-level data '5' is affected by the second and fourth reproduced signal levels of the multi-level data '0' in the same way. Such a phenomenon in which the reproduced signal level changes due to influence of the adjacent cell is called intersymbol interference,.

At this time, if the intersymbol interference is in proportion to the size of the record mark, the intersymbol interference is said to be linear. However, in the multi-level recording method, a mark shape differs between a large mark and a small mark, also, a light spot light intensity distribution on the optical disk is complicated, and thus, the intersymbol interference amount may not be in proportion to the size of the record mark. In such a case, the intersymbol interference is said to be nonlinear.

Figure 23:
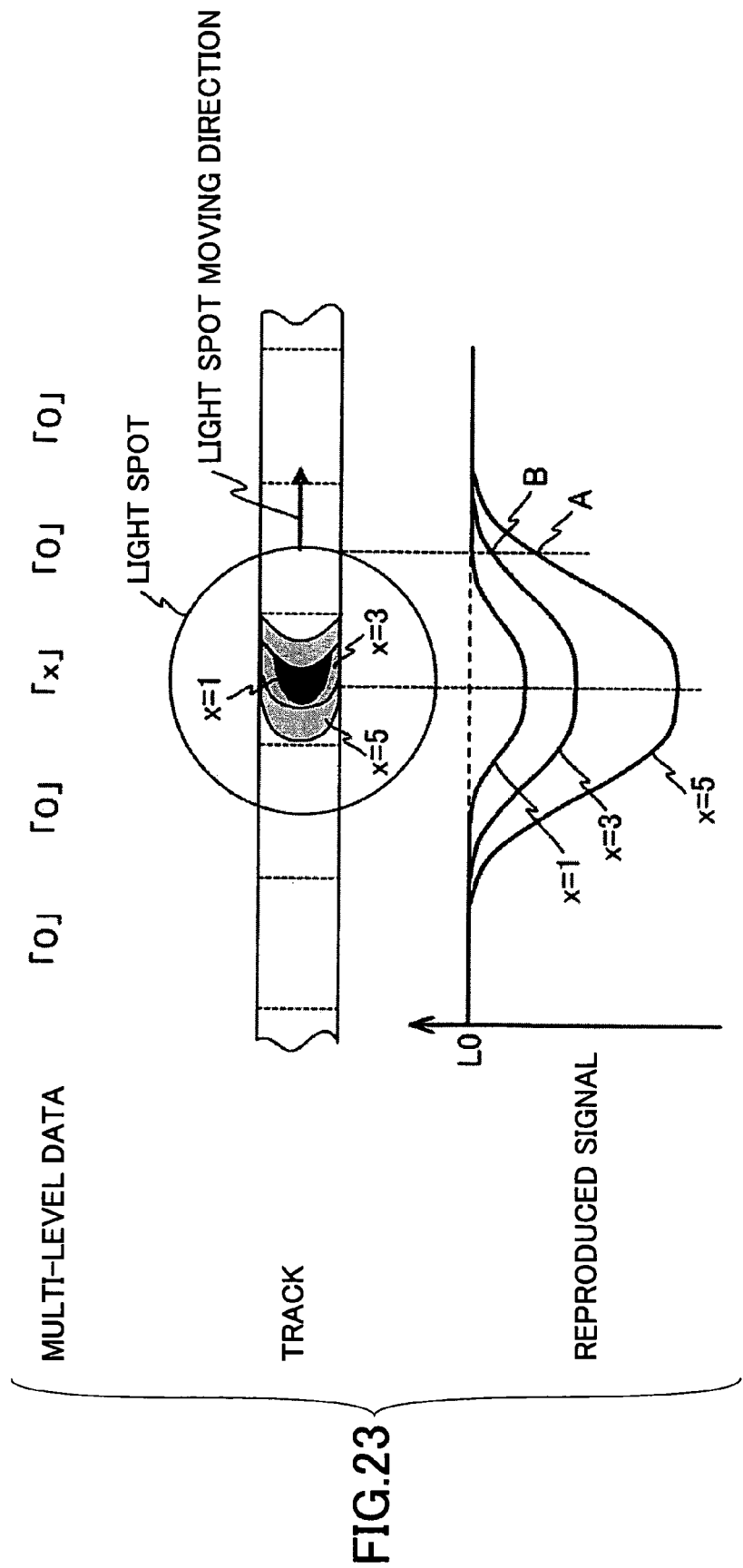
FIG. 23 illustrates a relationship between a shape of a record mark and intersymbol interference.

The mark shape and the nonlinearity of the intersymbol interference are described next specifically. Here, as an example, an influence of 'x' affecting '0', which is fourth multi-level data, is studied when multi-level data '0', '0', 'x', '0' and '0', as shown in FIG. 23, are reproduced. A length of a record mark changes in the track tangential direction (time-axis direction) according to the multi-level data. Also, when the record mark becomes smaller, a length in a direction perpendicular to the time-axis direction also changes. Accordingly, the reproduced signal level corresponding to the fourth multi-level data '0', immediately subsequent to the third multi-level data 'x', is smaller when x=3 (B point in FIG. 23) than a half of that when x=5 (A point in the same figure). That is, it is said that, a change sensitivity of the intersymbol interference amount for a larger record mark is higher than that for a smaller record mark. In the example of FIG. 23, for the sake of comparison, the record mark of the multi-level data '1' and the record mark of the multi-level data '5' are shown in a superposed manner in a common cell.

Figure 24:
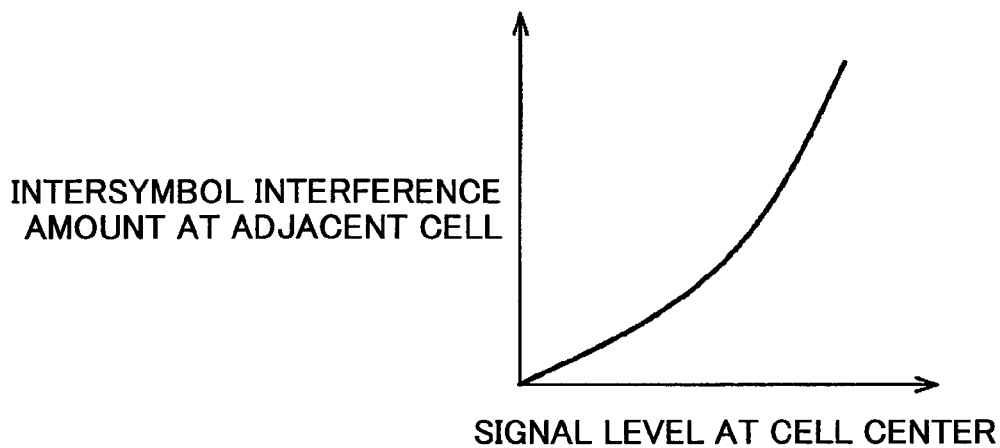
FIG. 24 illustrates non-linearity of intersymbol interference.

A relationship (also refereed to as a 'center level-interference amount relationship', hereinafter) between a reproduced signal level corresponding to a cell center and an intersymbol interference amount at an adjacent cell is shown as one example in FIG. 24. As shown, a curve projecting downward is obtained.

Figure 25:
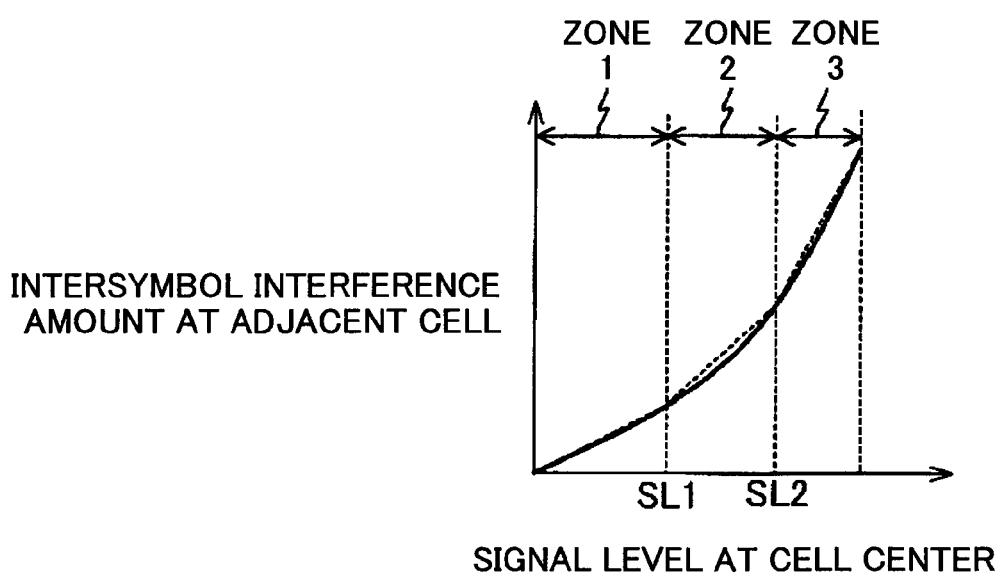
FIG. 25 illustrates zone dividing of non-linearity shown in FIG. 24.

Therefore, according to the second embodiment, the center level-interference amount relationship is divided into three zones (a first zone, a second zone and a third zone) for example, as shown in FIG. 25. Then, it is assumed that, in each zone, the center level-interference amount relationship is linear, that is, the intersymbol interference appears linearity there. Accordingly, in this case, the waveform equalizer circuit 128h has three waveform equalizing characteristics (first characteristics, second characteristics, and third characteristics) corresponding to these three zones, respectively. Then, a signal level at a boundary between the first zone and the second zone is the above-mentioned slice level signal SL1, while a signal level at a boundary between the second zone and the third zone is the above-mentioned slice level signal SL2, as shown in FIG. 25.

As a result, the above-mentioned decoder 1113 outputs a selecting signal ksel to select the waveform equalizing characteristics (first characteristics) for the zone 1, when both the outputs of the comparators 1111 and 1112 are 0; outputs a selecting signal ksel to select the waveform equalizing characteristics (second characteristics) for the zone 2, when the output of the comparator 1111 is 1 and the output of the comparator 1112 is 0; and outputs a selecting signal ksel to select the waveform equalizing characteristics (third characteristics) for the zone 3, when both the outputs of the comparators 1111 and 1112 are 1.

Figure 26:
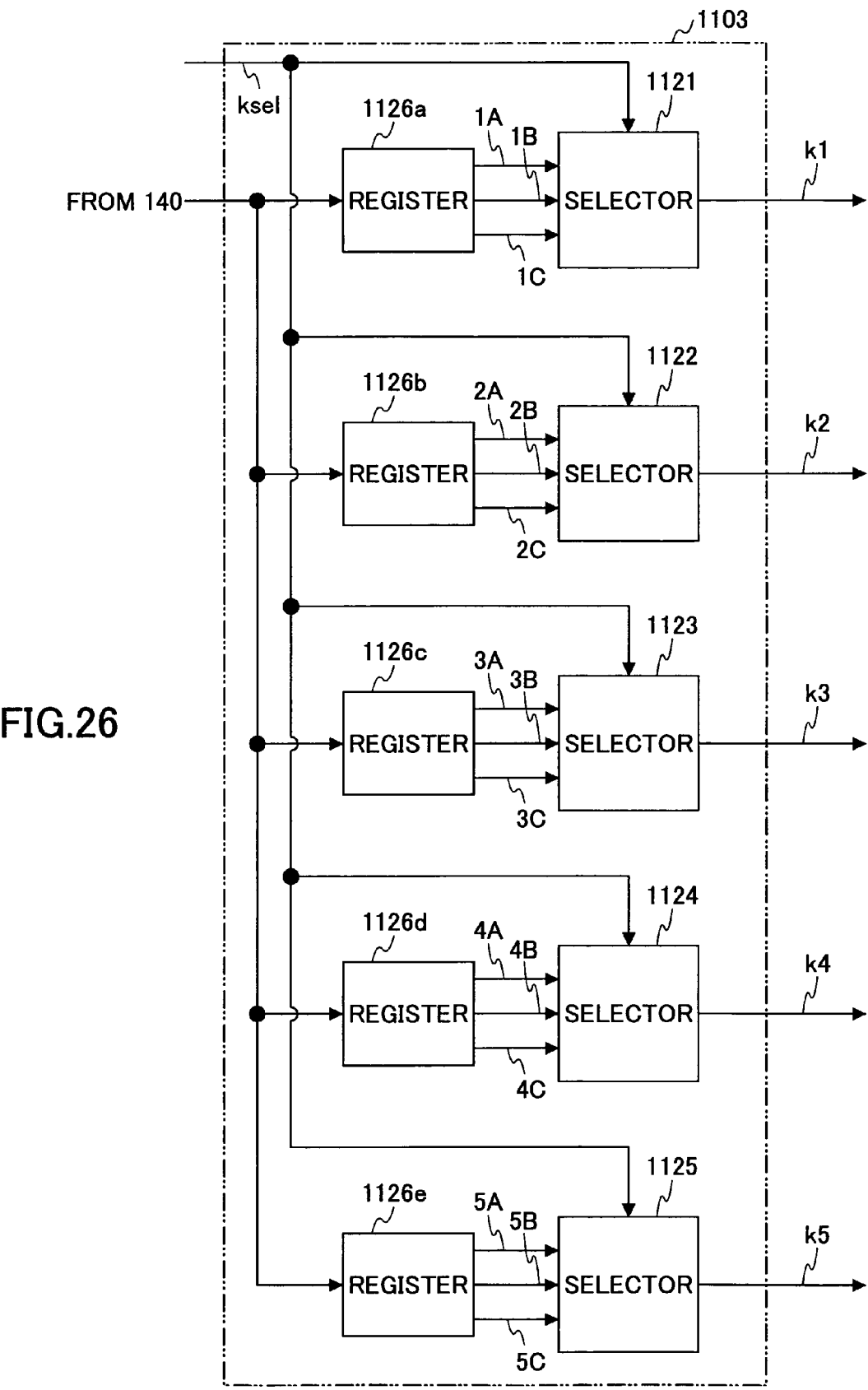
FIG. 26 illustrates a coefficient setting circuit shown in FIG. 20.

The coefficient setting circuit 1103 includes, as shown in FIG. 26 as one example, five selectors (1121, 1122, 1123, 1124 and 1125) and five registers (1126a, 1126b, 1126c, 1126d and 1126e). In the register 1126a, three coefficient information (1A, 1B and 1C) is stored; in the register 1126b, three coefficient information (2A, 2B and 3C) is stored; in the register 1126c, three coefficient information (3A, 3B and 3C) is stored; in the register 1126d, three coefficient information (4A, 4B and 4C) is stored; and in the register 1126e, three coefficient information (5A, 5B and 5C) is stored. Coefficient information 1A, 2A, 3A, 4A and 5A corresponds to the above-mentioned first characteristics, respectively, and may be referred to as a first coefficient group; coefficient information 1B, 2B, 3B, 4B and 5B corresponds to the above-mentioned second characteristics, respectively, and may be referred to as a second coefficient group; and coefficient information 1A, 2C, 3C, 4C and 5C corresponds to the above-mentioned third characteristics, respectively, and may be referred to as a third coefficient group. Each coefficient information is obtained previously from a simulation or such, and is stored in the data area of the flash memory 139. In initializing processing carried out when power supply is started in the apparatus, this information is transferred from the data area of the flash memory 139 to the respective registers by the CPU 140.

The selector 1121 selects any one of the three coefficient information (1A, 1B and 1C) according to the selecting signal ksel, and outputs the selected one as a coefficient signal k1; the selector 1122 selects any one of the three coefficient information (2A, 2B and 2C) according to the selecting signal ksel, and outputs the selected one as a coefficient signal k2; the selector 1123 selects any one of the three coefficient information (3A, 3B and 3C) according to the selecting signal ksel, and outputs the selected one as a coefficient signal k3; the selector 1124 selects any one of the three coefficient information (4A, 4B and 4C) according to the selecting signal ksel, and outputs the selected one as a coefficient signal k4;

and the selector 1125 selects any one of the three coefficient information (5A, 5B and 5C) according to the selecting signal ksel, and outputs the selected one as a coefficient signal k5. That is, the selecting signal ksel designates any one of the above-mentioned three coefficient groups. It is noted that the coefficient signal k2 and the coefficient signal k4 are negative signals.

Returning to FIG. 20, the multiplying part 1104 has five multiplier (1104a, 1104b, 1104c, 1104d and 1104e). The multiplier 1104a multiplies Tap1 by k1, and outputs a multiplied signal mux 1; the multiplier 1104b multiplies Tap2 by k2, and outputs a multiplied signal mux 2; the multiplier 1104c multiplies Tap3 by k3, and outputs a multiplied signal mux 3; the multiplier 1104d multiplies Tap4 by k4, and outputs a multiplied signal mux 4; and the multiplier 1104e multiplies Tap5 by k5, and outputs a multiplied signal mux 5. As each multiplier, a variable gain amplifier in which the gain changes according to the coefficient signal may be applied. The coefficient signals k1 through k5 may be generally referred to as Tap coefficients.

The adder 1105 adds the respective multiplied signals together, and generates a waveform equalizing signal Seq. This waveform equalizing signal Seq is output to the decoder 128e.

Figure 27:
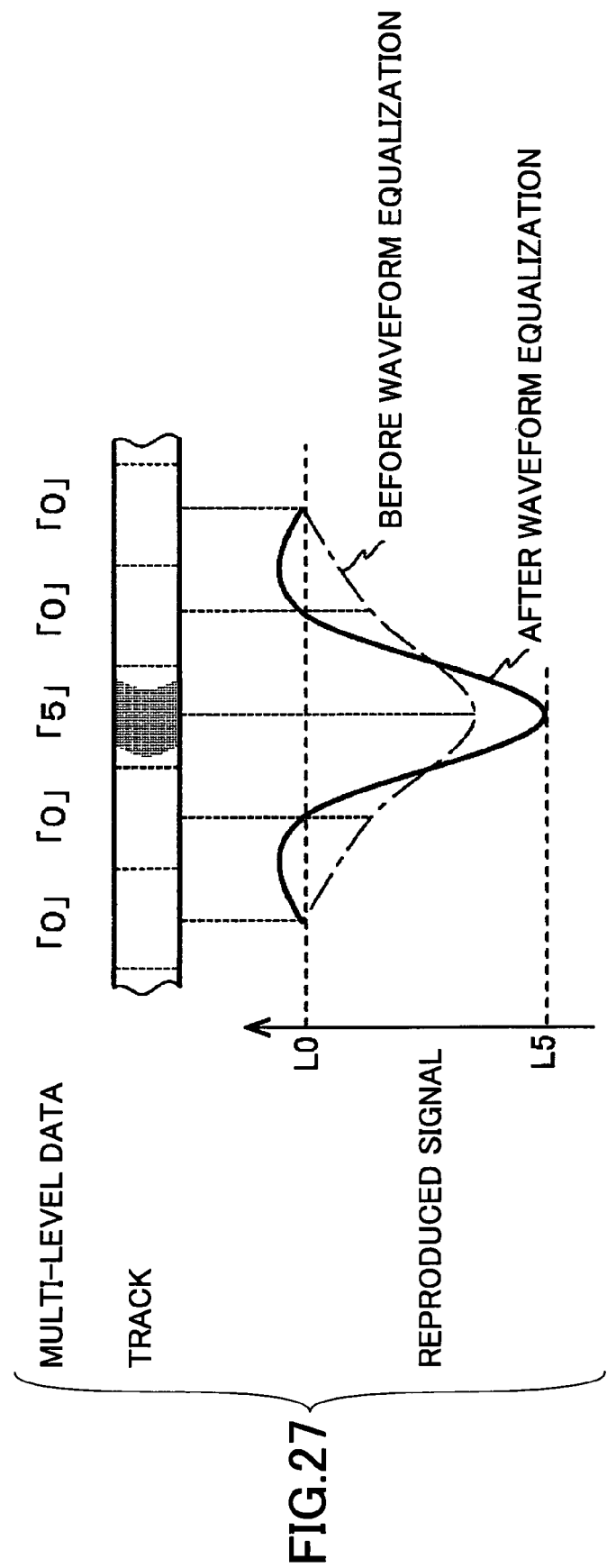
FIG. 27 illustrates an effect of waveform equalization.

Thereby, the reproduced signals of the multi-level data '0', '0', '5', '0' and '0', in the above-mentioned example, are corrected, as shown in FIG. 27, such that, the reproduced signal levels corresponding to the second and fourth multi-level data '0' become approximately equal to L0, while the reproduced signal level corresponding to the multi-level data '5' becomes approximately equal to L5, as indicated by a solid curve of FIG. 27. Thus, the intersymbol interference is corrected.

Figure 28:
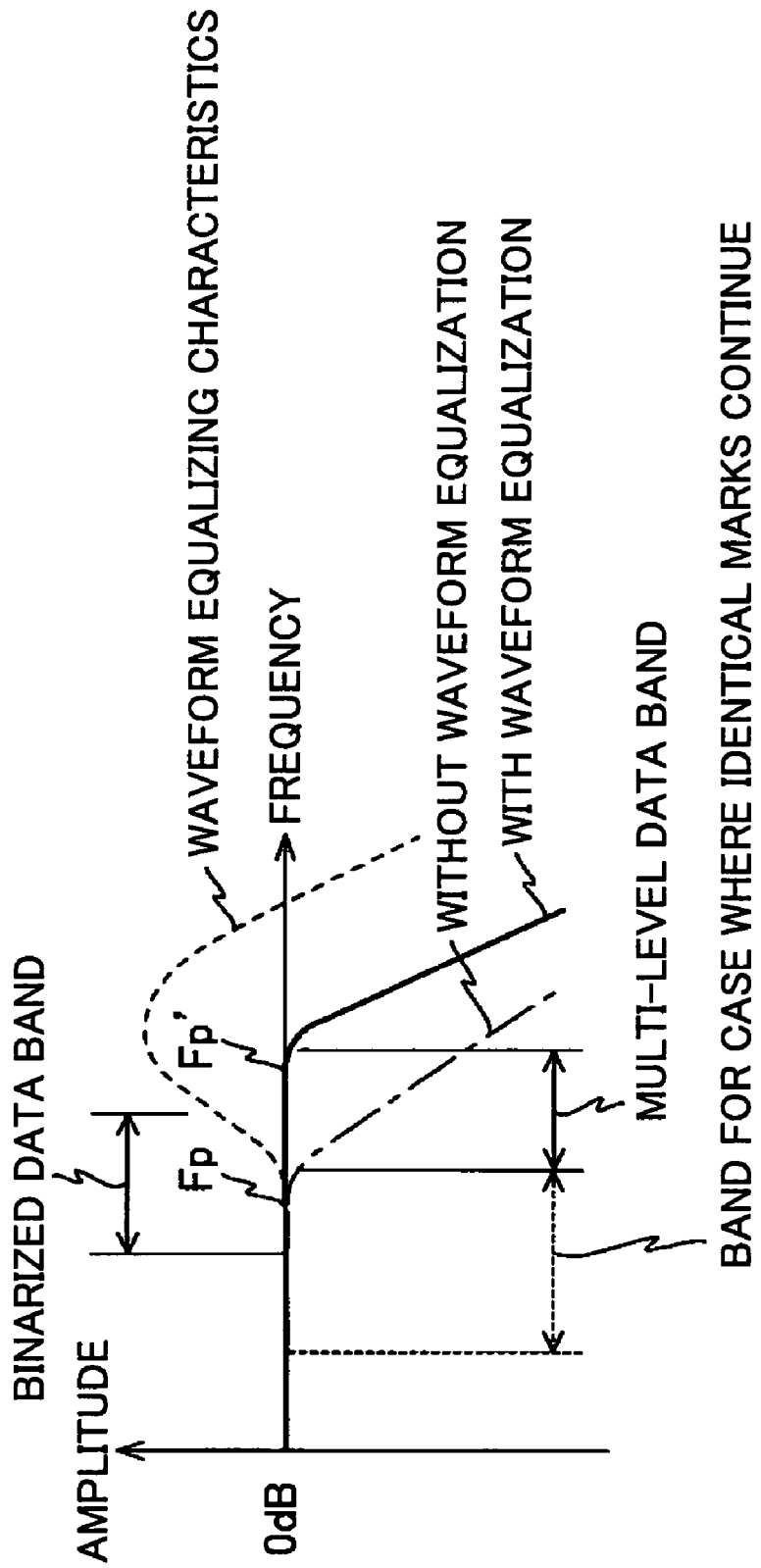
FIG. 28 illustrates optical resolution characteristics.

Optical resolution characteristics (modulation transfer function, abbreviated by 'MTF') are described next (see FIG. 28). As the record mark decreases in its size, a frequency of the reproduced signal increases. When the size of the record mark becomes smaller than the light spot diameter and the frequency exceeds a threshold Fp, the amplitude of the reproduced signal decreases when no waveform equalizing processing is carried out as shown. A frequency band of the multi-level recording exceeds the threshold Fp as shown. However, thanks to the waveform equalizing processing, the threshold Fp is shifted into Fp' on the high frequency side as shown. Accordingly, even in the multi-level recording, it is possible to control attenuation of the amplitude of the reproduced signal. It is noted that, also in the multi-level recording, the frequency of the reproduced signal may become lower than the threshold Fp when same marks occur successively.

Figure 29:
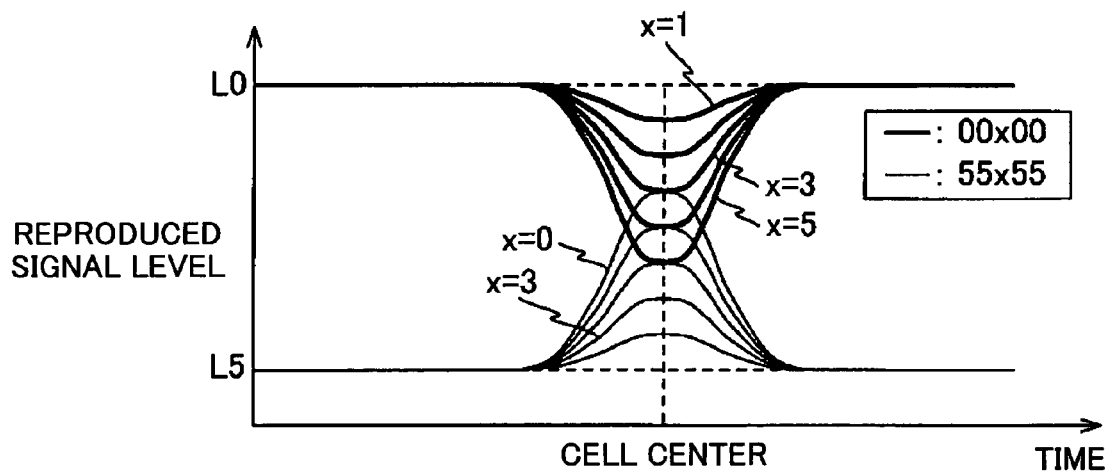
FIG. 29 shows an eye pattern before waveform equalization is carried out.

FIG. 29 shows, as one example, reproduced signals (eye pattern) of '0', '0', 'x', '0' and '0' before waveform equalizing processing is carried out, and reproduced signals (eye pattern) of '5', '5', 'x', '5' and '5' before waveform equalizing processing. is carried out. In the reproduced signals (eye pattern) of '0', '0', 'x', '0' and '0', the amplitude becomes maximum when x=5, while, in the reproduced signals (eye pattern) of '5', '5', 'x', '5' and '5', the amplitude becomes maximum when x=0, as shown. According to the multi-level recording method, each particular record mark is smaller than the light spot diameter, in a separate record mark (referred to as a 'separate wave', hereinafter) such as 'x' of '0', '0', 'x', '0' and '0', and thus, a truly maximum amplitude cannot be obtained even when x=5. Further, the reproduced signal levels corresponding to x=1 and x=2 of the reproduced signals of the multi-level data '0', '0', 'x', '0' and '0' are, although the record marks are thus produced, higher than the reproduced signal level corresponding to x=0 of the reproduced signals of the multi-level data '5', '5', 'x', '5' and '5'. Such a state can also be corrected by the waveform equalizer circuit 128h.

<<Reproducing Processing>>

Next, processing when the optical disk apparatus 120 receives a reproduction request command from the host apparatus 190 is simply described with reference to FIG. 30. A flow chart shown in FIG. 30 corresponds to a series of processing algorithm executed by the CPU 140.

Figure 30:
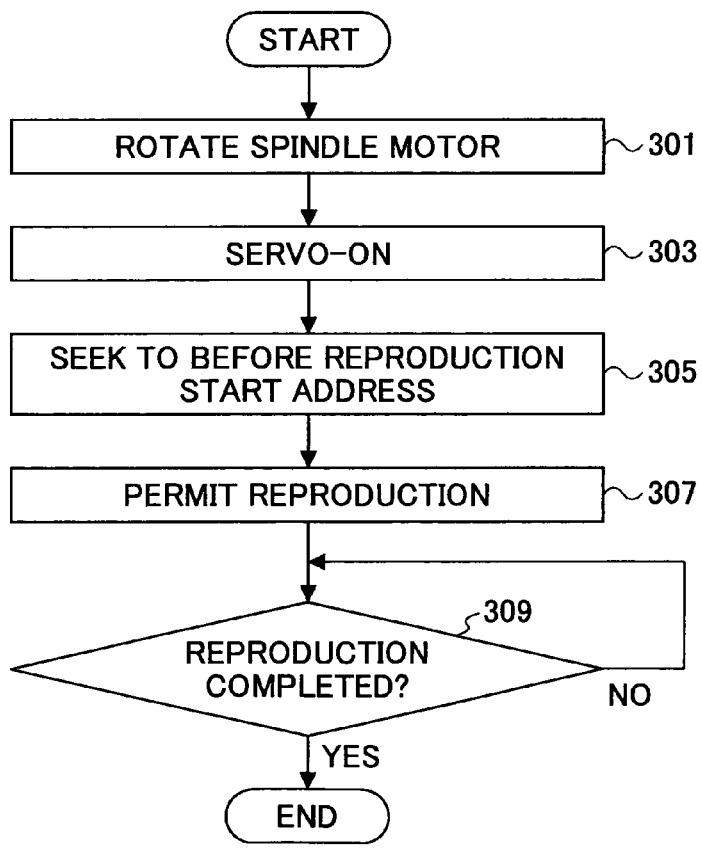
FIG. 30 is a flow chart showing reproducing processing.

When the reproduction request command is received from the host apparatus 190, a top address of a program corresponding to the flow chart of FIG. 30 is set in a program counter of the CPU 140, and reproducing processing is started.

In Step 301, a signal for driving the spindle motor 122 is output to the driving control circuit 126 based on a predetermined reproduction speed, and also, a matter that the reproduction request command has been received from the host apparatus 190 is notified of to the reproduced signal processing circuit 128.

In Step 303, when it is determined that rotation of the optical disk 115 has reached a predetermined speed, a servo-on mode is set in the driving control circuit 126. Thereby, as described above, tracking control and focusing control are carried out. The tracking control and focusing control are carried out at any time if necessary until the reproducing processing is finished.

In Step 305, a reproduction start address is extracted from the reproduction request command, and instructions are sent to the driving control circuit 126 such that a light spot may be produced on the optical disk before the reproduction start address. Thereby, seek operation is carried out. When no seek operation is required, this processing is skipped.

In Step 307, actual reproduction is permitted. Thereby, as described above, reproduced data is obtained by the RF signal detecting circuit 128d, the waveform equalizer circuit 128h and the decoder 128e, is then stored in the buffer RAM 34 temporarily, and then, is output to the host apparatus 190.

In Step 309, it is determined whether or not the reproduction is finished. When the reproduction is not yet finished, the determination results in No, and then, after a predetermined time interval has elapsed, the same determination is made again. On the other hand, when the reproduction has been finished, the determination results in Yes, and the current processing is finished.

As can be seen from the above description, in the optical disk apparatus 120 according to the second embodiment of the present invention, a delay circuit corresponds to the delay part 1101, a determining circuit corresponds to the coefficient selecting circuit 1102 and the coefficient setting circuit 1103, a multiplying circuit corresponds to the multiplying part 1104, and an adding circuit corresponds to the adder 1105. Further, a processing device corresponds to the CPU 140 and the program executed by the CPU 140. It is noted that it is possible to configure a part of the processing device, embodied as a result of processing being carried out by the CPU 140 according to the program, by a hardware, or, all thereof may be configured by a hardware.

In the processing of the reproduced signal processing circuit 128, a signal processing method according to the present invention is embodied.

Thus, in the optical disk apparatus 120 according to the second embodiment of the present invention, the reproduced signal from the optical disk via the optical pickup 123 is delayed by the delay part 1101 (delay circuit) according to a plurality of delay times which are different by a predetermined time each, and thus, the plurality of delayed signals Tap2 through Tap5 are generated corresponding to the plurality of delay times. Then the coefficient selecting circuit 1102 (a part of the determining circuit) obtains a magnitude relationship between a signal level of the Tap3 (the delayed signal corresponding to the specific delay time) and two slice level signals SL1 and SL2 (determination levels), and based on this result, the coefficient setting circuit 1103 (a part of the determining circuit) selects the coefficient group (a plurality of multiplying coefficients). The thus-selected coefficient group is applied to multiply the reproduced signal and the delayed signals, respectively, by the multiplying part 1104 (multiplying circuit). The multiplied signals mux 1 through mux 5 output from the multiplying part 1104 are added together by the adder 1105 (adding circuit), the result thereof is provided to the decoder 128e as the waveform equalizing signal Seq, and thus, the reproduced signal is obtained. In this case, since the appropriate coefficient group is thus selected according to the marks, the waveform equalizing signal Seq should be a signal waveform-equalized according to the marks produced on the optical disk. Accordingly, it is possible to accurately correct the intersymbol interference in the reproduced signal obtained from the optical disk. Thus, it is possible to reproduce information recorded in the optical disk accurately.

In the above-described second embodiment, the delay part 1101 of the waveform equalizer circuit 128h has the four delay elements. However, it is not necessary to limit thereto, and, for example, the delay part 1101 includes two delay elements or six delay elements, alternatively. The number of the delay elements may be adjusted depending on the size of the cell with respect to the light spot diameter. According to the multi-level recording, it is preferable that the number of the delay elements is an even number as in the above-mentioned example.

Further, in the second embodiment, the waveform equalizer circuit 128h is made of an analog circuit. However, the same may be made of a digital circuit alternatively when the delay time should be adjusted according to the reproduction speed, the multiplying coefficients should be switched at a high speed, or such. In this case, an A/D converter should be provided before the waveform equalizer circuit. Then, a sampling rate of the A/D converter should preferably be more than ten times the delay time, and, a filtering should preferably be carried out on the sampled data so that noise is removed. In the digital circuit, it is possible to obtain a signal equivalent to that obtained from he above-mentioned delay element, as a result of extraction being carried out from the discrete signal obtained from the A/D converter in the period the same as the delay time. When the sampling in the A/D converter is carried out in the period the same as the delay time, the thus-obtained data can be used as it is without carrying out the extraction. However, in this case, it is necessary to adjust the sampling timing to the cell center accurately. Further, it is preferable to previously remove transmission path noise with the use a filter or such.

Figure 31:
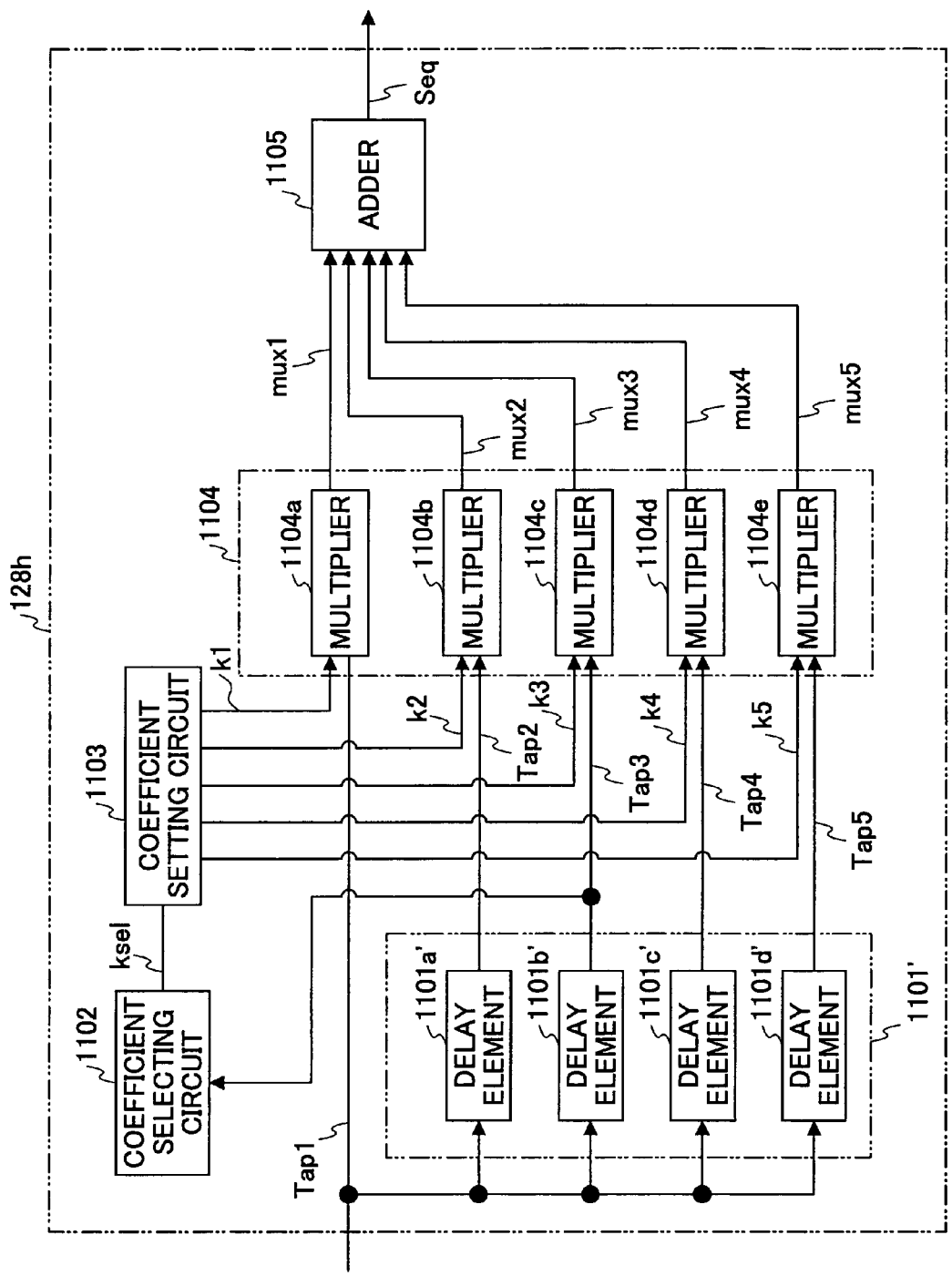
FIG. 31 illustrates a variant embodiment of the waveform equalizer circuit shown in FIG. 17.

Further, according to the second embodiment, the respective delay elements of the delay part 1101 are connected in series. However, as another example, as shown in FIG. 31, delay elements (1101a', 1101b', 1101c' and 1110d') having mutually different delay times may be connected in parallel. In this case, the delay time of the delay element 1101a' is Tcell; the delay time of the delay element 1101b' is 2cell; the delay time of the delay element 1101c' is 3Tcell; and the delay time of the delay element 1101d' is 4Tcell. Thereby, for a case where a distortion occurs each time when the delay element is passed through, it is possible to avoid accumulation of the distortion occurring when the delay elements are connected in series.

Since the intersymbol interference n occurs optically, the intersymbol interference is not necessarily symmetrical with respect to the track tangential direction due to complicatedness of the light spot intensity distribution, anisotropy of the record mark shape, inclination of the optical disk with respect to the objective lens, or such. As a result, the coefficient information of Tap2 and the coefficient information of Tap4 may be different from each other with respect to Tap3, in general. Therefore, when the mark shape is too much distorted with respect to the cell center, the value of the coefficient information on one side (Tap2 or Tap4) may become approximately zero. In this case, the coefficient selecting circuit 1102 may not apply Tap3, but the output signal of the delay element which most affects the output obtained after the waveform equalization is carried out may be applied instead. For example, the output signal of the delay element corresponding to the coefficient information having the largest absolute value may be applied in this case.

Further, in the second embodiment, the center level-interference amount relationship is divided into the three zones. However, it is not necessary to limit thereto. As the number of the divided zones is larger, the intersymbol interference correction accuracy increases. However, it can be said that, when the number of the zones is on the order of a half the number of multi-levels, the intersymbol interference correction can be achieved with a sufficient accuracy. When nonlinearity is biased for larger marks or for smaller marks, the number of the divided zones may be two or three without regard to the number of multi-levels.

Further, in the second embodiment, magnitude relationships of Tap3 with respect to the two slice level signals SL1 and SL2 (determination levels) are obtained. However, it is not necessary to limit thereto. For example, when the number of the zones is two, a magnitude relationship of Tap3 should be obtained only with one slice level signal. That is, the essential matter is that a signal identifying the zone to apply should be output to the coefficient setting circuit 1103.

Further, in the second embodiment, in the clock signal generating circuit 128f, the demodulating and recording clock signals are generated from the wobble signal. However, when clock extracting marks (for example, clock marks) are included in information recorded in the optical disk, the respective clock signals may be generated based on the marks produced on the optical disk.

Figure 32:
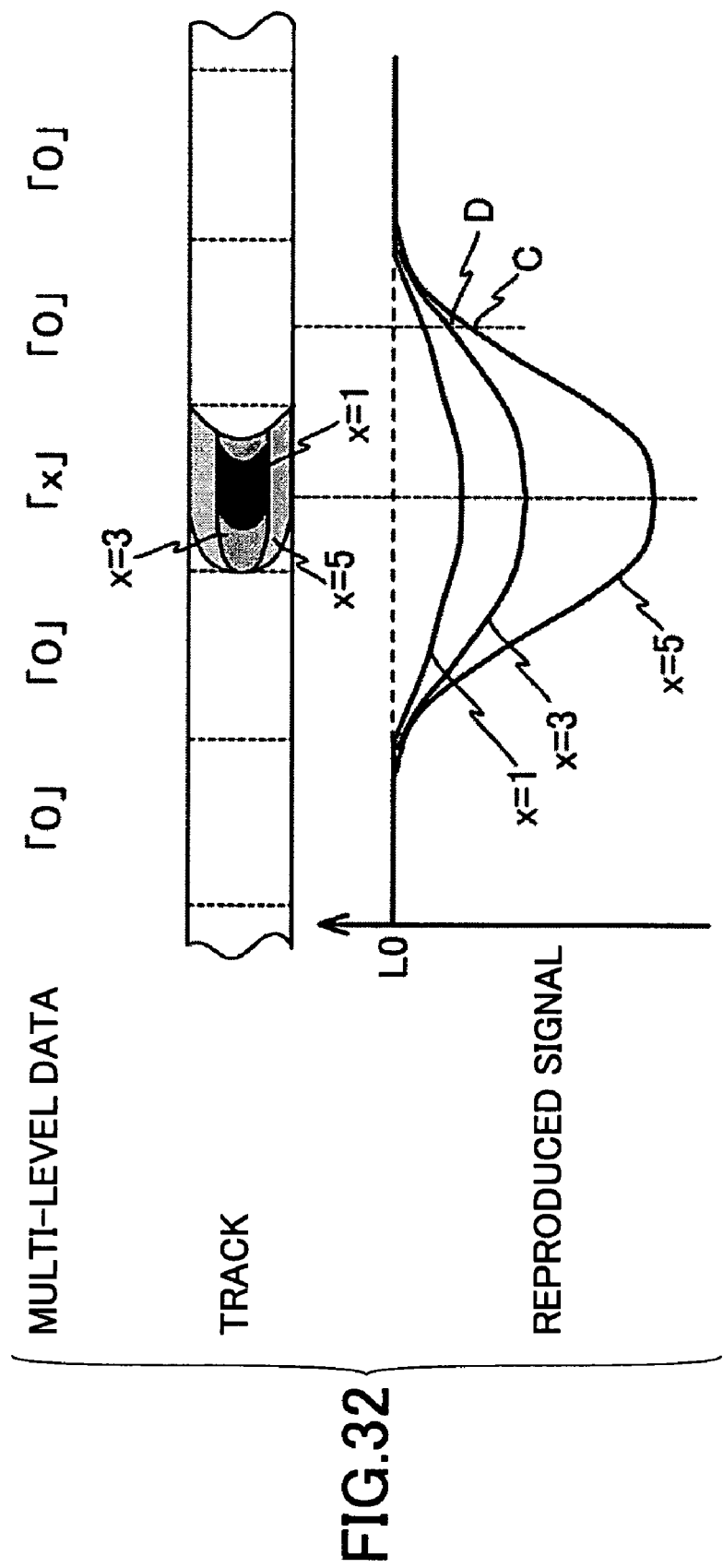
FIG. 32 illustrates intersymbol interference in record marks having different shapes from those of the record marks shown in FIG. 18.
Figure 33:
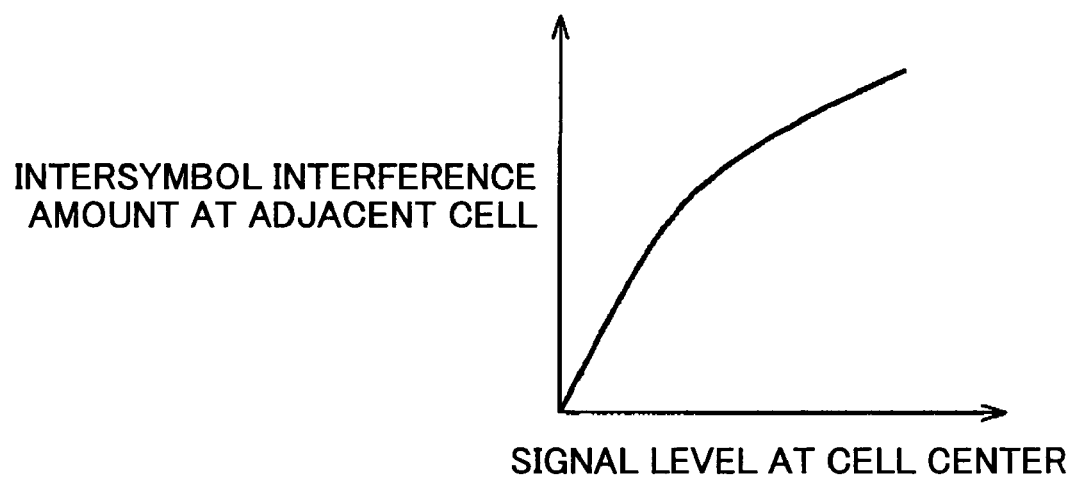
FIG. 33 illustrates non-linearity of intersymbol interference in FIG. 32.

Further, in the second embodiment, the length of the record mark changes along the track tangential direction (time axis direction). However, the present invention is not limited thereto. For example, as shown in FIG. 32, the length of the record mark may change in a direction perpendicular to the track tangential direction according to multi-level information. In this case, when the record mark decreases in its size, the length in the tangential direction also changes as shown. Accordingly, when the multi-level information '0', '0', 'x', '0' and '0' is reproduced, the reproduced signal level from the fourth multi-level information '0', immediately subsequent to 'x', becomes larger in a case where x=3 (point D in FIG. 31) than a half of that in a case where x=5 (point C in FIG. 32). That is, the intersymbol interference amount change sensitivity for a larger mark is lower than the same for a smaller mark. In such a case, the center level-interference amount relationship is, as shows in FIG. 33 as one example, a curve projecting upward is obtained. Also in this case, the same as in the above-described second embodiment, the relationship curve is divided into three zones, and it can be assumed that the intersymbol interference is linear within each zone. In FIG. 32, for the sake of simplification, the record mark of the multi-level data '1', the same of the multi-level data '3' and the same of the multi-level data '5' are shown in a superposed manner.

Figure 34:
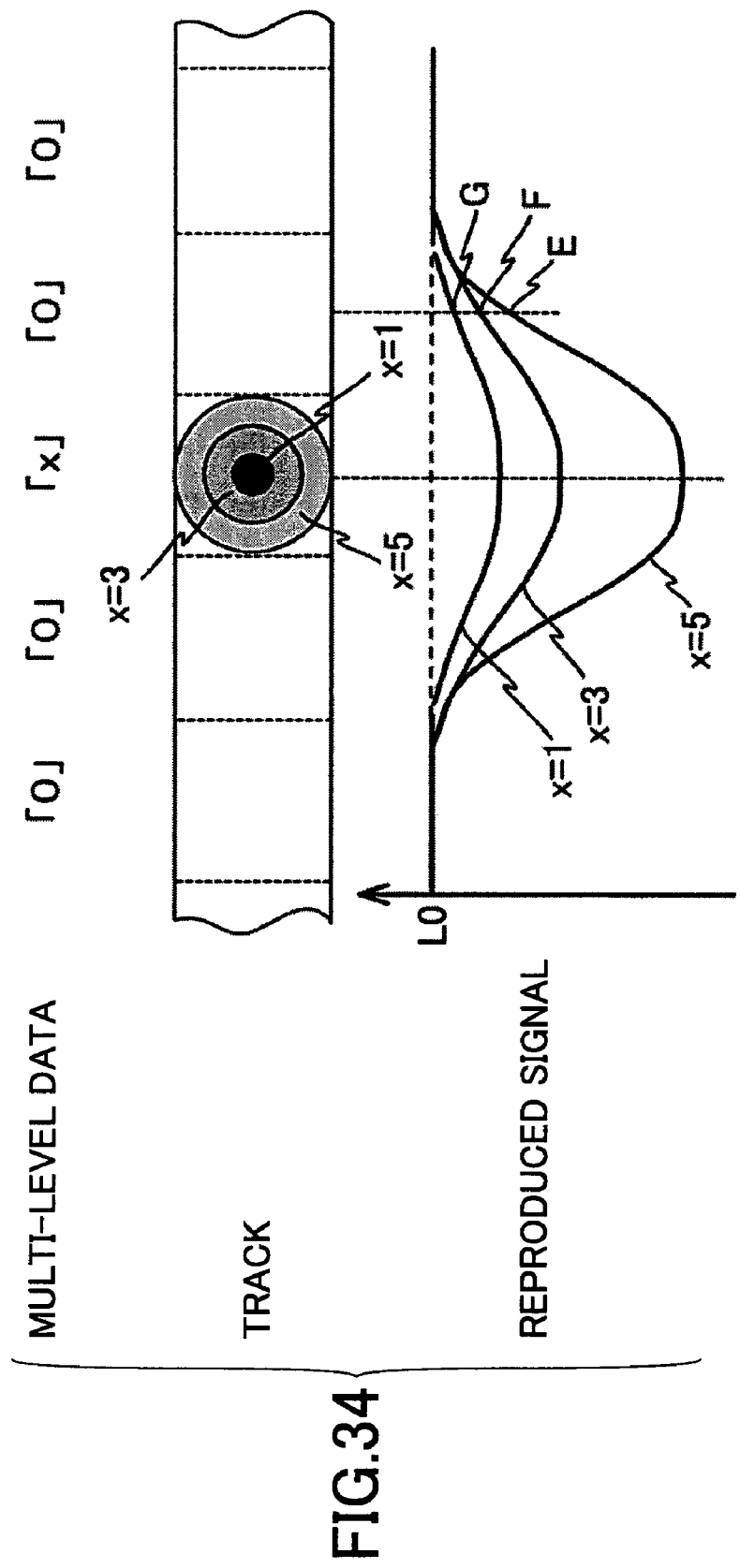
FIGS. 34 and 35 illustrate a case where intersymbol interference has linearity.
Figure 35:
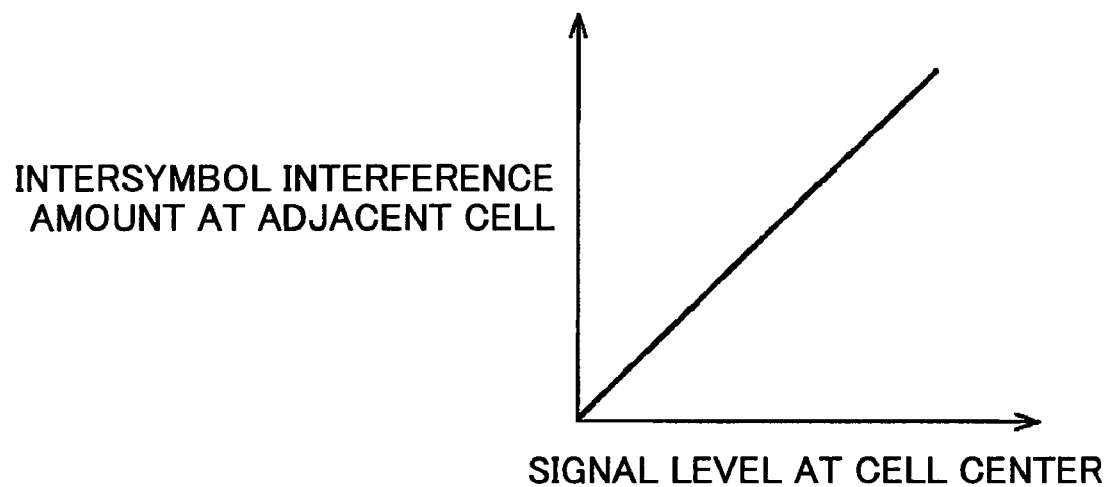

It is noted that, for example, as shown in FIG. 34, for a case where the record mark is circular, and a diameter thereof changes according to the multi-level data, when the multi-level information '0', '0', 'x', '0' and '0' is reproduced, the reproduced signal level from the fourth multi-level information '0' in a case where x=3 (point F in FIG. 34) is approximately half that of a case where x=5 (point E in FIG. 34). Also, the reproduced signal level from the fourth multi-level information '0' in a case where x=1 (point G in FIG. 34) is approximately half that of a case where x=3 (point F in FIG. 34). In such a case, the center level-interference amount relationship becomes linear as shown in FIG. 35. That is, the intersymbol interference is linear. In FIG. 34, for the sake of simplification, the record mark of the multi-level data '1', the same of the multi-level data '3' and the same of the multi-level data '5' are shown in a superposed manner.

Further, in the second embodiment, the slice level signals SL1 and SL2 in the coefficient setting circuit 1102 are fixed, respectively. However, it is not necessary to limit thereto. For example, they may be set variably according to at least one of adjacent record marks, as will be described next.

Figure 36:
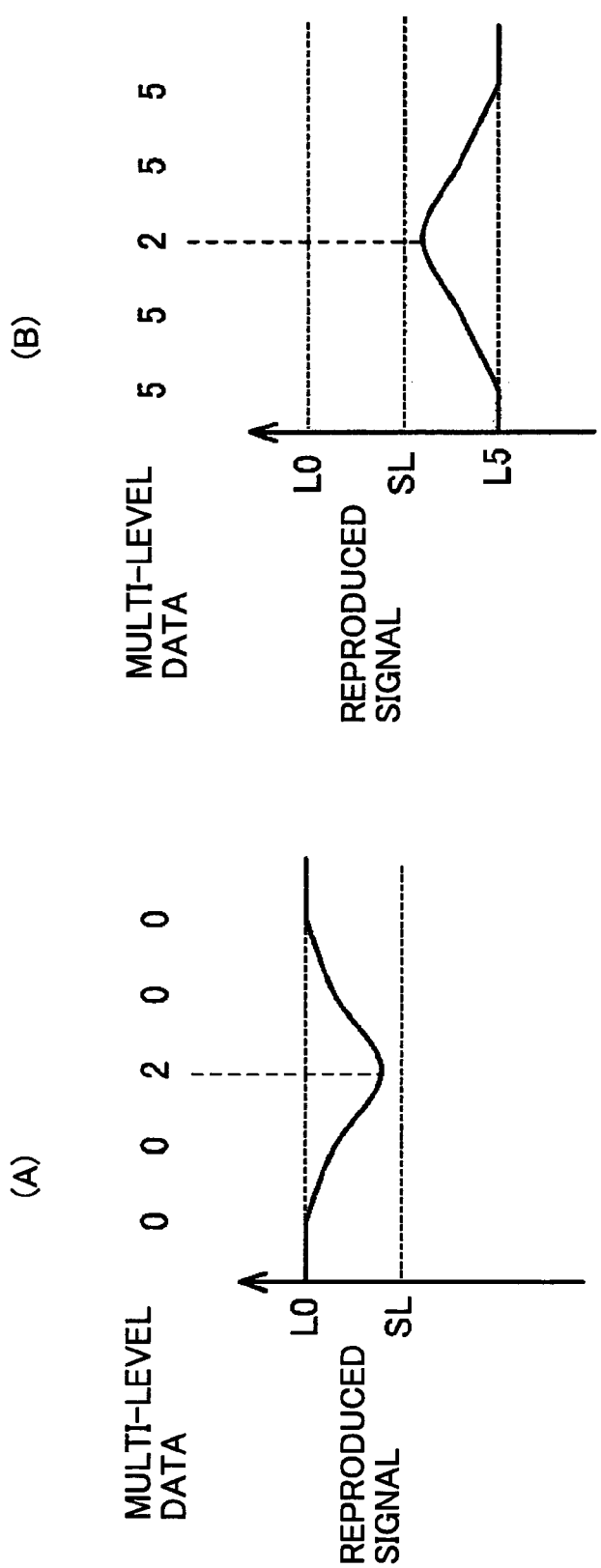
FIG. 36 illustrates relationships between a slice level signal and multi-level data.

For the sake of simplification, the center level-interference amount relationship is divided into two zones (a zone A and a zone B) in this case. It is assumed that a slice level signal SL is set as being ½ of the maximum amplitude. In this case, for example, when multi-level data 'x', 'x', '2', 'x' and 'x' is reproduced, the multi-level data '2' is recognized as corresponding to the zone A for a case where x=0 as shown in FIG. 36, (A), and thus, proper waveform equalizing is carried out. However, for a case where x=5, as shown in FIG. 36, (B), the multi-level data '2' is recognized as corresponding to the zone B, and thus, proper waveform equalizing is not carried out. Such a situation becomes more remarkable as the number of multi-levels increases.

Figure 37:
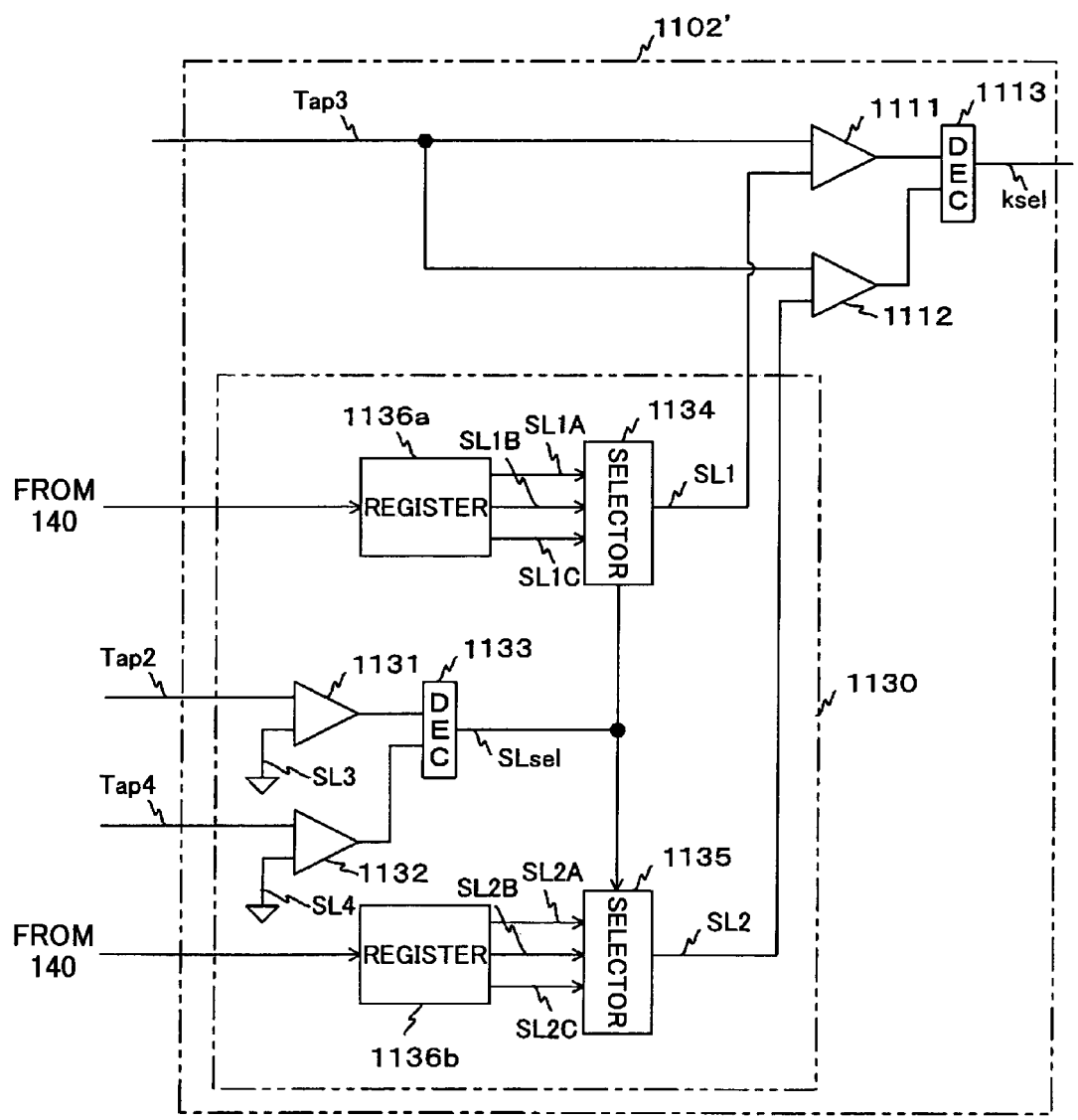
FIG. 37 illustrates a coefficient selecting circuit in which the slice level signal can be set.

For such a case, instead of the above-mentioned coefficient selecting circuit 1102, a coefficient selecting circuit 1102' as shown in FIG. 37 as one example, in which Tap2, Tap3 and Tap4 are applied as input signals, may be applied. This coefficient selecting circuit 1102' included, in addition to the two comparators (1111 and 1112) and the decoder 1113 included in the above-mentioned coefficient selecting circuit 1102, a slice level setting circuit 1130 is additionally provided. This slice level setting circuit 1130 includes two comparators (1131 and 1132), a decoder 1133, two registers (1136a and 1136b) and two selectors (1134 and 1135).

In the register 1136a, three slice level information (SL1A, SL1B and SL1C) is stored; and in the register 1136b, three slice level information (SL2A, SL2B and SL2C) is stored. The slice level information is obtained previously from an experiment or a simulation, and is stored in the data area of the flash memory 139. At initialization processing carried out when the power supply is started, the information is transferred to the respective registers from the data area of the flash memory 139 by the CPU 140.

The comparator 1131 compares Tap2 with a previously set slice level signal SL3, and outputs the comparison result. The comparator 1132 compares Tap4 with a previously set slice level signal SL4, and outputs the comparison result. Specifically, the comparator 1131 outputs 0 (low level) when Tap2<SL3, while outputs 1 (high level) when Tap2≧SL3. Similarly, the comparator 1132 outputs 0 (low level) when Tap4<SL4, while outputs 1 (high level) when Tap4≧SL4.

Each of SL3 and SL4 may be determined simply as being a level of ½ of the maximum magnitude. However, according to characteristics of the nonlinearity, at least one of SL3 and SL4 may be slightly shifted from the level of ½ of the maximum amplitude. At least one of SL3 and SL4 may be made to be variable.

The decoder 1133 generates a signal SLsel for selecting SL1 or SL2, based on the output signal of the comparator 1131 and the output signal of the comparator 1132. The selector 1134 selects any one of the three slice level signals (SL1A, SL1B and SL1C), and outputs the thus-selected one as the slice level signal SL1. The selector 1135 selects any one of the three slice level signals (SL2A, SL2B and SL2C), and outputs the thus-selected one as the slice level signal SL2. The number of selectable alternatives of each selector should not be limited to the three as in this example.

The same as in the above-mentioned coefficient selecting circuit 1102, the comparator 1111 compares Tap3 with SL1, and outputs the comparison result. The same as in the coefficient selecting circuit 1102, the comparator 1112 compares Tap3 with SL2, and outputs the comparison result. The same as in the coefficient selecting circuit 1102, the decoder 1113 outputs a selecting signal ksel to select the waveform equalizing characteristics (first characteristics) for the zone 1, when both the outputs of the comparators 1111 and 1112 are 0; outputs a selecting signal ksel to select the waveform equalizing characteristics (second characteristics) for the zone 2, when the output of the comparator 1111 is 1 and the output of the comparator 1112 is 0; and outputs a selecting signal ksel to select the waveform equalizing characteristics (third characteristics) for the zone 3, when both the outputs of the comparators 1111 and 1112 are 1.

Further, for example, when a shape of the record mark has very large nonlinearity with respect to the track tangential direction, any one of Tap2 and Tap4 may be applied to set SL1 and SL2.

Further, in the second embodiment, the respective coefficient groups are stored in the data area of the flash memory 139. However, information concerning the respective coefficient groups may be stored in the optical disk. In this case, recording of the information should be previously made in the optical disk in such a manner that the information concerning the respective coefficient groups should be obtained from reproduced information without having undergone the waveform equalizing processing. For example, in a case of a recordable optical disk, the information concerning the respective coefficient groups may be added to the wobble signal.

Figure 38:
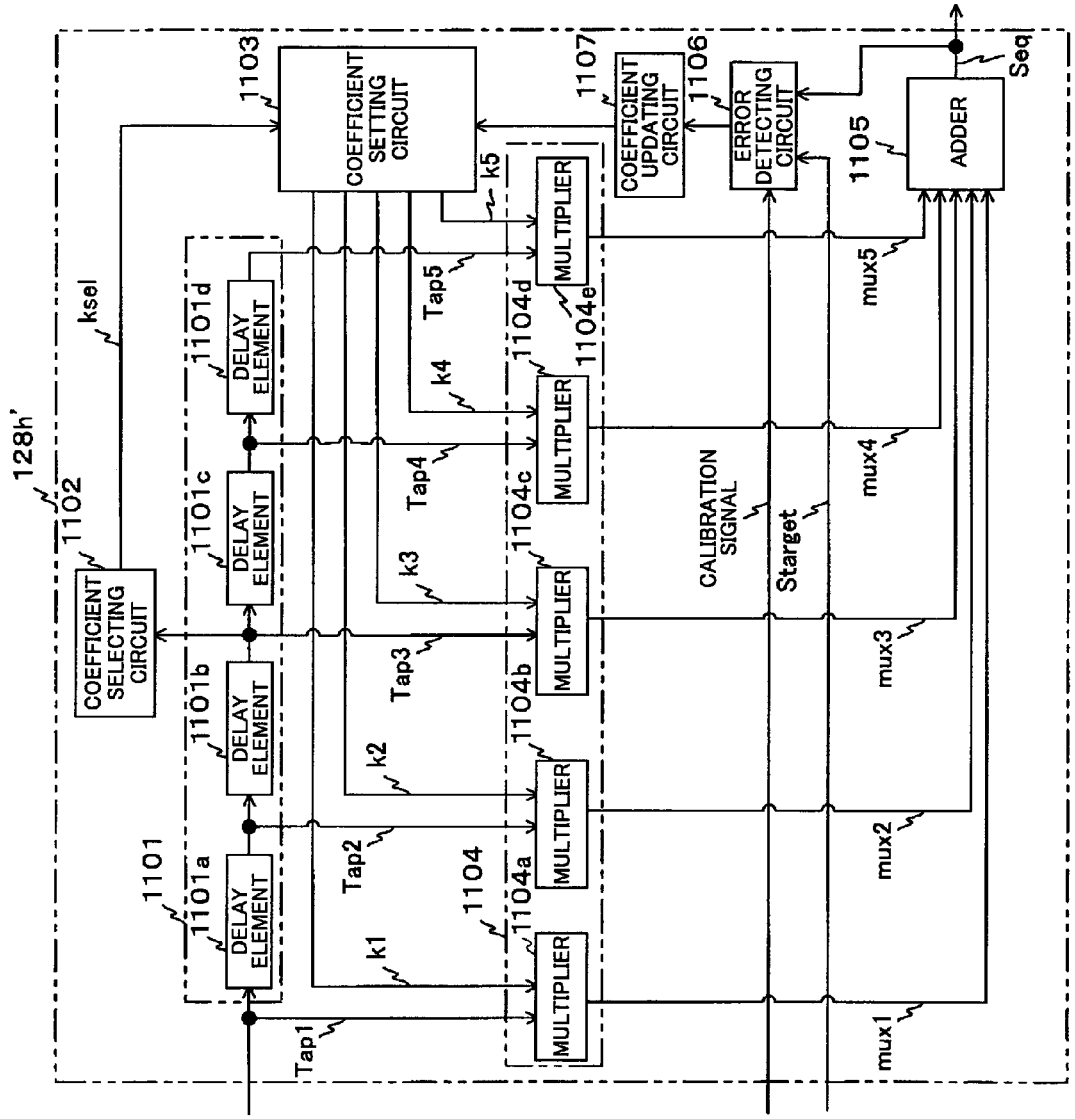
FIG. 38 illustrates a waveform equalizer circuit in which coefficient information can be corrected.

When it is anticipated that the optimum waveform equalizing characteristics may change due to aging or variation of the light spot, due to recording requirements, or such, the selectable alternatives (the coefficient information) of each selector may be made to be correctable. A waveform equalizer circuit (128h') configured to have this function is described next. This waveform equalizer circuit 128h' is such that, as shown in FIG. 38, an error detecting circuit 1106 and a coefficient updating circuit 1107 are added to the above-mentioned waveform equalizer circuit 128h in the second embodiment.

Figure 39:
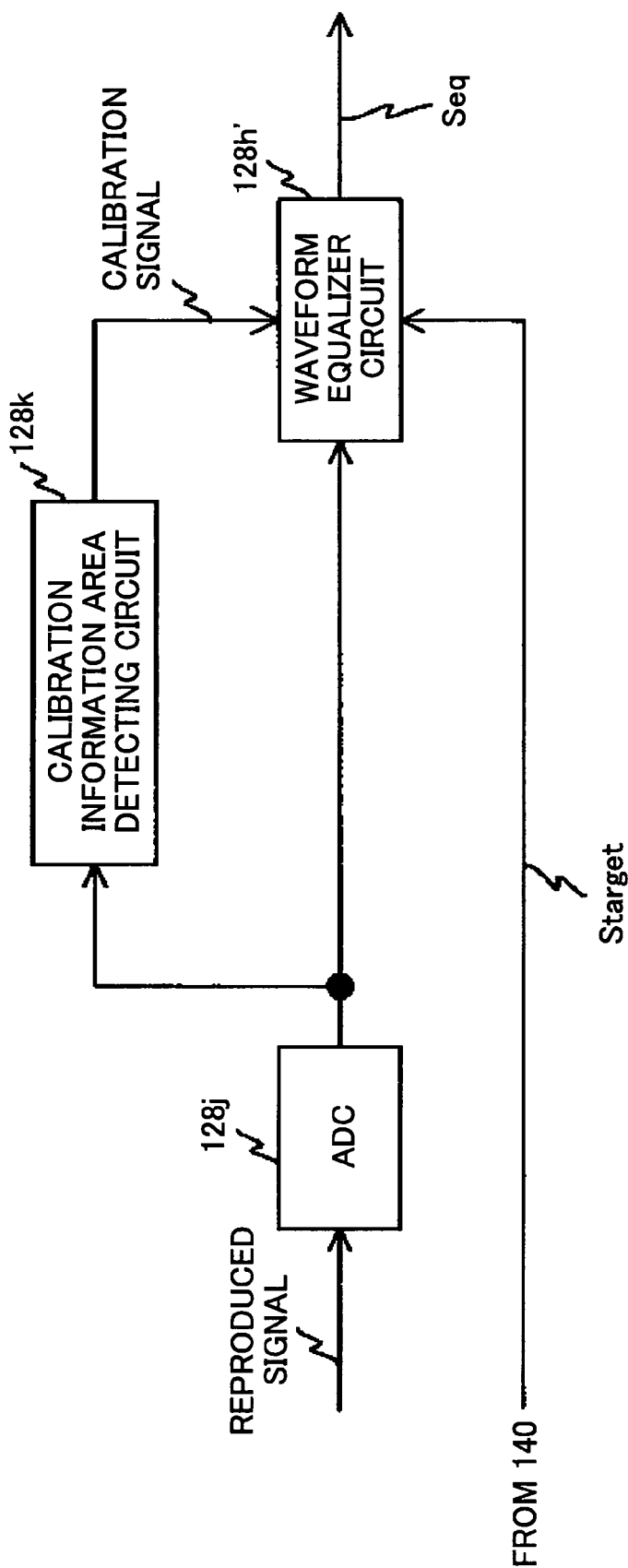
FIG. 39 illustrates a configuration for providing a calibration signal shown in FIG. 38.

In this case, it is assumed that an area (referred to as 'calibration information area', hereinafter) for which information recorded is already known is provided in the optical disk 115. At the top of the calibration information area, ID information indicating that the area is the calibration information area is recorded. Then, as shown in FIG. 39, an A/D converter (ADC) 128j and a calibration information area detecting circuit 128k are newly provided. The A/D converter 128*j* converts the reproduced signal into digital data. The calibration information area detecting circuit 128*k* monitors as to whether or not the above-mentioned ID information is included in the output signal of the A/D converter 128*j*, and, when detecting the ID information, outputs a calibration signal, indicating this fact, to the waveform equalizer circuit 128*h*'. In the waveform equalizer circuit 128*h*', as shown in FIG. 38, the calibration signal is provided to the error detecting circuit 1106.

Figure 40:
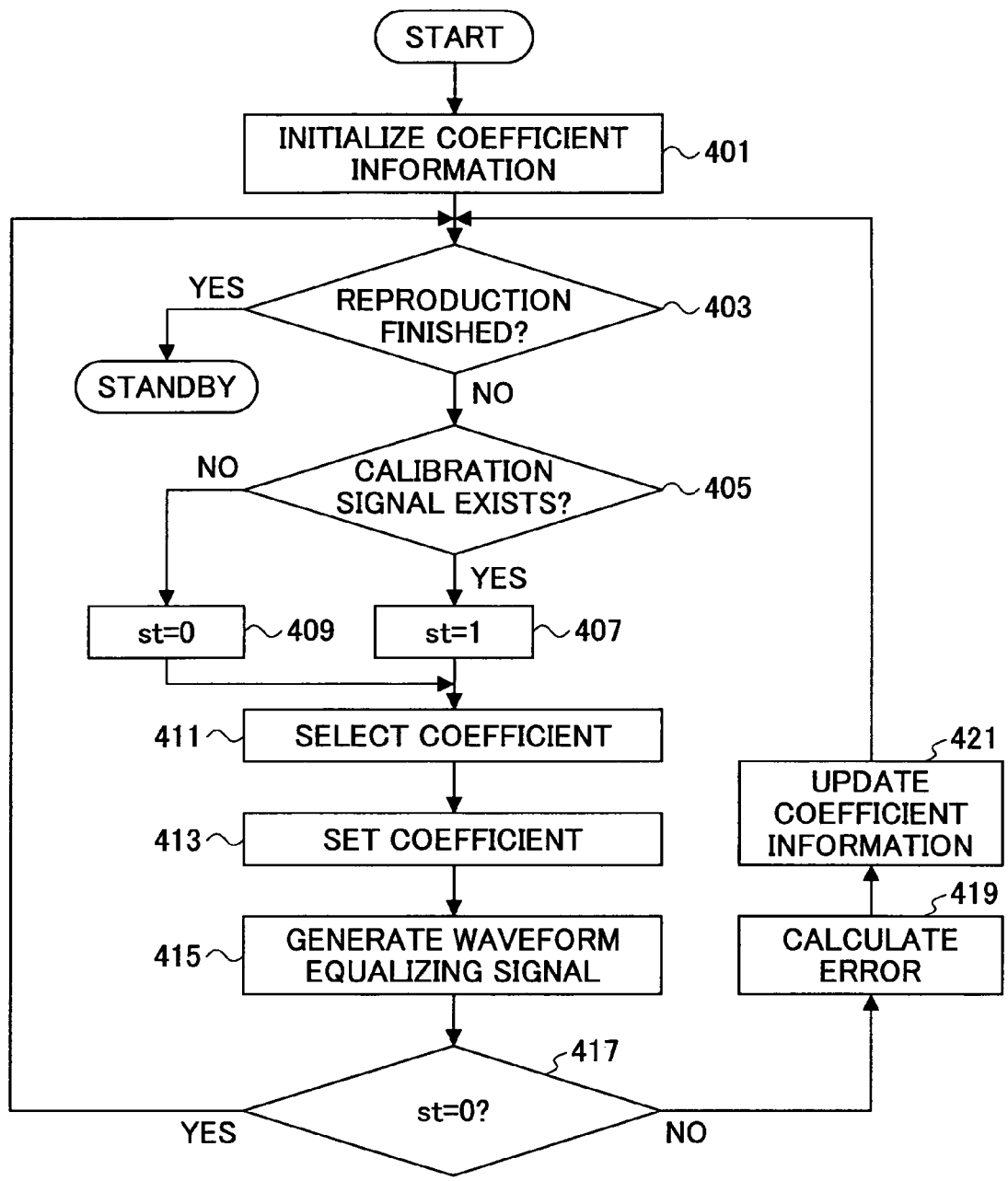
FIG. 40 is a flow chart illustrating coefficient information correcting processing.

Processing of this waveform equalizer circuit 128*h*' upon operation is described with reference to a flow chart shown in FIG. 40.

In Step 401, the coefficient information stored in each register of the coefficient setting circuit 1103 is initialized. When the initialization has been already carried out, this processing may be skipped.

In Step 403, it is determined as to whether or not the reproducing processing is finished. When the reproducing processing has not been finished yet, the determination results in No, and Step 405 is then carried out.

In Step 405, it is determined whether or not the calibration signal is provided. When the calibration signal is provided, the determination results in Yes, and then, Step 407 is carried out.

In Step 407, 1 is set in a flag st as information indicating that the calibration signal is provided.

In Step 411, the selection signal ksel is output from the coefficient selecting circuit 1102.

In Step 413, the coefficient signal is output from the coefficient setting circuit 1103 based on the selection signal ksel.

In Step 415, the adder 1105 generates the waveform equalizing signal Seq.

In Step 417, it is determined whether or not the flag st is 0. When the flag st is not 0, the determination results in No, and then, Step 419 is carried out.

In Step 419, the error detecting circuit 1106 compares the waveform equalizing signal Seq output from the adder 1105 with a target value Starget set by the CPU 140, and outputs a difference of the waveform equalizing signal Seq from the target value Starget as an error signal. As the target value Starget, a level obtained from an ideal signal level of information recorded in the calibration information area being equally divided by the number of the multi-levels, for example, is applied.

In Step 421, the coefficient updating circuit 1107 calculates new coefficient information based on the following equation (1), and, therewith, the coefficient information stored in each register of the coefficient setting circuit 1103 is updated:

$$C_i(n+1) = C_i(n) + A * e(n) * X_i(n) \quad (1)$$

There, e(n) denotes the error signal, $X_i(n)$ denotes the i-th Tap signal, $C_i(n)$ denotes the coefficient signal input to the i-th multiplier, and A denotes a constant. Then, Step 403 is returned to n denotes the number of repetition.

It is noted that, in Step 405, when the calibration signal is not provided, the determination in Step 405 results in No, and then, Step 409 is carried out. In Step 409, 0 is set in the flag st indicating that no calibration signal is provided. Then, Step 411 is carried out.

Further, when the flag st is 0 in Step 417, the determination in Step 417 results in Yes, and then, Step 403 is returned to.

Further, when the reproducing processing has been finished in Step 403, the determination in Step 403 results in Yes, and a standby state is entered. When a reproducing request is given in the standby state, the waveform equalizer circuit 128*h*' enters an operation state, and then, Step 403 is carried out.

Further, when the error signal indicates a value less than a predetermined value, the coefficient information should not be actually updated. Further, in Step 421, information (for example, a flag) indicating that convergence tendency of the coefficient information may be set when the coefficient information converges. Furthermore, reproduction of user data may be waited for, until the coefficient information converges.

Figure 41:
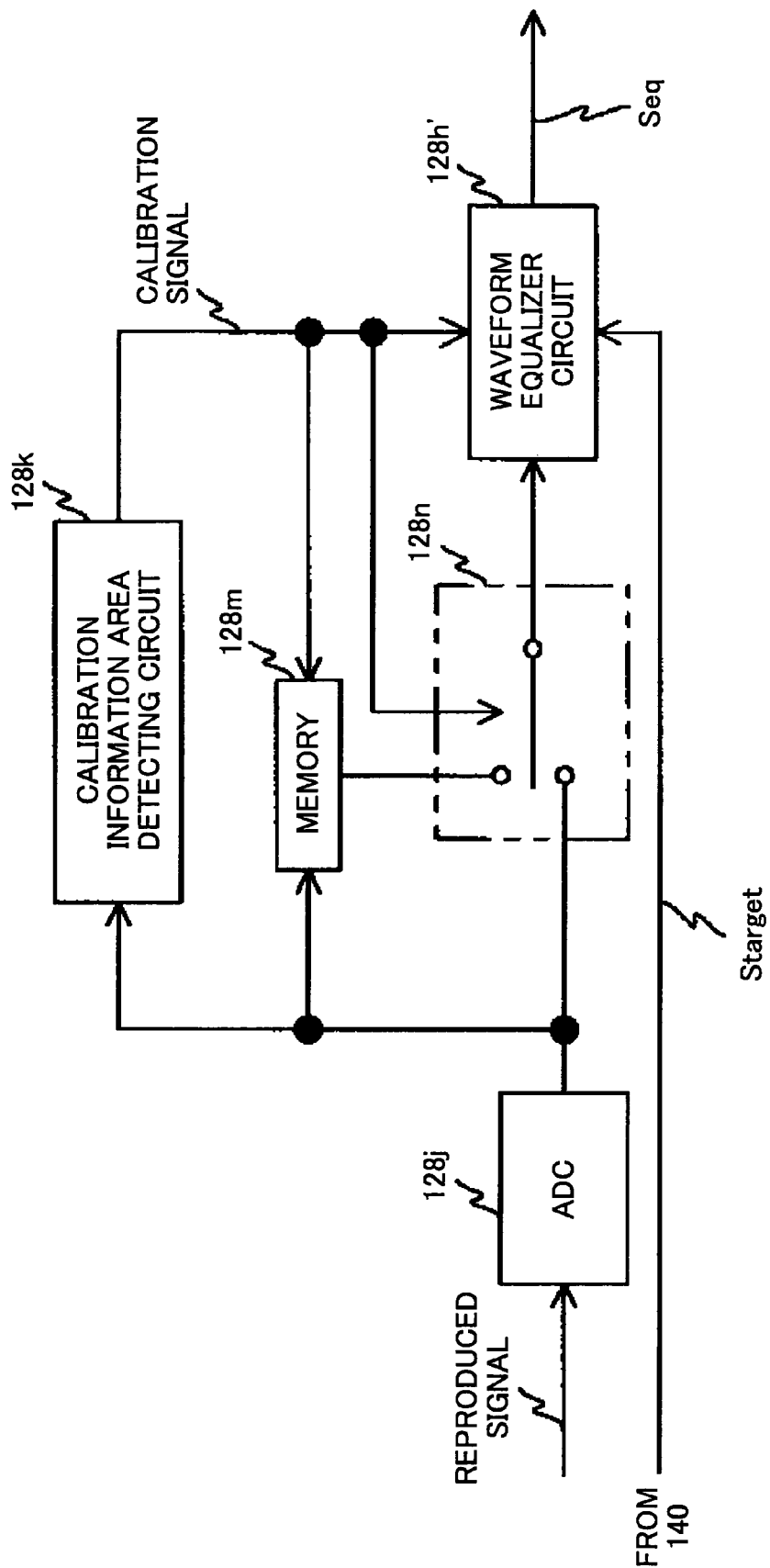
FIG. 41 illustrates a variant embodiment of FIG. 39.

In this case, as shown in FIG. 41, a memory 128*m* and a changeover switch 128*n* may be provided to hold the calibration signal. When detecting the ID information, the calibration information area detecting circuit 128*k* outputs the calibration signal to the memory 128*m*, the changeover switch 128*n* and the waveform equalizer circuit 128*h*'. When receiving the calibration signal, the memory 128*m* stores the output signal of the A/D converter. Thereby, the reproduced signal of the calibration information area is stored in the memory 128*m*. The memory 128*m* outputs the stored reproduced signal to the waveform equalizer circuit 128*h*' when receiving a request therefrom. The changeover switch 128*n* switches a signal line in such a manner that the output signal of the memory 128*m* is provided to the waveform equalizer circuit 128*h*' when receiving the calibration signal. Thereby, the reproduced signal of the calibration information area is provided to the waveform equalizer circuit 128*h*' from the memory 128*m*. Accordingly, it is possible to reduce the number of times of reproducing the calibration information area, and it is possible to shorten a time required for the correcting or calibration processing.

As the calibration information area, an area in which address information is recorded, an area in which synchronization information is recorded or such may be applied.

Figure 42:
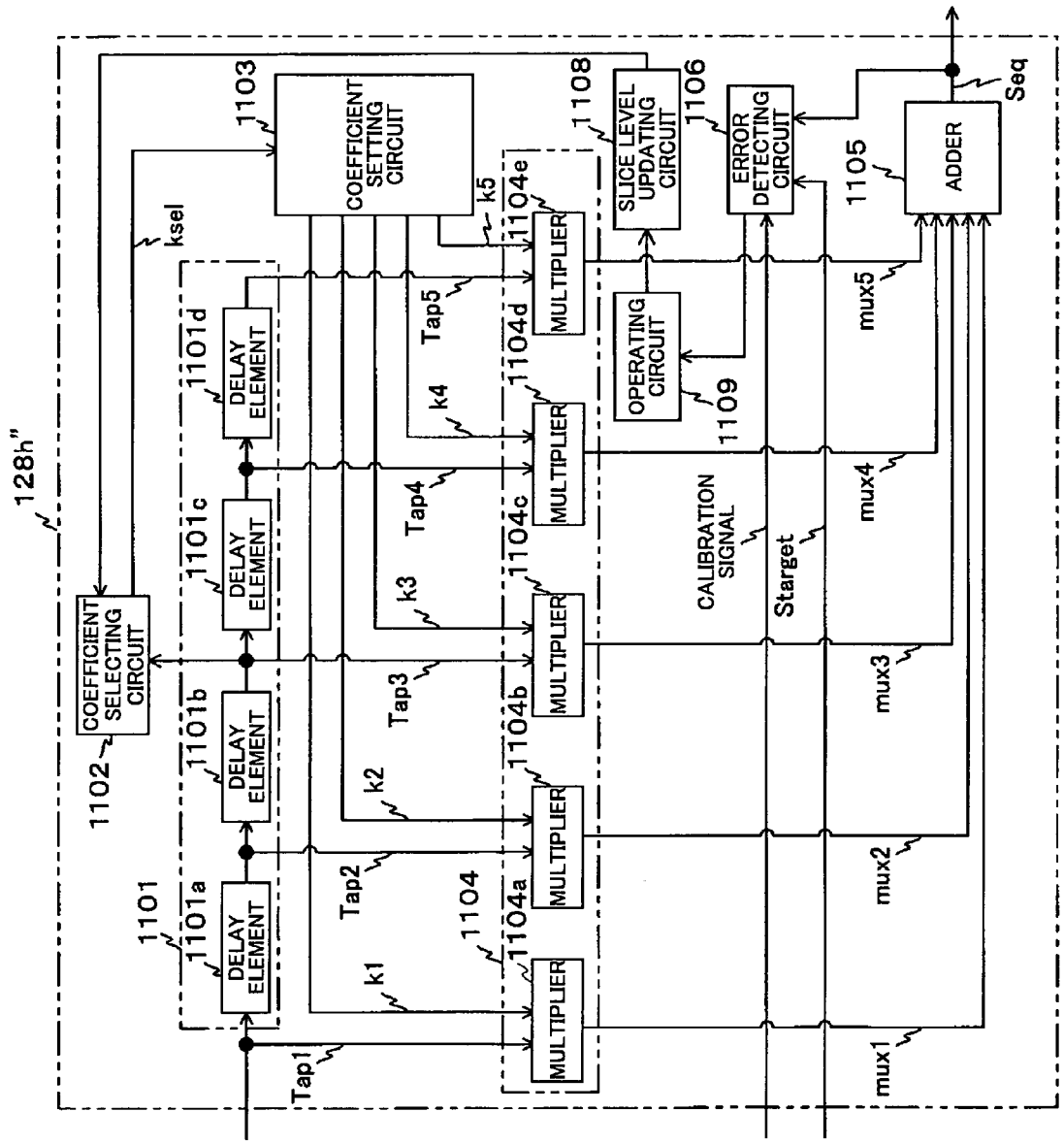
FIG. 42 illustrates a waveform equalizer circuit in which the slice level signal can be optimized.
Figure 43:
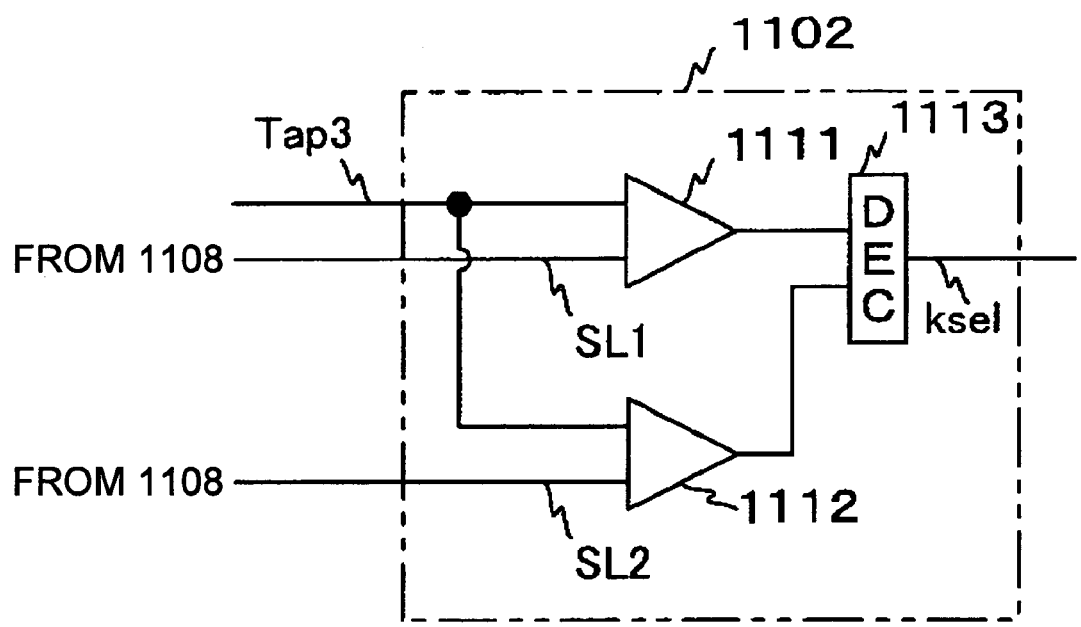
FIG. 43 illustrates a coefficient selecting circuit shown in FIG. 42.
Figure 44:
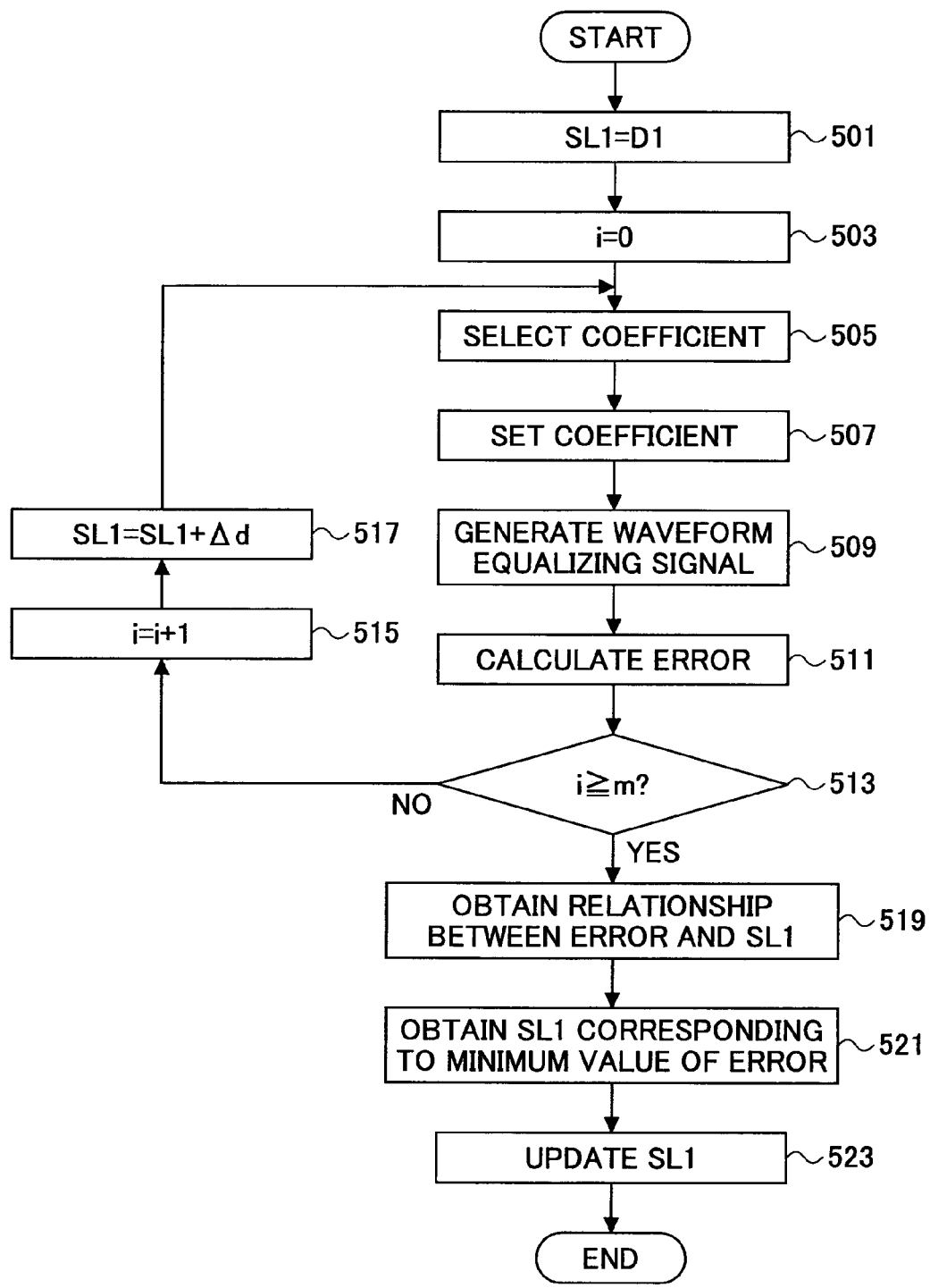
FIG. 44 is a flow chart illustrating slice level signal optimizing processing.

Further, in the same concept, the slice level signals may be optimized in the second embodiment. In this case, as shown in FIG. 42, the waveform equalizer circuit 128*h*', a waveform equalizer circuit 128*h*" is provided, in which, instead of the coefficient updating circuit 1107, a slice level updating circuit 1108 and an operating circuit 1109 are provided. Then, by the slice level updating circuit 1108, the slice level signals in the coefficient selecting circuit 1102 are updated (see FIG. 43). With reference to a flow chart shown in FIG. 44, the slice level signal SL1 optimizing processing in the waveform equalizer circuit 128*h*" is described next. Here, as one example, the slice level signal SL1 is changed, from D1 through (D1+ mΔd), stepwise with a step of Δd each time. Further, it is assumed that the coefficient information is not changed. This optimizing processing is initiated by the calibration signal.

In Step 501, the slice level updating circuit 1108 sets an initial value D1 as the slice level signal SL1.

In Step 503, an initial value 0 is set in a counter i.

In Step 505, the coefficient selecting circuit 1102 outputs the selection signal ksel.

In Step 507, th coefficient setting circuit 1103 outputs the coefficient signal based on the selection signal ksel.

In Step 509, the adder 1105 generates the waveform equalizing signal Seq.

In Step 511, the error detecting circuit 1106 compares the waveform equalizing signal Seq output from the adder 1105 with a target value Starget set by the CPU 140, and detects a difference of the waveform equalizing signal Seq with respect to the target value Starget as an error. This error is stored in a memory (not shown) of the operating circuit 1109 with a correspondence to the slice level signal SL1 given.

In Step 513, it is determined whether or not the value of the counter i is equal to or more than m. When the value of the counter i is less than m, the determination results in No, and Step 515 is then carried out.

In Step 515, 1 is added to the value of the counter i.

In Step 517, Δd is added to the slide level signal SL1, and Step 505 is returned to.

Then, until the determination in Step 513 becomes Yes, the processing of Steps 505 through 517 is repeated.

When the value of the counter i becomes m, the determination in Step 513 results in Yes, and then, Step 519 is carried out.

In Step 519, the operating circuit 1109 obtains a relation (for example, an approximate expression) between the slice level SL1 and the error.

In Step 521, the operating circuit 1109 calculates the slice level signal corresponding to a minimum value of the error, as an optimum slice level signal, according to the thus-obtained relation between the slice level and the error.

In Step 523, the operating circuit 1109 updates the slice level signal SL1 in the coefficient selecting circuit 1102 by the thus-calculated optimum slice level signal.

The slice level signal SL2 may also be optimized in the same manner.

Figure 45:
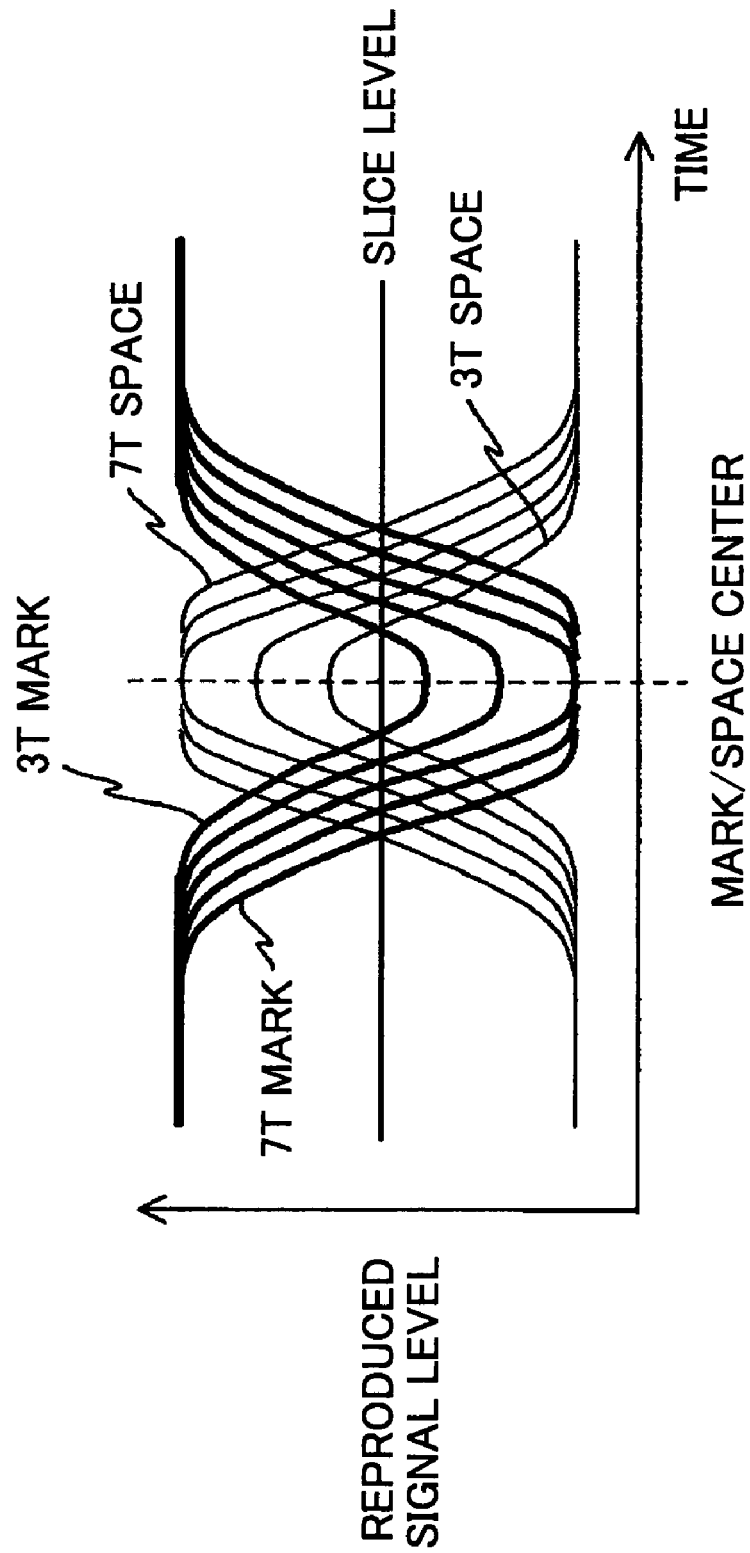
FIG. 45 illustrates intersymbol interference in a binarized recording method.

Further, in the second embodiment, information is recorded in the optical disk according to the multi-level recording method. However, the present invention is not limited thereto, and the concept of the second embodiment may also be applied to a case where information is recorded in binarized recording method. Also in the binarized recording method, the intersymbol interference exhibits nonlinearity when a size of a mark decreases as shown in FIG. 45. Waveforms projecting downward in FIG. 45 represent reproduced signals obtained when 3T through 7T marks are inserted between long spaces. Waveforms projecting upward in FIG. 45 represent reproduced signals obtained when 3T through 7T spaces are inserted between long marks. Therefrom, in each of the 3T (mark or space) and 4T (mark or space), the amplitude is small, and does not reach a maximum amplitude.

When information is recorded in the binarized recording method, a delay time in each delay element is equal to one period of a reproducing clock signal. However, for example, it may be equal to 1.5 periods, or 2 periods instead in view of a modulation method applied.

Further, in the second embodiment, the phase-change-type information recording medium is applied as the optical disk 115. However, it is not necessary to be limited thereto, and, any one of a write-once-type medium, a rewritable-type medium and a reproduction-only-type medium may be applied. In this case, any one of a DVD-system medium, a CD-system medium and an information recording medium in a next generation configured to adapt to light having a wavelength of approximately 405 nm may be applied.

Further, in the second embodiment, the optical pickup device has the single semiconductor laser. However, it is not necessary to limit thereto, and for example, a plurality of semiconductor lasers emitting light beams having mutually different wavelengths may be provided in the optical pickup device. In this case, for example, it may include at least one of a semiconductor laser emitting a light beam of approximately 405 nm, a semiconductor laser emitting a light beam of approximately 660 nm and a semiconductor laser emitting a light beam of approximately 780 nm. That is, the optical disk apparatus may handle a plurality of types of optical disks conforming to mutually different standards. In this case, the multi-level recording may be applied at least one type of optical disk from among the plurality of types of optical disks which the apparatus can handle.

The present application is based on Japanese Priority Applications Nos. 2004-073276 and 2004-157070, filed on Mar. 15, 2004 and May 27, 2004, respectively, the entire contents of which are hereby incorporated herein by reference.

What is claimed is:

1. A multi-level information recording medium in which marks having detection signal levels different according to multi-level information are recorded in areas virtually divided uniformly, wherein:
    a calibration area comprising a first part in which multi-level information corresponding to highest two levels of the signal level is disposed alternately, or multi-level information corresponding to lowest two levels of the signal level is disposed alternately, and a second part in which marks corresponding to a maximum signal level and a minimum signal level are disposed alternately, and
    the calibration area is disposed in a position different from a user information area, and
    the second part contains at least four marks.

2. The multi-level information recording medium as claimed in claim 1, wherein:
    the calibration area further comprises a third part in which a pattern is disposed, said pattern having at least two marks corresponding to the maximum signal level and the minimum signal level are disposed successively.

3. A multi-level information reproducing apparatus comprising:
    an optical system part obtaining a reproduced signal from the recording medium claimed in claim 1;
    a servo mechanism part moving said optical system part to a target position, and keeping the state;
    a synchronization detecting part identifying the calibration area from the reproduced signal, and outputting a calibration signal indicating the calibration area;
    a waveform equalizing part optimizing and then keeping equalizing characteristics based on the calibration signal output by said synchronization detecting part, and, with the use thereof, carrying out waveform equalization of the reproduced signal; and
    a multi-level determining part determining multi-level information from the reproduced signal having undergone waveform equalization by said waveform equalizing part, and outputting the same.

4. A multi-level information waveform equalizing device, comprising:
    a part carrying out waveform equalization of a reproduced signal obtained from said calibration area of the multi-level information recording medium claimed in claim 1 by means of a waveform equalizing part;
    comparing the reproduced signal thus undergone waveform equalization with a predetermined target value; and
    setting waveform equalizing characteristics of said waveform equalizing part in such a manner as to minimize an error between the reproduced signal having undergone waveform equalization and the target value.

5. The multi-level information waveform equalizing device as claimed in claim 4, wherein:
    said waveform equalizing part comprises a part which stores the reproduced signal of said calibration area in a storage; repetitively outputs the reproduced signal as a pseudo reproduced signal from said storage; and carries out equalization of the waveform equalizing characteristics of said waveform equalizing part based on the pseudo reproduced signal.

* * * * *

UNITED STATES PATENT AND TRADEMARK OFFICE
CERTIFICATE OF CORRECTION

PATENT NO. : 7,633,846 B2
APPLICATION NO. : 11/076056
DATED : December 15, 2009
INVENTOR(S) : Hiroshi Maegawa Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Ninth Day of November, 2010

David J. Kappos
*Director of the United States Patent and Trademark Office*